(12) United States Patent
Acharya

(10) Patent No.: US 11,640,705 B1
(45) Date of Patent: May 2, 2023

(54) ACTIVE LEARNING WITH HUMAN FEEDBACK LOOP TO OPTIMIZE FUTURE SAMPLING PRIORITY

(71) Applicant: LODESTAR SOFTWARE INC., San Jose, CA (US)

(72) Inventor: Evan Acharya, Englewood, CO (US)

(73) Assignee: LODESTAR SOFTWARE INC., San Jose, CA (US)

( * ) Notice: Subject to any disclaimer, the term of this patent is extended or adjusted under 35 U.S.C. 154(b) by 0 days.

(21) Appl. No.: 18/080,712

(22) Filed: Dec. 13, 2022

Related U.S. Application Data

(60) Provisional application No. 63/291,104, filed on Dec. 17, 2021.

(51) Int. Cl.
```
G06V 10/778    (2022.01)
H04N 19/132    (2014.01)
G06V 10/762    (2022.01)
G06V 10/25     (2022.01)
```

(52) U.S. Cl.
CPC ............ *G06V 10/778* (2022.01); *G06V 10/25* (2022.01); *G06V 10/762* (2022.01); *H04N 19/132* (2014.11)

(58) Field of Classification Search
CPC .... G06V 10/778; G06V 10/25; G06V 10/762; H04N 19/132
See application file for complete search history.

(56) References Cited

U.S. PATENT DOCUMENTS

| | | | | |
|---|---|---|---|---|
| 2005/0220341 | A1* | 10/2005 | Akahori | G06V 20/10 382/190 |
| 2009/0287996 | A1* | 11/2009 | Norimatsu | G06T 11/00 382/305 |
| 2014/0304660 | A1* | 10/2014 | Topakas | G06Q 50/10 715/848 |

FOREIGN PATENT DOCUMENTS

| | | | | | |
|---|---|---|---|---|---|
| CN | 102138151 | A | * | 7/2011 | ............ G06Q 30/02 |
| JP | 2006309854 | A | * | 11/2006 | |
| JP | 2010086221 | A | * | 4/2010 | ........... G06F 3/0482 |
| JP | 2011227783 | A | * | 11/2011 | |
| WO | WO-2021057752 | A1 | * | 4/2021 | ......... G06K 9/00255 |

* cited by examiner

*Primary Examiner* — Carol Wang
(74) *Attorney, Agent, or Firm* — Flagship Patents; Sikander Khan

(57) ABSTRACT

The technology disclosed extends Human-in-the-loop (HITL) active learning to incorporate real-time human feedback to influence future sampling priority for choosing the best instances to annotate for accelerated convergence to model optima. The technology disclosed enables the user to communicate with the model that generates machine annotations for unannotated instances. The technology disclosed also enables the user to communicate with the sampling logic that selects instances to be annotated next. The technology disclosed enables the user to generate ground truth annotations, from scratch or by correcting erroneous model annotations, which guide future model predictions to more accurate results. The technology disclosed enables the user to optimize the sampling logic to increase the future sampling likelihood of those instances that are similar to the instances that the user believes are informative, and decrease the future sampling likelihood of those instances that are similar to the instances that the user believes are non-informative.

19 Claims, 52 Drawing Sheets

*Gradient Flow Caused by Training Oracle Frame i*

ACTIVE LEARNING WITH HUMAN FEEDBACK LOOP TO OPTIMIZE FUTURE SAMPLING PRIORITY

PRIORITY APPLICATION

This application claims the benefit of and priority to U.S. Provisional Patent Application No. 63/291,104, titled "ACTIVE LEARNING WITH HUMAN FEEDBACK LOOP TO OPTIMIZE FUTURE SAMPLING PRIORITY," filed Dec. 17, 2021.

RELATED APPLICATIONS

This application is related to U.S. Nonprovisional patent application titled "CORE SET DISCOVERY USING ACTIVE LEARNING" Ser. No. 18/081,516, filed contemporaneously. The related application is hereby incorporated by reference for all purposes.

This application is related to U.S. Nonprovisional patent application titled "OBJECT ANNOTATION USING SPARSE ACTIVE LEARNING AND CORE SET SELECTION" Ser. No. 18/081,532, filed contemporaneously. The related application is hereby incorporated by reference for all purposes.

FIELD OF THE TECHNOLOGY DISCLOSED

The technology disclosed relates to artificial intelligence type computers and digital data processing systems and corresponding data processing methods and products for emulation of intelligence (i.e., knowledge based systems, reasoning systems, and knowledge acquisition systems); and including systems for reasoning with uncertainty (e.g., fuzzy logic systems), adaptive systems, machine learning systems, and artificial neural networks.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Deep learning is a frontier for artificial intelligence, aiming to be closer to its primary goal—artificial intelligence. Deep learning has seen great success in a wide variety of applications, such as natural language processing, speech recognition, medical applications, computer vision, and intelligent transportation systems. The great success of deep learning is due to the larger models. The scale of these models has included hundreds of millions of parameters. These hundreds of millions of parameters allow the model to have more degrees of freedom enough to produce awe-inspiring description capability.

However, the large number of parameters requires a massive amount of training data with labels. Improving model performance by data annotation has two crucial challenges. On the one hand, the data growth rate is far behind the growth rate of model parameters, so data growth has primarily hindered the further development of the model. On the other hand, the emergence of new tasks has far exceeded the speed of data updates, and annotating for all samples is laborious.

To tackle this challenge, new datasets are built by generating synthetic samples, thereby speeding up model iteration and reducing the cost of data annotation. Pre-training methods and transfer learning have also been used to solve this challenge, such as Transformers, BERT, and GPT. These works have achieved incredible results.

However, the generated data is only used as base data to initialize the model. In order to obtain a high-precision usable model, it is often necessary to label and update specific data.

Integrating apriori knowledge in the learning framework is an effective means to deal with sparse data, as the learner does not need to induce the knowledge from the data itself. As special agents, humans have rich prior knowledge. If the machine can learn human wisdom and knowledge, it will help deal with sparse data.

Human-in-the-loop (HITL) addresses these issues by incorporating human knowledge into the modeling process. HITL aims to train an accurate prediction model with minimum cost by integrating human knowledge and experience. Humans can provide training data for machine learning applications and directly accomplish some tasks that are hard for computers in the pipeline with the help of machine-based approaches.

At present, there is still a high degree of coupling between deep learning tasks and data, and the performance of deep learning largely depends on the quality of the data. For a new task, if you want to obtain better performance, you need to provide a large amount of high-quality labeled data. However, the labeled data requires a large amount of labor. In addition, large-scale data annotation takes a long time, and many iterations of tasks cannot wait such a long time. Unlike weak annotate and automatic annotate, HITL-based methods emphasize finding the key samples that play a decisive factor in new sample data.

A core set is a weighted subset of a larger set. A core set guarantees that a model fitting the core set also fits the larger set. Core set construction methods perform importance sampling with respect to sensitivity score, to provide high-probability solutions for a particular problem, such as k-means and k-median clustering, naïve Bayes and nearest-neighbors, mixture models, low rank approximation, spectral approximation, Nystrom methods, and Bayesian inference.

Supervised learning usually requires a large set of labeled data to train the prediction model. As the learning algorithms become more and more complicated, the required size of training set gets larger and larger. Meanwhile, labeling data examples is rather expensive, because the annotation process is usually time-consuming and needs high expertise in some difficult tasks. It is thus a significant challenge to learn with insufficient labeled data.

Active learning is a primary approach to overcome this challenge. It iteratively selects the most useful examples from the unlabeled dataset to query their labels from the oracle. After adding the newly labeled data into the training set, the model can be updated to achieve better performance. The key task in active learning is how to accurately estimate the potential utility of an example on improving the performance, such that the model can be well trained with minimal queries.

An opportunity arises to use human-in-the-loop (HITL) active learning for core set discovery. Accelerated deep learning with minimal coding may result.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DETAILED DESCRIPTION

Figure 1:
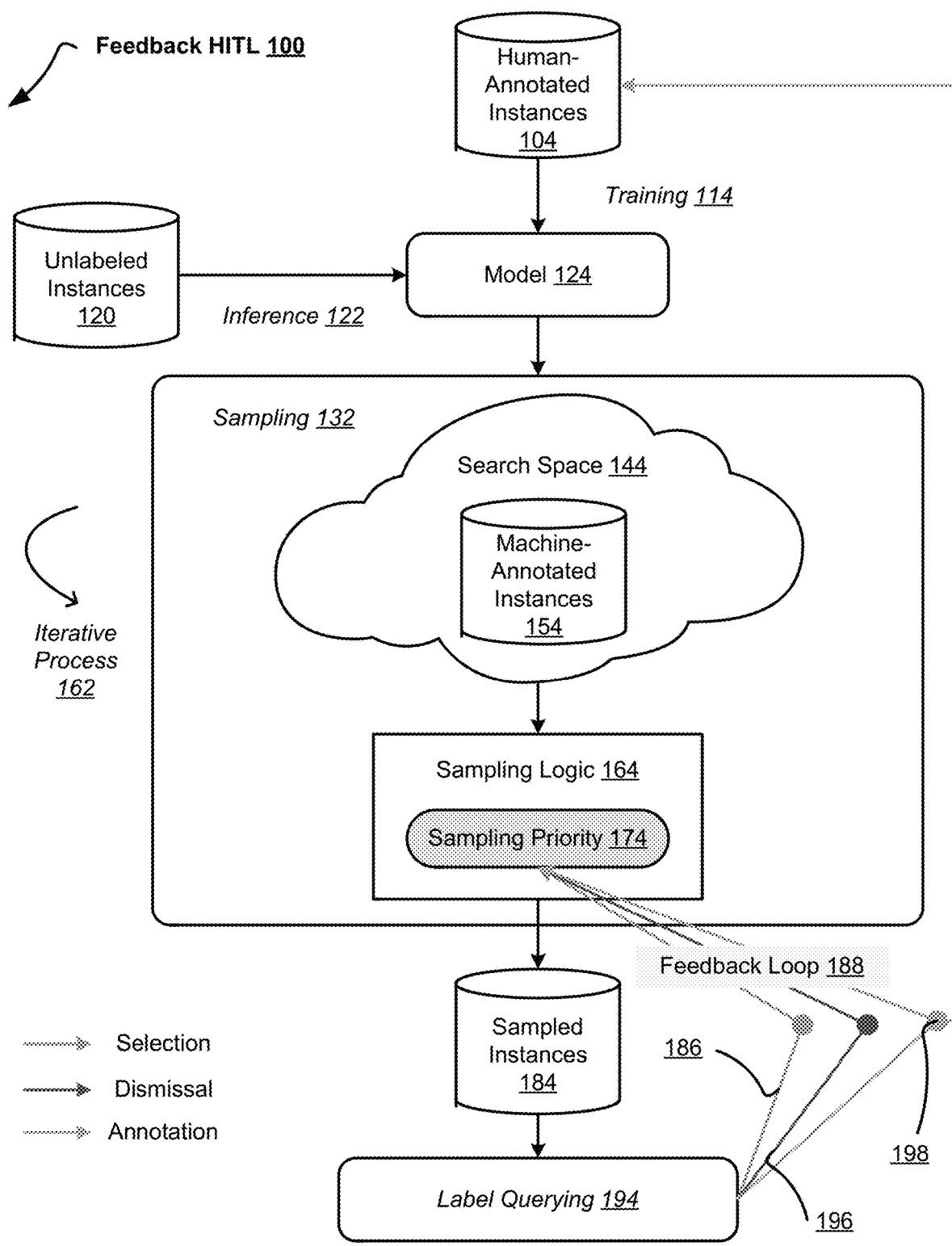
FIG. 1 illustrates one implementation of a human-in-the-loop (HITL) active learning environment that uses a human feedback loop to optimize future sampling priority.

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

The detailed description of various implementations will be better understood when read in conjunction with the appended drawings. To the extent that the figures illustrate diagrams of the functional blocks of the various implementations, the functional blocks are not necessarily indicative of the division between hardware circuitry. Thus, for example, one or more of the functional blocks (e.g., modules, processors, or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various implementations are not limited to the arrangements and instrumentality shown in the drawings.

The processing engines and databases of the figures, designated as modules, can be implemented in hardware or software, and need not be divided up in precisely the same blocks as shown in the figures. Some of the modules can also be implemented on different processors, computers, or servers, or spread among a number of different processors, computers, or servers. In addition, it will be appreciated that some of the modules can be combined, operated in parallel or in a different sequence than that shown in the figures without affecting the functions achieved. The modules in the figures can also be thought of as flowchart steps in a method. A module also need not necessarily have all its code disposed contiguously in memory; some parts of the code can be separated from other parts of the code with code from other modules or other functions disposed in between. Wherever practicable, similar or like reference characters are used in the drawings to indicate similar or like functionality.

Introduction

The technology disclosed extends Human-in-the-loop (HITL) active learning to incorporate real-time human feedback to influence future sampling priority for choosing the best instances to annotate for accelerated convergence to model optima. The technology disclosed enables the user to communicate with the model that generates machine annotations for unannotated instances. The technology disclosed also enables the user to communicate with the sampling logic that selects instances to be annotated next.

The technology disclosed enables the user to generate ground truth annotations, either from scratch or by correcting erroneous model annotations, which guide future model predictions to more accurate results. The technology disclosed also enables the user to optimize the sampling logic to increase the future sampling likelihood of those instances that are similar to the instances that the user believes are informative, and decrease the future sampling likelihood of those instances that are similar to the instances that the user believes are non-informative.

The technology disclosed implements the feedback look via a user interface that is expressly designed for the suggested images to admit multiple fast feedbacks, including selection, dismissal, and annotation. Then, the downstream selection policy for subsequent sampling iterations is based on the available data interpreted in the context of the previous selections, dismissals, and annotations.

Optimizing Future Sampling Based On Human Supervisory Signal

FIG. 1 illustrates one implementation of a human-in-the-loop (HITL) active learning environment 100 that uses a human feedback loop to optimize future sampling priority.

FIG. 1 is an architectural level schematic of the example environment 100 in which the technology disclosed can be used. Because FIG. 1 is an architectural diagram, certain details are intentionally omitted to improve clarity of the description.

The discussion of FIG. 1 will be organized as follows. First, the elements of FIG. 1 will be described, followed by their interconnections. Then, the use of the elements in the system will be described in greater detail.

FIG. 1 includes unlabeled instances 120 and model 124. Instances in the unlabeled instances 120 can be images, image patches, video frames, audio frames, documents, sentences, words, characters, chromosomes, genes, nucleotides, or any other entity. The model 124 can be a rule-based model, a tree-based model, or a machine learning model.

In one implementation, the model 124 is a multilayer perceptron (MLP). In another implementation, the model 124 is a feedforward neural network. In yet another implementation, the model 124 is a fully-connected neural network. In a further implementation, the model 124 is a fully convolution neural network. In a yet further implementation, the model 124 is a semantic segmentation neural network. In a yet another further implementation, the model 124 is a generative adversarial network (GAN) (e.g., CycleGAN, StyleGAN, pixelRNN, text-2-image, DiscoGAN, IsGAN). In a yet another implementation, the model 124 includes self-attention mechanisms like Transformer, Vision Transformer (ViT), Bidirectional Transformer (BERT), Detection Transformer (DETR), Deformable DETR, UP-DETR, DeiT, Swin, GPT, iGPT, GPT-2, GPT-3, BERT, SpanBERT, RoBERTa, XLNet, ELECTRA, UniLM, BART, T5, ERNIE (THU), KnowBERT, DeiT-Ti, DeiT-S, DeiT-B, T2T-ViT-14, T2T-ViT-19, T2T-ViT-24, PVT-Small, PVT-Medium, PVT-Large, TNT-S, TNT-B, CPVT-S, CPVT-S-GAP, CPVT-B, Swin-T, Swin-S, Swin-B, Twins-SVT-S, Twins-SVT-B, Twins-SVT-L, Shuffle-T, Shuffle-S, Shuffle-B, XCiT-S12/16, CMT-S, CMT-B, VOLO-D1, VOLO-D2, VOLO-D3, VOLO-D4, MoCo v3, ACT, TSP, Max-DeepLab, VisTR, SETR, Hand-Transformer, HOT-Net, METRO, Image Transformer, Taming transformer, TransGAN, IPT, TTSR, STTN, Masked Transformer, CLIP, DALL-E, Cogview, UniT, ASH, TinyBert, FullyQT, ConvBert, FCOS, Faster R-CNN+FPN, DETR-DC5, TSP-FCOS, TSP-RCNN, ACT+MKDD (L=32), ACT+MKDD (L=16), SMCA, Efficient DETR, UP-DETR, UP-DETR, ViTB/16-FRCNN, ViT-B/16-FRCNN, PVT-Small+RetinaNet, Swin-T+RetinaNet, Swin-T+ATSS, PVT-Small+DETR, TNT-S+DETR, YOLOS-Ti, YOLOS-S, and YOLOS-B.

In one implementation, the model 124 is a convolution neural network (CNN) with a plurality of convolution layers. In another implementation, the model 124 is a recurrent neural network (RNN) such as a long short-term memory network (LSTM), bi-directional LSTM (Bi-LSTM), or a gated recurrent unit (GRU). In yet another implementation, the model 124 includes both a CNN and an RNN.

In yet other implementations, the model 124 can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The model 124 can use one or more loss functions such as logistic regression/log loss, multi-class cross-entropy/softmax loss, binary cross-entropy loss, mean-squared error loss, L1 loss, L2 loss, smooth L1 loss, and Huber loss. The model 124 can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The model 124 can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The model 124 can be a linear regression model, a logistic regression model, an Elastic Net model, a support vector machine (SVM), a random forest (RF), a decision tree, and a boosted decision tree (e.g., XGBoost), or some other tree-based logic (e.g., metric trees, kd-trees, R-trees, universal B-trees, X-trees, ball trees, locality sensitive hashes, and inverted indexes). The model 124 can be an ensemble of multiple models, in some implementations.

In some implementations, the model 124 can be trained using backpropagation-based gradient update techniques. Example gradient descent techniques that can be used for training the model 124 include stochastic gradient descent, batch gradient descent, and mini-batch gradient descent. Some examples of gradient descent optimization algorithms that can be used to train the model 124 are Momentum, Nesterov accelerated gradient, Adagrad, Adadelta, RMSprop, Adam, AdaMax, Nadam, and AMSGrad.

The model 124 takes as input the unlabeled instances 120 and generates machine-annotated instances 154 as output, a process identified as inference 122 in FIG. 1. In one implementation in which the instances are images depicting multiple objects, the model 124 annotates the images by drawing bounding boxes around objects-of-interest in the images. For example, in a DETR implementation, the model 124 generates an attention/heat map as output in response to processing the images as input, such that the attention/heat map identifies which pixels in the images contain the objects-of-interest.

In some implementations, the machine-annotated instances 154 are represented in a search space 144. In one implementation, the search space 144 is an embedding space in which the instances are embedded, for example, to group/cluster/subcluster visually similar images in a latent space. A "latent space," for example, in deep learning is a reduced-dimensionality vector space of a hidden layer. A hidden layer of a neural network compresses an input and forms a new low-dimensional representation with interesting properties that are distance-wise correlated in the latent space.

A distance is identified between each pair of the instances in the embedding space corresponding to a predetermined measure of similarity between the pair of the instances. The "embedding space," into which the instances are embedded, for example, by an embedding module (not shown), can be a geometric space within which the instances are represented. In one implementation, the embedding space can be a vector space (or tensor space), and in another implementation the embedding space can be a metric space. In a vector space, the features of an instance define its "position" in the vector space relative to an origin. The position is typically represented as a vector from the origin to the instance's position, and the space has a number of dimensions based on the number of coordinates in the vector. Vector spaces deal with vectors and the operations that may be performed on those vectors.

When the embedding space is a metric space, the embedding space does not have a concept of position, dimensions, or an origin. Distances among instances in a metric space are maintained relative to each other, rather than relative to any particular origin, as in a vector space. Metric spaces deal with objects combined with a distance between those objects and the operations that may be performed on those objects.

For purposes of the present disclosure, these objects are significant in that many efficient algorithms exist that operate on vector spaces and metric spaces. For example, metric trees may be used to rapidly identify objects that are "close" to each other. Objects can be embedded into vector spaces and/or metric spaces. In the context of a vector space, this means that a function can be defined that maps objects to vectors in some vector space. In the context of a metric space, this means that it is possible to define a metric (or distance) between those objects, which allows the set of all such objects to be treated as a metric space. Vector spaces allow the use of a variety of standard measures of distance/divergence (e.g., the Euclidean distance). Other implementations can use other types of embedding spaces.

As used herein, "an embedding" is a map that maps instances into an embedding space. An embedding is a function that takes, as inputs, a potentially large number of characteristics of the instance to be embedded. For some embeddings, the mapping can be created and understood by a human, whereas for other embeddings the mapping can be very complex and non-intuitive. In many implementations, the latter type of mapping is developed by a machine learning algorithm based on training examples, rather than being programmed explicitly.

In order to embed an instance in a vector space, each instance must be associated with a vector. A distance between two instances in such a space is then determined using standard measures of distance using vectors.

A goal of embedding instances in a vector space is to place intuitively similar instances close to each other. One way of embedding text instances is to use a bag-of-words model. The bag of words model maintains a dictionary. Each word in the dictionary is given an integer index, for example, the word aardvark may be given the index 1, and the word zebra may be given the index 60,000. Each instance is processed by counting the number of occurrences of each dictionary word in that instance. A vector is created where the value at the ith index is the count for the ith dictionary word. Variants of this representation normalize the counts in various ways. Such an embedding captures information about the content and therefore the meaning of the instances. Text instances with similar word distributions are close to each other in this embedded space.

Images may be processed to identify commonly occurring features using, e.g., scale invariant feature transforms (SIFT), which are then binned and used in a representation similar to the bag-of-words embedding described above. Further, embeddings can be created using deep neural networks, or other deep learning techniques. For example, a neural network can learn an appropriate embedding by performing gradient descent against a measure of dimensionality reduction on a large set of training data. As another example, a kernel can be learned based on data and derive a distance based on that kernel. Likewise, distances may be learned directly.

These approaches generally use large neural networks to map instances, words, or images to high dimensional vectors (for example see: A brief introduction to kernel classifiers, Mark Johnson, Brown University 2009, http://cs.brown.edu/courses/cs195-5/fall2009/docs/lecture_10-27.pdf "Using Confidence Bounds for Exploitation-Exploration Trade-offs, incorporated herein by reference; and Kernel Method for General Pattern Analysis, Nello Cristianini, University of California, Davis, accessed October 2016, http://www.kernel-methods.net/tutorials/KMtalk.pdf). In another example, image patches can be represented as deep embeddings. As an image is passed through a deep neural network model, the output after each hidden layer is an embedding in a latent space. These deep embeddings provide hints for the model to distinguish different images. In some implementations, the embeddings can be chosen from a low-dimensional layer as the latent representation.

In other implementations, an embedding can be learned using examples with algorithms such as Multi-Dimensional Scaling, or Stochastic Neighbor Embedding. An embedding into a vector space may also be defined implicitly via a kernel. In this case, the explicit vectors may never be generated or used, rather the operations in the vector space are carried out by performing kernel operations in the original space.

Other types of embeddings of particular interest capture date and time information regarding the instance, e.g., the date and time when a photograph was taken. In such cases, a kernel may be used that positions images closer if they were taken on the same day of the week in different weeks, or in the same month but different years. For example, photographs taken around Christmas may be considered similar even though they were taken in different years and so have a large absolute difference in their time stamps. In general, such kernels may capture information beyond that available by simply looking at the difference between time-stamps.

Similarly, embeddings capturing geographic information may be of interest. Such embeddings may consider geographic metadata associated with instances, e.g., the geo-tag associated with a photograph. In these cases, a kernel or embedding may be used that captures more information than simply the difference in miles between two locations. For example, it may capture whether the photographs were taken in the same city, the same building, or the same country.

Often embeddings will consider instances in multiple ways. For example, a product may be embedded in terms of the metadata associated with that product, the image of that product, and the textual content of reviews for that product. Such an embedding may be achieved by developing kernels for each aspect of the instance and combining those kernels in some way, e.g., via a linear combination.

In many cases a very high dimensional space would be required to capture the intuitive relationships between instances. In some of these cases, the required dimensionality may be reduced by choosing to embed the instances on a manifold (curved surface) in the space rather than to arbitrary locations.

Different embeddings may be appropriate on different subsets of the instance catalog. For example, it may be most effective to re-embed the candidate result sets at each iteration of the search procedure. In this way, the subset may be re-embedded to capture the most important axes of variation or of interest in that subset.

To embed an instance in a metric space requires associating that catalog with a distance (or metric).

A "distance" between two instances in an embedding space corresponds to a predetermined measurement (measure) of similarity among instances. Preferably, it is a monotonic function of the measurement of similarity (or dissimilarity). Typically, the distance equals the measurement of similarity. Example distances include the Manhattan distance, the Euclidean distance, the Hamming distance, and the Mahalanobis distance.

Given the distance (similarity measure) between instances to be searched, or the embedding of those instances into a vector space, a metric space or a manifold, there are a variety of data structures that may be used to index the instance catalog and hence allow for rapid search. Such data structures include metric trees, kd-trees, R-trees, universal B-trees, X-trees, ball trees, locality sensitive hashes, and inverted indexes. The technology disclosed can use a combination of such data structures to identify a next set of candidate results based on a refined query. An advantage of using geometric constraints is that they may be used with such efficient data structures to identify next results in time that is sub-linear in the size of the catalog.

There are a wide variety of ways to measure the distance (or similarity) between instances, and these may be combined to produce new measures of distance. An important concept is that the intuitive relationships between digital instances may be captured via such a similarity or distance measure. For example, some useful distance measures place images containing the same person in the same place close to each other. Likewise, some useful measures place instances discussing the same topic close to each other. Of course, there are many axes along which digital instances may be intuitively related, so that the set of all instances close (with respect to that distance) to a given instance may be quite diverse. For example, a historical text describing the relationship between Anthony and Cleopatra may be similar to other historical texts, texts about Egypt, texts about Rome, movies about Anthony and Cleopatra, and love stories. Each of these types of differences constitutes a different axis relative to the original historical text.

Such distances may be defined in a variety of ways. One typical way is via embeddings into a vector space. Other ways include encoding the similarity via a kernel. By associating a set of instances with a distance, we are effectively embedding those instances into a metric space. Instances that are intuitively similar will be close in this metric space while those that are intuitively dissimilar will be far apart. Note further that kernels and distance functions may be learned. In fact, it may be useful to learn new distance functions on subsets of the instances at each iteration of the search procedure.

Note that wherever a distance is used to measure the similarity between instances a kernel may be used to measure the similarity between instances instead, and vice-versa. However, kernels may be used directly instead without the need to transform them into distances.

Kernels and distances may be combined in a variety of ways. In this way, multiple kernels or distances may be leveraged. Each kernel may capture different information about an instance, e.g., one kernel captures visual information about a piece of jewelry, while another captures price, and another captures brand.

Also note that embeddings may be specific to a given domain, such as a given catalog of products or type of content. For example, it may be appropriate to learn or develop an embedding specific to men's shoes. Such an embedding would capture the similarity between men's shoes but would be uninformative with regards to men's shirts.

In other implementations, instead of a distance function, a similarity function can be used, for example, to group/cluster/subcluster visually similar images in a latent space. The similarity function, which is used to determine a measure of similarity, can be any function having kernel properties, such as but not limited to a dot product function, a linear function, a polynomial function, a Gaussian function, an exponential function, a Laplacian function, an analysis of variants (ANOVA) function, a hyperbolic tangent function, a rational quadratic function, a multi-quadratic function, an inverse multi-quadratic function, a circular function, a wave function, a power function, a log function, a spline function, a B-spline function, a Bessel function, a Cauchy function, a chi-square function, a histogram intersection function, a generalized histogram intersection function, a generalized T-student function, a Bayesian function, and a wavelet function.

In the above-described context, using similarity functions, as opposed to using distance functions, is better because neural networks are often trained with regularizers, which add an ever increasing cost in order to reach the training objective as the weights of the neural network get larger. These regularizers are added to prevent overfitting, where the network pays undue attention to details in the training data, instead of identifying broad trends. Further, these regularizers may be viewed as applying pressure toward a default behavior, which must be overcome by the training data. When used for learning embeddings, standard regularizers have an effect of pushing the embeddings toward an origin, which tends to push them closer together. If one uses a goal to achieve large distances when items are dissimilar, then this sort of regularization pushes towards a default that items will be similar. However, if a goal is set to have the embeddings have a large dot product when the items are similar (as in the case of the above-described similarity function), then the regularizer applies pressure towards a default that items are dissimilar. It will often be the case that a typical random pair of instances should be regarded as dissimilar. An overall more accurate and efficient visual image discovery results.

Turning to FIG. 1, in some implementations, the unlabeled instances 120 are represented in the search space 144. In other implementations, the machine-annotated instances 154 are represented in the search space 144. In yet other implementations, human-annotated instances 104 are represented in the search space 144. In one implementation, a combination of the unlabeled instances 120, the machine-annotated instances 154, and the human-annotated instances 104 is represented in the search space 144. In some implementations, the search space 144 can be considered a distribution of the unlabeled instances 120, the machine-annotated instances 154, and/or the human-annotated instances 104.

Sampling logic 164 samples instances from the search space 144 and presents sampled instances 184 to the user for annotation, a process identified as sampling 132 in FIG. 1. The sampling logic 164 is configured to select those instances that have the highest impact on training the model 124, i.e., the biggest change in model parameters. Sampling logic 164 can be based on stream-based selective sampling, membership query synthesis (e.g., using generative adversarial networks (GANs)), or pool-based sampling. In one implementation, the sampling logic 164 is configured to select the top N instances from the search space 144 based on a sampling priority 174 of the instances. In some implementations, each instance can be assigned a priority score, which serves as a proxy for the sampling priority 174. Examples of prioritizing methods that can be used to determine the sampling priority 174 of the instances include model confidence, margin sampling, and entropy.

In one implementation, the sampling priority 174 is based on an informativeness measure. The informativeness measure can be determined by an uncertainty of an instance. The more uncertain a model prediction is, the more information can be gained by including the ground truth for that instance. In one implementation, the uncertainty can be determined by "least confident sampling" where the instances with the highest uncertainty are selected for labelling, by "margin sampling" that considers the first and second most probable labels under the model, by "entropy" that measures the amount of information required to encode a distribution, and/or by "ensembling" that measures the agreement between multiple models performing the same task.

In other implementations, the informativeness is measured by representativeness, instead of or in addition to an uncertainty measure. The intuition behind including a representativeness measure is that methods only concerned with uncertainty have the potential to focus only on small regions of the distribution, and that training on samples from the same area of the distribution may introduce redundancy to the selection strategy, or may skew the model towards a particular area of the distribution. The addition of a representativeness measure seeks to encourage selection strategies to sample from different areas of the distribution, and to increase the diversity of samples, thus improving the model performance. A sample with a high representativeness covers the information for many images in the same area of the distribution, so there is less need to include many samples covered by a representative image.

The sampled instances 184 are presented to the user in a ranked order to assign labels, a process identified as label querying 194 in FIG. 1. The user can select 186 the sampled instances 184, dismiss 196 the sampled instances, and annotate 198 the sampled instances.

A feedback loop 188 uses the selection 186, the dismissal 196, and the annotation 198 of the sampled instances 184 by the user to modify the sampling priority 174 for subsequent sampling iterations. In one implementation, for future sampling, the feedback loop 188 increases the sampling priority 174 of those instances that are substantially similar or substantially match the instances that are selected and/or annotated by the user. In one implementation, for future sampling, the feedback loop 188 decreases the sampling priority 174 of those instances that are substantially similar or substantially match the instances that are dismissed by the user. The substantial similarity or matching is determined, for example, based on the similarity measures discussed above in the context of the search space 144. Selections and subsequent annotations by the user produce the human-annotated instances 104.

The model 124 is trained on the manually labeled data, i.e., the human-annotated instances 104, a process identified as training 114 in FIG. 1. In some implementations, the model 124 can be retrained using all available annotated data. In other implementations, the model 124 can be fine-tuned on the most recently annotated data-points. Once the model 124 has been trained, the unlabeled instances 120 can be run through the model 124 to update their prioritization scores.

The steps of training 114, inference 122, sampling 132, and label querying 194 are repeated as an iterative process 162 until a convergence condition is met. Examples of the convergence condition include target accuracy of the model 124 on a validation set and complete annotation of the unlabeled instances 120.

Core Set Discovery

Figure 2:
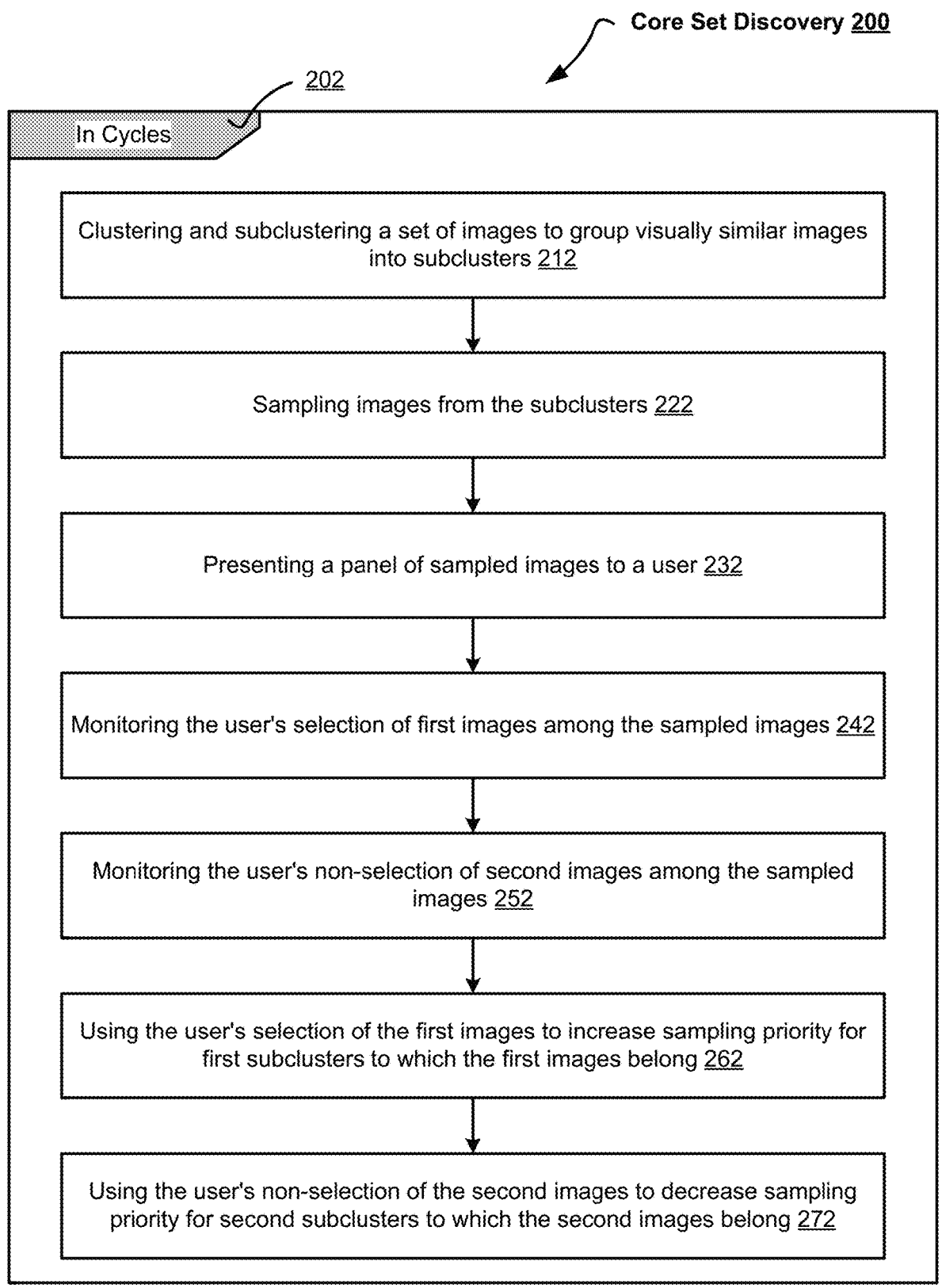
FIG. 2 is a flowchart showing a computer-implemented method of core set discovery.

FIG. 2 is a flowchart 200 showing a computer-implemented method of core set discovery. Flowchart 200 can be implemented at least partially with and/or by one or more processors configured to receive or retrieve information, process the information, store results, and transmit the results. Other implementations may perform the actions in different orders and/or with different, fewer, or additional actions than those illustrated in FIG. 2. Multiple actions can be combined in some implementations. For convenience, this flowchart is described with reference to the system that carries out a method. The system is not necessarily part of the method. The actions of flowchart 200 are executed in cycles 202.

At action 212, a set of images are clustered and subclustered to group visually similar images into subclusters.

At action 222, images from the subclusters are sampled. The images are sampled from the subclusters by one or more sampling logics (e.g., the sampling logic 164).

At action 232, a panel of sampled images is presented to a user. The sampled images are presented to the user with machine annotations. The machine annotations are generated by one or more annotation logics (e.g., the model 124). In one implementation, the machine annotations are bounding boxes drawn around objects-of-interest depicted in the sampled images.

At action 242, the user's selection of first images among the sampled images is monitored.

At action 252, the user's non-selection of second images among the sampled images is monitored.

At action 262, the user's selection of the first images is used to increase sampling priority (e.g., the sampling priority 174) for first subclusters to which the first images belong.

At action 272, the user's non-selection of the second images is used to decrease sampling priority (e.g., the sampling priority 174) for second subclusters to which the second images belong.

In one implementation, the set of images is embedded as vectors in an embedding space (e.g., the search space 144). In one implementation, the annotation logics (e.g., the model 124) cause generation of the vectors.

In some implementations, the sampling priority (e.g., the sampling priority 174) of the first images is increased, and the sampling priority (e.g., the sampling priority 174) of the second images is decreased by updating the sampling logics (e.g., the sampling logic 164) to account for the user's selection of the first images, the user's non-selection of the second images, and/or the user's annotation of the first images.

In some implementations, the sampling logics (e.g., the sampling logic 164) sample the images by sampling the vectors from the embedding space (e.g., the search space 144). In one implementation, the sampling priority (e.g., the sampling priority 174) of the first images is increased, and the sampling priority (e.g., the sampling priority 174) of the second images is decreased by updating the embedding space (e.g., the search space 144) to account for the user's selection of the first images, the user's non-selection of the second images, and/or the user's annotation of the first images.

In one implementation, the embedding space (e.g., the search space 144) is updated by updating the clustering and the subclustering of the vectors. In another implementation, the embedding space (e.g., the search space 144) is updated by retraining the annotation logics (e.g., the model 124) using the user's annotation of the first images as ground truth annotations. In yet another implementation, the retrained annotation logics (e.g., the retrained model 124) cause generation of new vectors for new images that update the embedding space (e.g., the search space 144).

In some implementations, the user's annotation of the first images is monitored. The user's annotation of the first images is used to further increase the sampling priority (e.g., the sampling priority 174) for the first subclusters to which the first images belong. In one implementation, the user's annotation further includes the user drawing bounding boxes around the objects-of-interest depicted in the sampled images. In another implementation, the user's annotation further includes the user modifying the bounding boxes generated by the annotation logics (e.g., the model 124).

In some implementations, the user's selection of the first images is weighted by order of selection. In other implementations, the user's selection of the first images is weighted by selection time.

In some implementations, the sampled images are presented to the user in a ranked order. In one implementation, the ranked order is generated by one or more ranking logics. In one implementation, the ranking logics are updated to account for the user's selection of the first images, the user's non-selection of the second images, and/or the user's annotation of the first images.

In one implementation, the cycles 202 iterate the clustering and the subclustering, the sampling, the presenting, the monitoring the user's selection, the monitoring the user's non-selection, the using the user's selection, and the using the user's non-selection until a convergence condition is satisfied. The cycles 202 further include iteratively retraining the annotation logics (e.g., the model 124) using the user's annotation of the first images as the ground truth annotations. In one implementation, the convergence condition is the retrained annotation logics (e.g., the retrained model 124) exceeding an annotation accuracy threshold on a validation set of images. In another implementation, the convergence condition is a complete annotation of the set of images.

In one implementation, the sampled images are presented to the user as graphic elements that are configured to be selected, dismissed, and annotated by the user.

In one implementation, the annotation logics (e.g., the model 124), the sampling logics (e.g., the sampling logic 164), and the ranking logics are rule-based logics. In another implementation, the annotation logics (e.g., the model 124), the sampling logics (e.g., the sampling logic 164), and the ranking logics are tree-based logics. In yet another implementation, the annotation logics (e.g., the model 124), the sampling logics (e.g., the sampling logic 164), and the ranking logics are neural network-based logics.

Asynchronous Human-In-The-Loop (HITL) Active Learning

Figure 3:
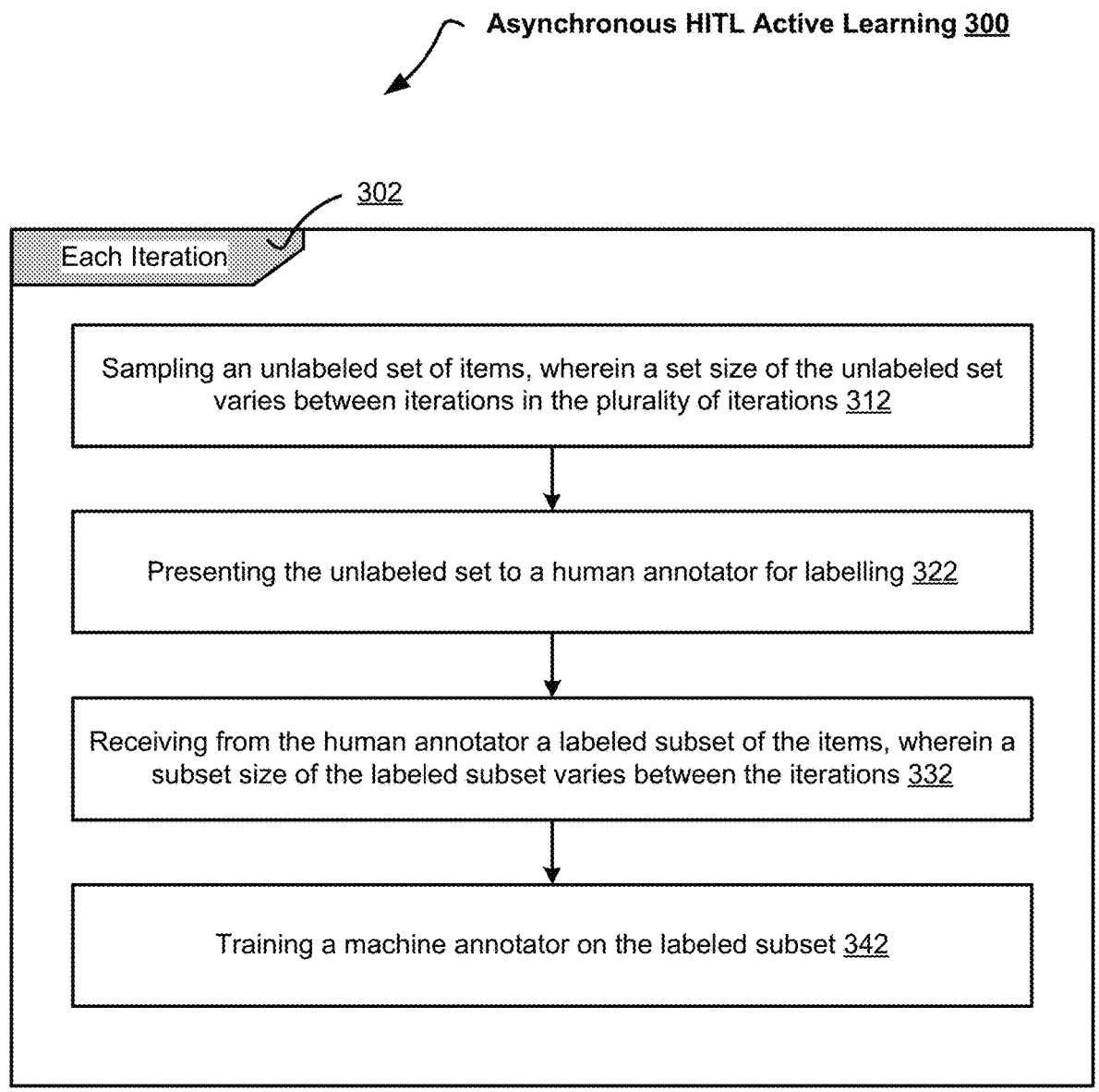
FIG. 3 is a flowchart showing a computer-implemented method of asynchronous human-in-the-loop (HITL) active learning.

FIG. 3 is a flowchart 300 showing a computer-implemented method of asynchronous human-in-the-loop (HITL) active learning. Flowchart 300 can be implemented at least partially with and/or by one or more processors configured to receive or retrieve information, process the information, store results, and transmit the results. Other implementations may perform the actions in different orders and/or with different, fewer, or additional actions than those illustrated in FIG. 3. Multiple actions can be combined in some implementations. For convenience, this flowchart is described with reference to the system that carries out a method. The system is not necessarily part of the method. The actions of flowchart 300 are executed in a plurality of iterations 302 of the HITL active learning. Each of the iterations 302 includes the following actions 312-342.

Different from synchronous HITL active learning that requires sampling of a fixed batch size of instances and human labelling of the entirety of the fixed batch instance, the disclosed asynchronous HITL active learning can vary the number of instances selected in each sampling iteration and can receive annotations for a subset of the sampled batch.

At action 312, an unlabeled set of items is sampled. A set size (e.g., N) of the unlabeled set varies between iterations in the plurality of iterations 302. For example, in the case of sampled images, ten images can be sampled in iteration i, fifty images can be sampled in iteration i++, and seventy images can be sampled in iteration i+++.

At action 322, the unlabeled set is presented to a human annotator for labelling.

At action 332, a labeled subset of the items is received from the human annotator. A subset size (e.g., M) of the labeled subset varies between the iterations 302, with M<N. The human annotator is not required to label the entirety of the unlabeled set of items. The human annotator can dismiss some of the items in the unlabeled set (e.g., the dismissal 196), and select and label some other items in the unlabeled set (e.g., the selection 186 and the annotation 198). Also, the number of items dismissed by the human annotator can vary between the iterations 302. Similarly, the number of items labelled by the human annotator can vary between the iterations 302.

At action 342, a machine annotator (e.g., the model 124) is trained on the labeled subset. Since the number of items labelled by the human annotator can vary between the iterations 302, the number of training examples/instances on which the machine annotator (e.g., the model 124) is trained in each successive training iteration (e.g., the training 114) can also vary between the iterations 302.

Core Frame Set Construction

Figure 4:
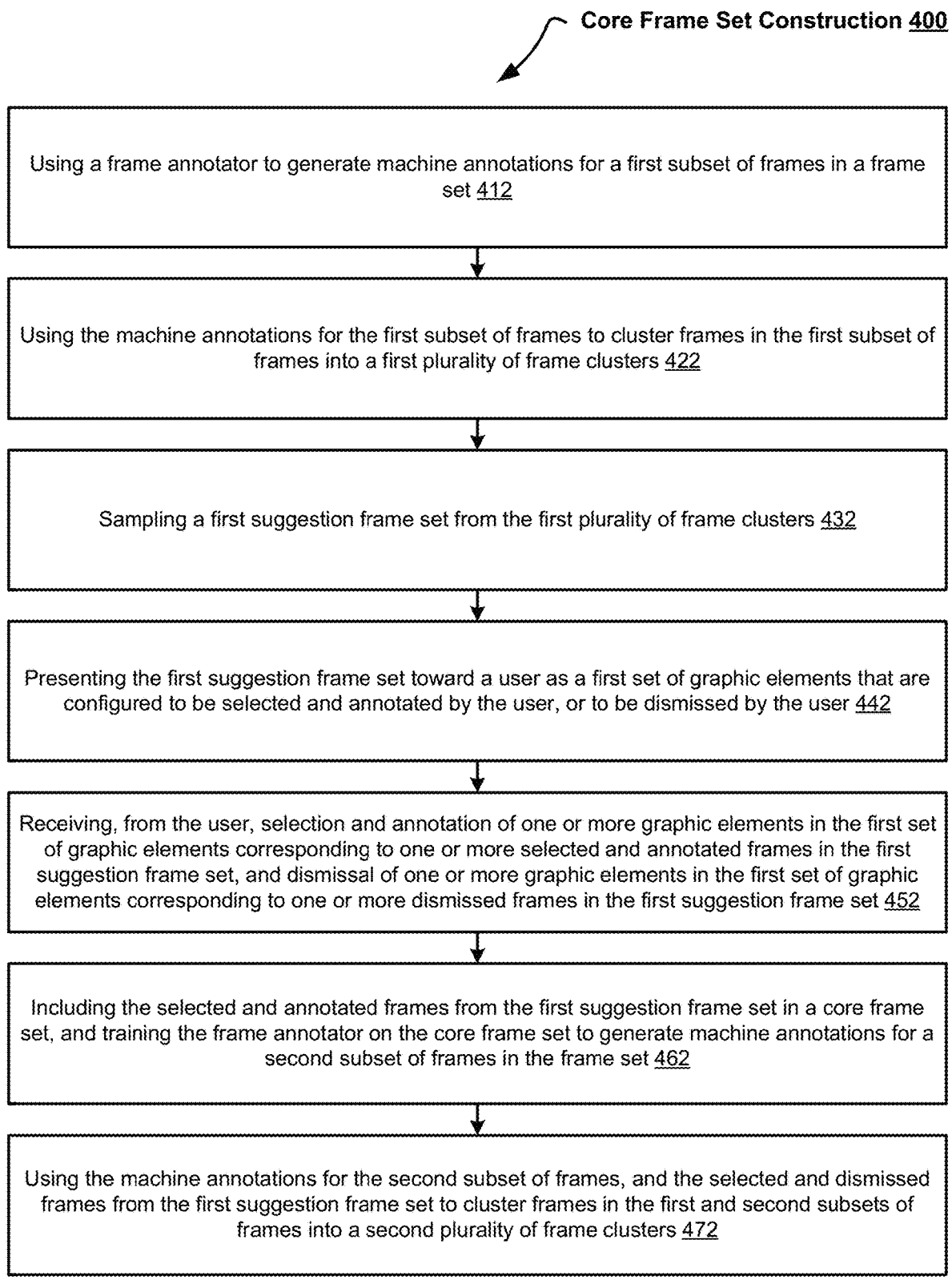
FIG. 4 is a flowchart showing a computer-implemented method of construction a core frame set for training a frame annotator.

FIG. 4 is a flowchart 400 showing a computer-implemented method of construction a core frame set for training a frame annotator (e.g., the model 124). Flowchart 400 can be implemented at least partially with and/or by one or more processors configured to receive or retrieve information, process the information, store results, and transmit the results. Other implementations may perform the actions in different orders and/or with different, fewer, or additional actions than those illustrated in FIG. 4. Multiple actions can be combined in some implementations. For convenience, this flowchart is described with reference to the system that carries out a method. The system is not necessarily part of the method.

At action 412, the frame annotator (e.g., the model 124) is used to generate machine annotations (e.g., the machine-annotated instances 154) for a first subset of frames in a frame set.

At action 422, the machine annotations (e.g., the machine-annotated instances 154) are used for the first subset of frames to cluster frames in the first subset of frames into a first plurality of frame clusters.

At action 432, a first suggestion frame set (e.g., the sampled instances 184) are sampled from the first plurality of frame clusters.

At action 442, the first suggestion frame set (e.g., the sampled instances 184) is presented toward a user as a first set of graphic elements that are configured to be selected (e.g., the selection 186) and annotated (e.g., the annotation 198) by the user, or to be dismissed (e.g., the dismissal 196) by the user.

At action 452, selection (e.g., the selection 186) and annotation (e.g., the annotation 198) of one or more graphic elements in the first set of graphic elements corresponding to one or more selected and annotated frames in the first suggestion frame set is received from the user.

Also, at action 452, dismissal (e.g., the dismissal 196) of one or more graphic elements in the first set of graphic elements corresponding to one or more dismissed frames in the first suggestion frame set is received from the user.

At action 462, the selected and annotated frames from the first suggestion frame set are included in a core frame set, and the frame annotator (e.g., the model 124) is trained on the core frame set to generate machine annotations (e.g., the machine-annotated instances 154) for a second subset of frames in the frame set.

At action 472, the machine annotations (e.g., the machine-annotated instances 154) for the second subset of frames, and the selected and dismissed frames from the first suggestion frame set are used to cluster frames in the first and second subsets of frames into a second plurality of frame clusters.

Then, a second suggestion frame set is sampled from the second plurality of frame clusters.

Then, the second suggestion frame set is presented toward the user as a second set of graphic elements that are configured to be selected and annotated by the user, or to be dismissed by the user.

Then, selection and annotation of one or more graphic elements in the second set of graphic elements corresponding to one or more selected and annotated frames in the second suggestion frame set, and dismissal of one or more graphic elements in the second set of graphic elements corresponding to one or more dismissed frames in the second suggestion frame set is received from the user.

Then, the selected and annotated frames from the second suggestion frame set are included in the core frame set, and the frame annotator is further trained on the core frame set to generate machine annotations for a third subset of frames in the frame set.

Then, the machine annotations for the third subset of frames, and the selected and dismissed frames from the second suggestion frame set are used to cluster frames in the first, second, and third subsets of frames into a third plurality of frame clusters.

Core Set Generation

Figure 5:
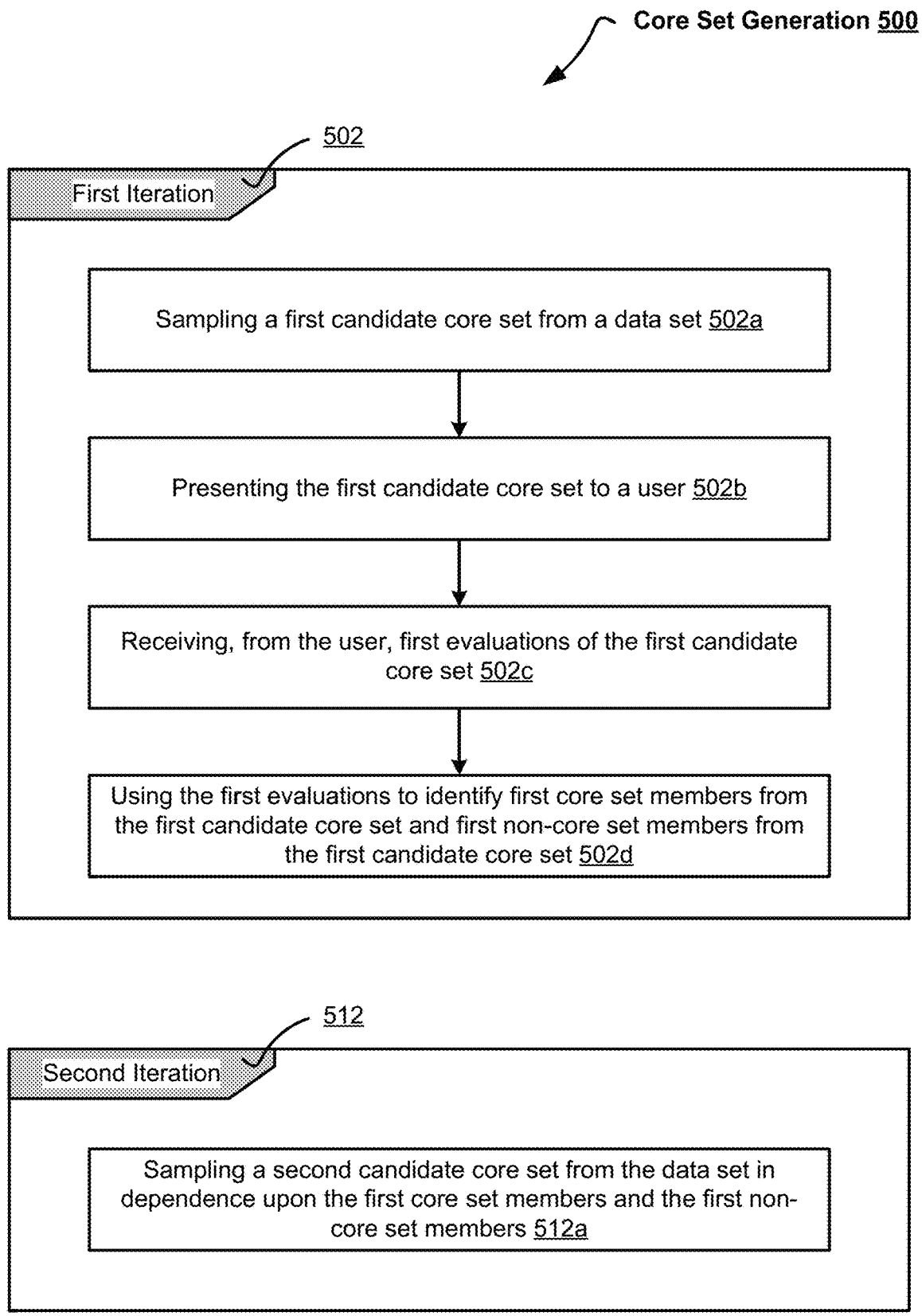
FIG. 5 is a flowchart showing a computer-implemented method of core set generation.

FIG. 5 is a flowchart 500 showing a computer-implemented method of core set generation. Flowchart 500 can be implemented at least partially with and/or by one or more processors configured to receive or retrieve information, process the information, store results, and transmit the results. Other implementations may perform the actions in different orders and/or with different, fewer, or additional actions than those illustrated in FIG. 5. Multiple actions can be combined in some implementations. For convenience, this flowchart is described with reference to the system that carries out a method. The system is not necessarily part of the method. The actions of flowchart 500 are executed in iterations.

At a first iteration 502, the following actions are executed.

At action 502a, a first candidate core set is sampled from a data set.

At action 502b, the first candidate core set is presented to a user. The first candidate core set is presented to the user as user interface elements that are configured to be selected, dismissed, and annotated by the user.

At action 502c, first evaluations of the first candidate core set are received from the user. The first evaluations are interactions of the user with the first candidate core set via the user interface elements. The first evaluations include selection (e.g., the selection 186) of at least one core set member from the first candidate core set by the user. The first evaluations include non-selection (e.g., the dismissal 196) of at least one non-core set member from the first candidate core set by the user. The first evaluations include labelling (e.g., the annotation 198) of at least one core set member from the first candidate core set by the user.

At action 502d, the first evaluations are used to identify first core set members from the first candidate core set, and first non-core set members from the first candidate core set.

At a second iteration 512 that succeeds the first iteration 502, the following action is executed. At action 512a, a second candidate core set is sampled from the data set in dependence upon the first core set members and the first non-core set members.

In one implementation, the first and second candidate core sets are sampled from clustered members of the data set that are clustered into a plurality of clusters. In some implementations, the clustered members are clustered into the plurality of clusters in an embedding space that embeds vectorized and compressed representations of the clustered members. In some implementations, the first and second candidate core sets are sampled from the embedding space.

Configured Human-In-The-Loop (HITL) Active Learning

Figure 6:
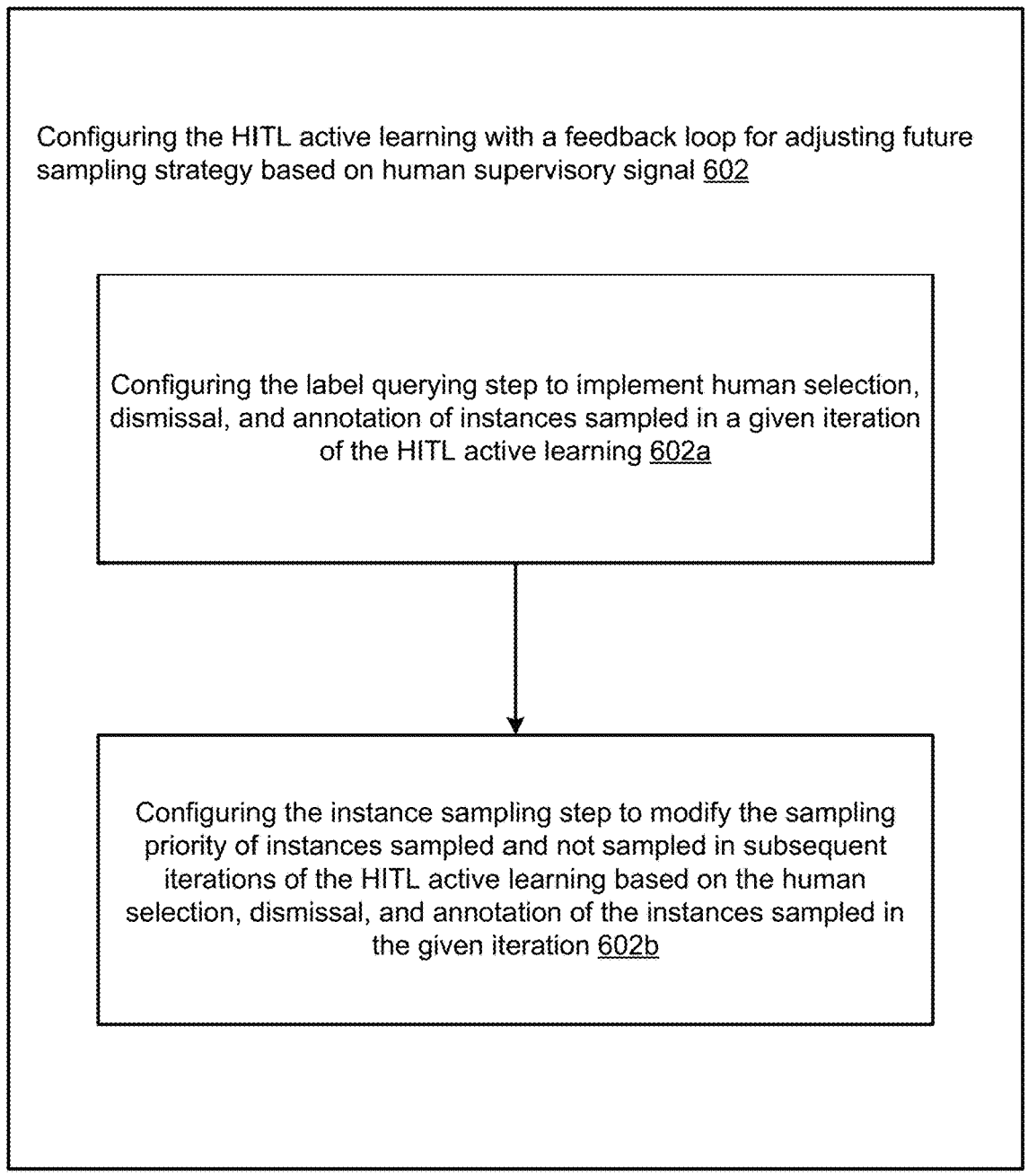
FIG. 6 is a flowchart showing a computer-implemented method of configuring human-in-the-loop (HITL) active learning with a feedback loop.

FIG. 6 is a flowchart 600 showing a computer-implemented method of configuring human-in-the-loop (HITL) active learning with a feedback loop. Flowchart 600 can be implemented at least partially with and/or by one or more processors configured to receive or retrieve information, process the information, store results, and transmit the results. Other implementations may perform the actions in different orders and/or with different, fewer, or additional actions than those illustrated in FIG. 6. Multiple actions can be combined in some implementations. For convenience, this flowchart is described with reference to the system that carries out a method. The system is not necessarily part of the method. The actions of flowchart 600 are executed in iterations.

Action 602 includes configuring the HITL active learning with a feedback loop for adjusting future sampling strategy based on human supervisory signal. The HITL active learning includes (i) a model training step (e.g., training 114) that trains a model on a labeled set, (ii) an instance sampling step (e.g., sampling 132) that samples instances from an unlabeled set based on a sampling priority (e.g., the sampling priority 174), and (iii) a label querying step (e.g., label querying 194) that generates human annotations for the sampled instances and adds human-annotated instances to the labeled set.

Action 602a includes configuring the label querying step (e.g., label querying 194) to implement human selection (e.g., the selection 186), dismissal (e.g., the dismissal 196), and annotation (e.g., the annotation 198) of instances sampled in a given iteration of the HITL active learning.

Action 602b includes configuring the instance sampling step (e.g., sampling 132) to modify the sampling priority (e.g., the sampling priority 174) of instances sampled and not sampled in subsequent iterations of the HITL active learning based on the human selection (e.g., the selection 186), dismissal (e.g., the dismissal 196), and annotation (e.g., the annotation 198) of the instances sampled in the given iteration.

In one implementation, instances that are sampled in the given iteration and are selected and annotated by the human have a first configuration. In such an implementation, the sampling priority is increased of subsequently sampled instances with configurations that substantially match the first configuration.

In one implementation, instances that are sampled in the given iteration and are dismissed by the human have a second configuration. In such an implementation, the sampling priority is decreased of subsequently sampled instances with configurations that substantially match the second configuration.

Examples of configurations of the instances include images, image size, image features, convolved features, pixel intensity values, feature values, dimensions, dimension values, vector values, tensor, tensor values, and metadata.

In one implementation, the instances are embedded in an embedding space. In such an implementation, distances among the instances in the embedding space are a measure of matching of the instances. In various implementations, the distances are measured using one of the Manhattan distance, the Euclidean distance, the Hamming distance, and the Mahalanobis distance.

User Interface to Receive Multiple Fast Feedbacks

Figure 7:
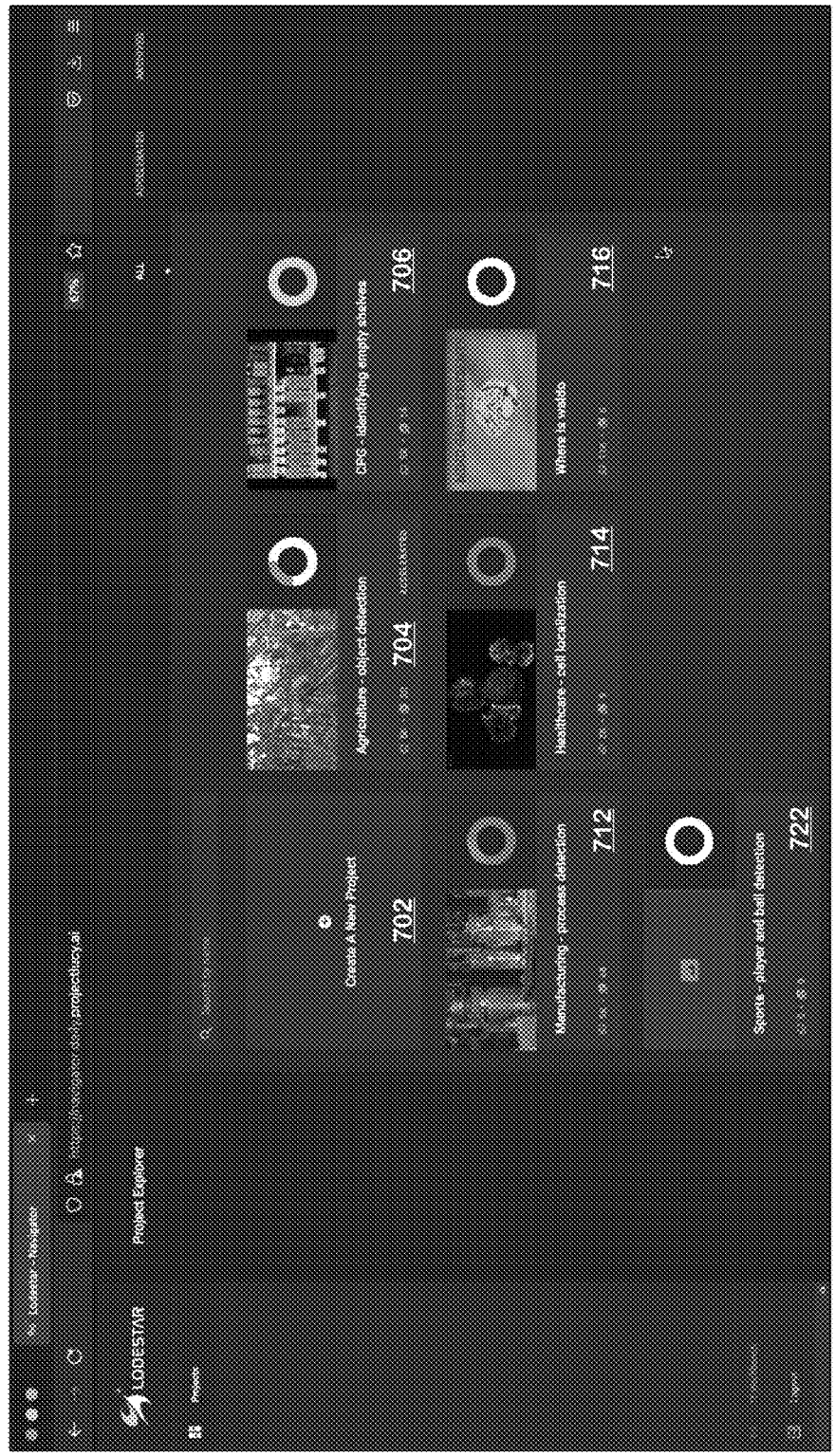
FIG. 7 depicts an example user interface that can be used to present new projects (or datasets) to a human oracle (user) for object annotation, as part of the disclosed HITL active learning.

FIG. 7 depicts an example user interface 700 that can be used to present new projects (or datasets) 702 to a human oracle (user) for object annotation, as part of the disclosed HITL active learning. As shown in FIG. 7, multiple videos (or projects or datasets) 704, 706, 712, 714, 716, and 722 can be uploaded or otherwise selected for frame-level object annotations by the human oracle. The resulting annotated frames can be used as ground truth for training a machine annotator (e.g., the model 124).

In some implementations, the multiple videos (or projects or datasets) 704, 706, 712, 714, 716, and 722 can relate to a same classification task (e.g., object annotation). In other implementations, the videos (or projects or datasets) 704, 706, 712, 714, 716, and 722 can relate to different classification tasks (e.g., image captioning, object annotation, image attribution, translation).

In some implementations, the multiple videos (or projects or datasets) 704, 706, 712, 714, 716, and 722 can relate to a same use case (e.g., depicting same object types in a same scene setting (e.g., green tomatoes in an orchard)). In other implementations, the videos (or projects or datasets) 704, 706, 712, 714, 716, and 722 can relate to different use cases (e.g., depicting different object types in different scene settings (e.g., laundry detergents in a store aisle, humans in a pharmacy, cell localization, green tomatoes in an orchard)).

In some implementations, the model 124 can be trained on the multiple videos (or projects or datasets) 704, 706, 712, 714, 716, and 722 to learn spatial and temporal contexts, relationships, dependencies, causalities, correlations, and/or patterns as per which different objects (of a same type or of different types) are arranged in different scene settings with respect to their immediate and extended environments (e.g., with respect to other objects and backgrounds). In other implementations, different models can be trained on different videos (or projects or datasets).

Figure 8:
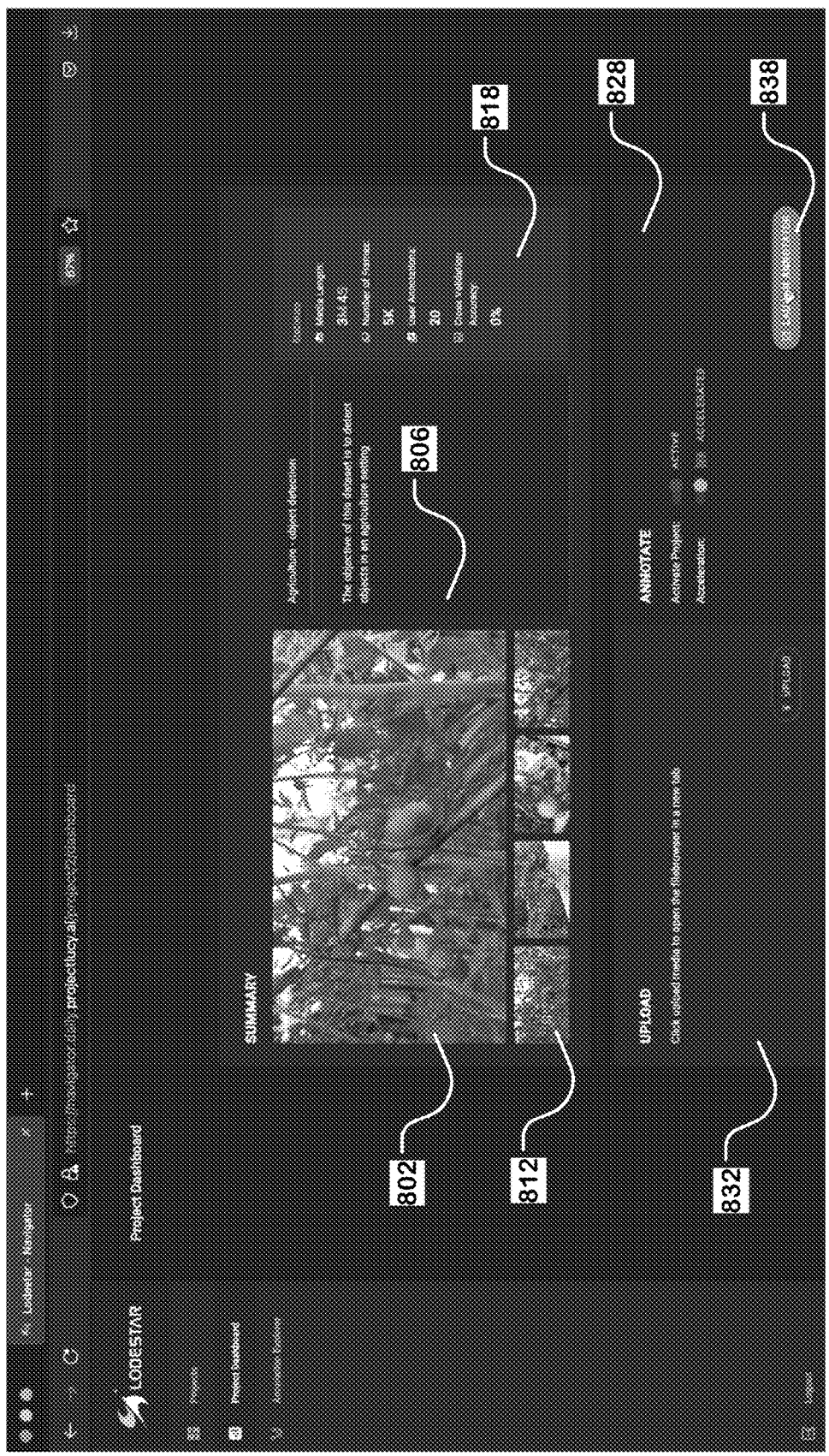
FIG. 8 depicts FIG. 7's video, titled "Agriculture—object detection," configured for annotation by the human oracle.

FIG. 8 depicts the video 704, titled "Agriculture—object detection," configured for annotation by the human oracle. The video 704 depicts green tomatoes on green plants in an orchard. Panel 818 shows that the video 704 has 5000 frames and that the human oracle is tasked with annotating up to 20 frames out of the 5000 frames. Panel 806 conveys that the objective of the dataset 704 is to detects objects (green tomatoes) in an agriculture setting.

Panel 802 shows the frame-under-analysis. Panel 812 shows the sampled frames from the videos 704 that are suggested to the human oracle for annotation. The sampled frames queued in the panel 812 are identified by the sampling logic 164, as discussed above.

Panel 832 can be used to upload a new media (e.g., new video, new frame). Panel 828 allows the human oracle to set the settings for the annotation exercise (e.g., active v/s non-active, accelerated v/s non-accelerated). Button 838 launches the annotator.

Figure 9:
FIG. 9 depicts annotation of green tomatoes on green plants according to one implementation of the technology disclosed.

FIG. 9 depicts annotation of green tomatoes on green plants according to one implementation of the technology disclosed. Panel 902 shows the frame-under-analysis that is selected by the human oracle for possible annotation. Panel 912 shows the sampled frames from the videos 704 that are suggested to the human oracle for annotation. The sampled frames queued in the panel 912 are identified by the sampling logic 164, as discussed above. The sampled frames can be browsed and played forward and backward using the frame navigator 918. Panel 908 shows the different objects (e.g., peas, tomatoes) in the video 704 that can be annotated, and/or a specific object-type (e.g., tomato) that is the subject of the frames-under-analysis.

Figure 10:
FIG. 10 depicts annotation of a first object (e.g., a first tomato) in FIG. 7's video using a bounding box drawn by the human oracle.

FIG. 10 depicts annotation of a first object (e.g., a first tomato) in the video 704 using a bounding box 1002 drawn by the human oracle. Frame-under-analysis 1008 is selected by the human oracle for annotation from the sampled frames 1012.

Figure 11:
FIG. 11 depicts annotation of a second object (e.g., a second tomato) in FIG. 7's video using a bounding box drawn by the human oracle.

FIG. 11 depicts annotation of a second object (e.g., a second tomato) in the video 704 using a bounding box 1102 drawn by the human oracle. Button 1114 is configured to enable the human oracle to confirm/submit the bounding boxes drawn by the human oracle for use as ground truth labels for training the model 124 as part of the disclosed HITL active learning.

Frame-under-analysis 1108 is selected by the human oracle for annotation from the sampled frames 1112. In the illustrated implementation, the sampled frames 1112 include a group of visually similar images, identified in FIG. 11 by the label "NEAREST."

Figure 12:
FIG. 12 depicts annotation of a third object (e.g., a third tomato) in FIG. 7's video using a bounding box drawn by the human oracle.

FIG. 12 depicts annotation of a third object (e.g., a third tomato) in the video 704 using a bounding box 1202 drawn by the human oracle. Button 1214 is configured to enable the human oracle to confirm/submit the bounding boxes drawn by the human oracle for use as ground truth labels for training the model 124 as part of the disclosed HITL active learning.

Frame-under-analysis 1208 is selected by the human oracle for annotation from the sampled frames 1212. In the illustrated implementation, the sampled frames 1212 include a group of visually similar images, identified in FIG. 12 by the label "NEAREST."

Figure 13:
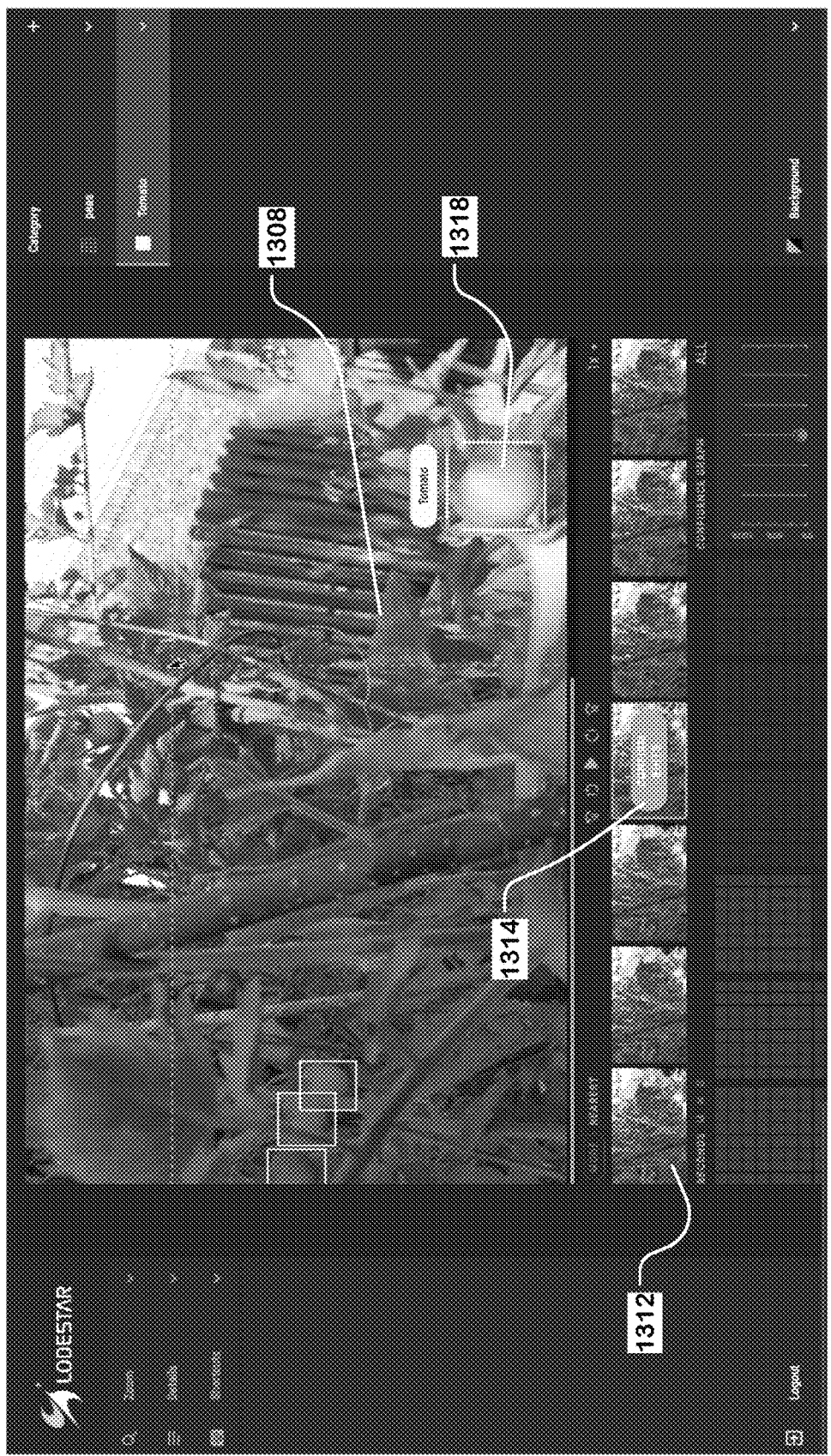
FIG. 13 depicts annotation of a fourth object (e.g., a fourth tomato) in FIG. 7's video using a bounding box drawn by the human oracle.

FIG. 13 depicts annotation of a fourth object (e.g., a fourth tomato) in the video 704 using a bounding box 1318 drawn by the human oracle. Button 1314 is configured to enable the human oracle to confirm/submit the bounding boxes drawn by the human oracle for use as ground truth labels for training the model 124 as part of the disclosed HITL active learning.

Frame-under-analysis 1308 is selected by the human oracle for annotation from the sampled frames 1312. In the illustrated implementation, the sampled frames 1312 include a group of visually similar images, identified in FIG. 13 by the label "NEAREST."

Figure 14:
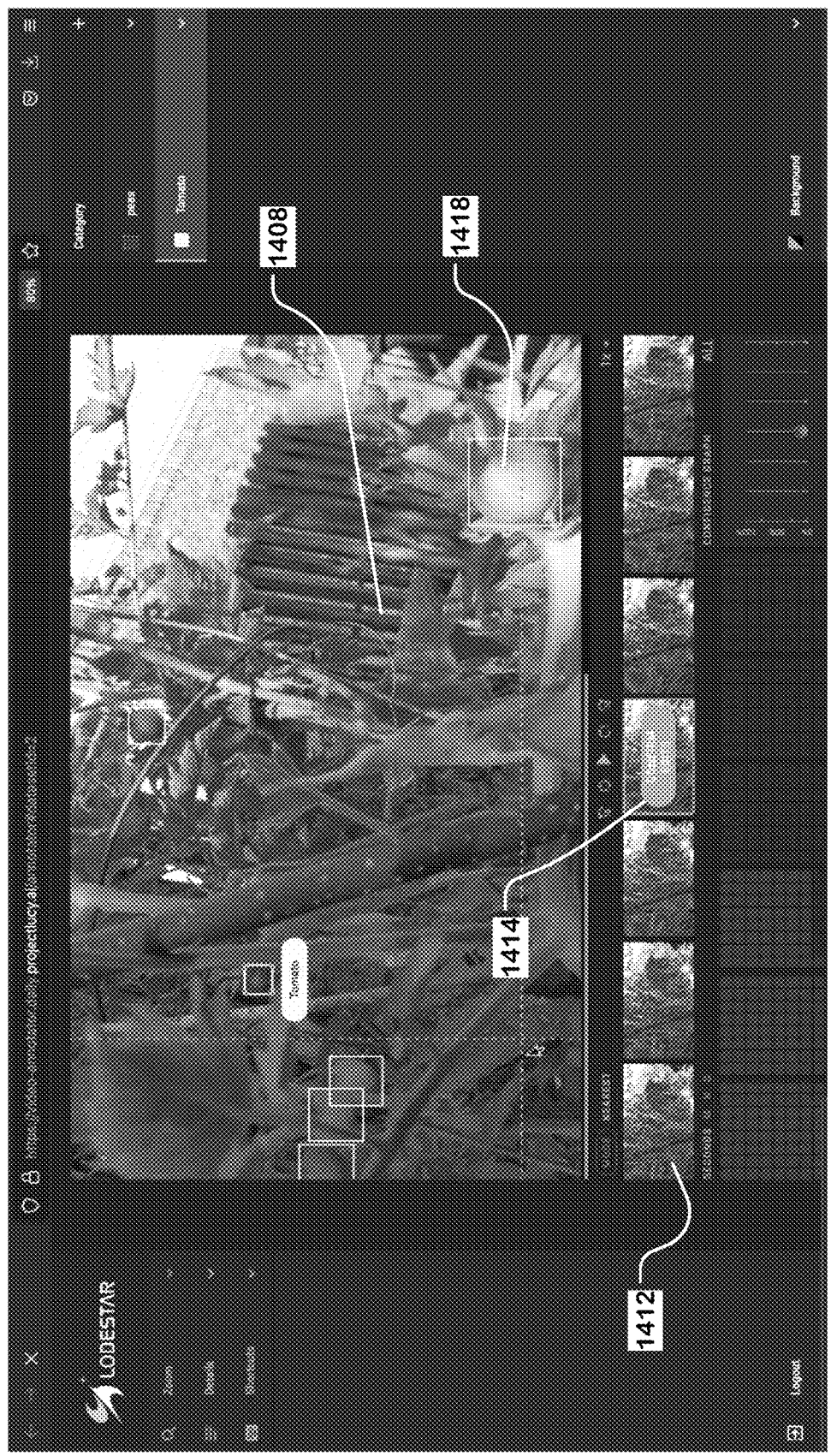
FIG. 14 depicts annotation of a fifth object (e.g., a fifth tomato) in FIG. 7's video using a bounding box drawn by the human oracle.

FIG. 14 depicts annotation of a fifth object (e.g., a fifth tomato) in the video 704 using a bounding box 1418 drawn by the human oracle. Button 1414 is configured to enable the human oracle to confirm/submit the bounding boxes drawn by the human oracle for use as ground truth labels for training the model 124 as part of the disclosed HITL active learning.

Frame-under-analysis 1408 is selected by the human oracle for annotation from the sampled frames 1412. In the illustrated implementation, the sampled frames 1412 include a group of visually similar images, identified in FIG. 14 by the label "NEAREST."

In some implementations, the frames-under-analysis and the sampled frames in FIGS. 11, 12, 13, and 14 are the same.

Figure 15:
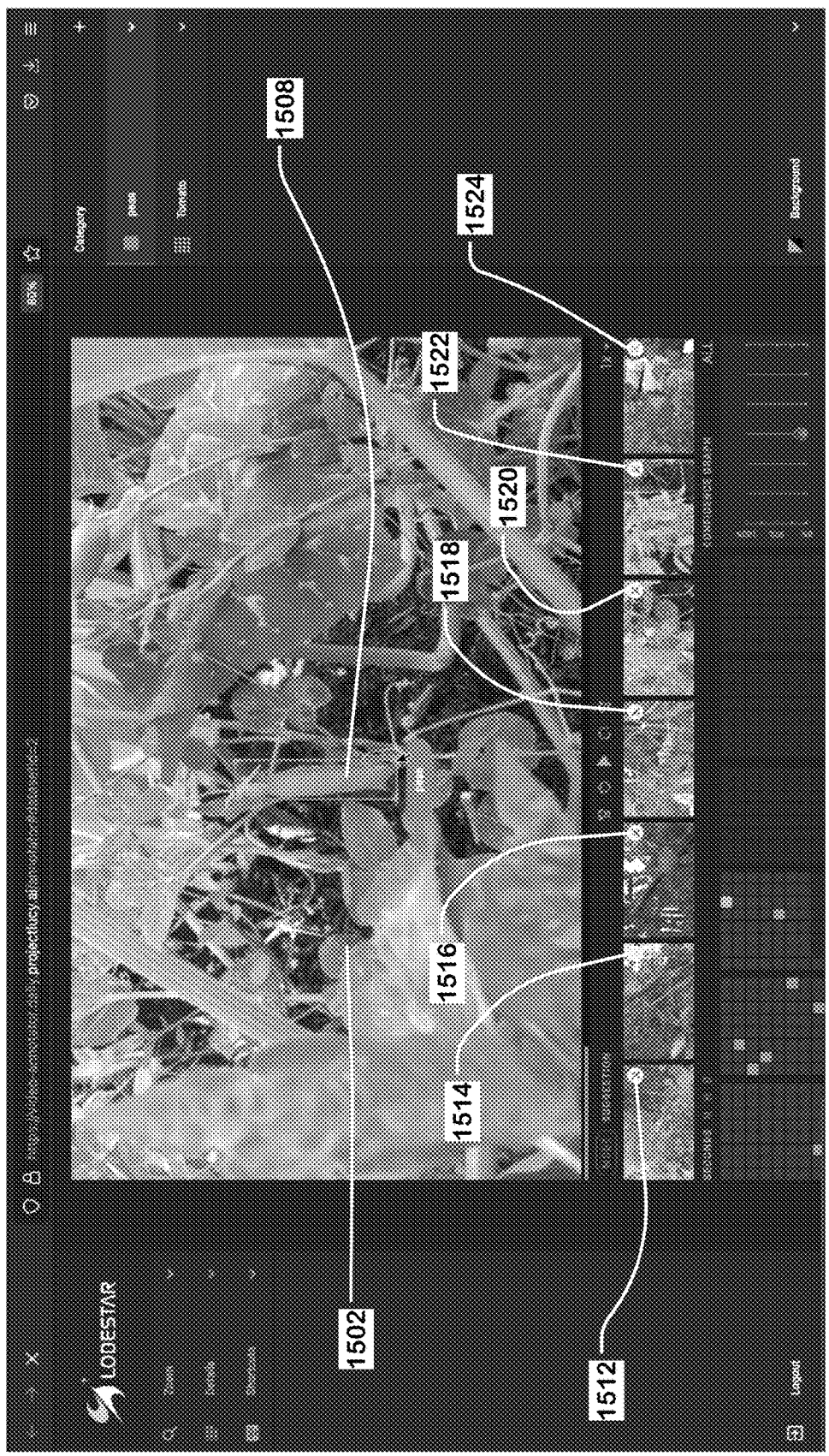
FIG. 15 depicts annotation of a pea object in FIG. 7's video using a bounding box drawn by the human oracle.

FIG. 15 depicts annotation of a pea object in the video 704 using a bounding box 1508 drawn by the human oracle. Frame-under-analysis 1502 is selected by the human oracle for annotation from the sampled frames 1512. FIG. 15 also depicts "cross" symbols 1514, 1516, 1518, 1520, 1522, and 1524 that are configured to dismiss the corresponding suggested frames in the suggestion queue that presents the sampled frames 1512.

Figure 16:
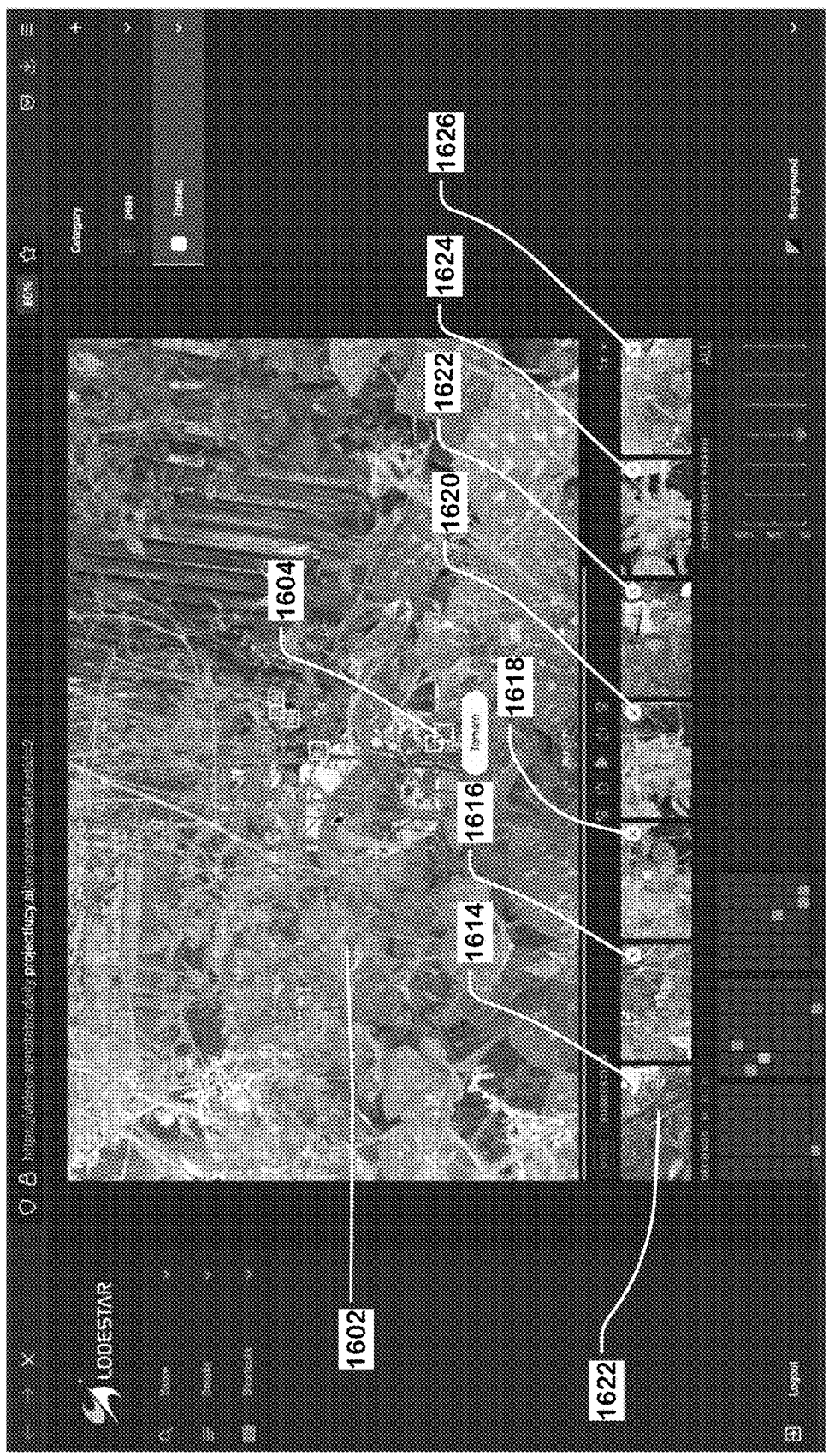
FIG. 16 depicts annotation of a tomato object in FIG. 7's video using a bounding box drawn by the human oracle.

FIG. 16 depicts annotation of a tomato object in the video 704 using a bounding box 1604 drawn by the human oracle. Frame-under-analysis 1602 is selected by the human oracle for annotation from the sampled frames 1622. FIG. 16 also depicts "cross" symbols 1614, 1616, 1618, 1620, 1622, 1624, and 1626 that are configured to dismiss the corresponding suggested frames in the suggestion queue that presents the sampled frames 1622.

Figure 17:
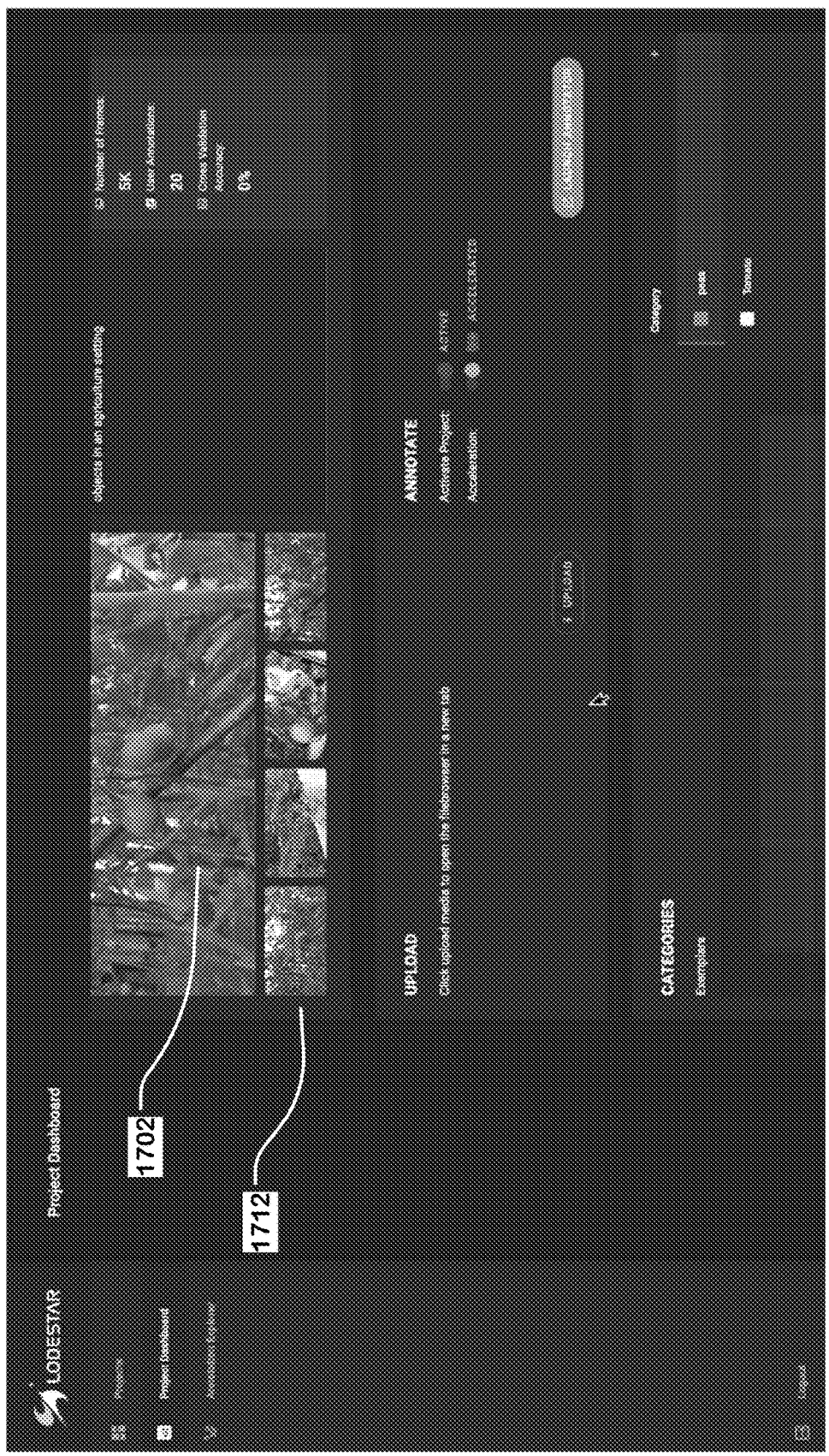
FIG. 17 shows an exemplar frame in FIG. 7's video selected by the human oracle to specify a core set frame.

FIG. 17 shows an exemplar frame 1702 in the video 704 selected by the human oracle to specify a core set frame. The exemplar frame 1702 is selected by the human oracle from an exemplar queue 1712 of potential core set frames. Core set frames specified by the human oracle are used to identify other similar frames whose sampling priority is increased for future sampling and subsequent training of the model 124.

Figure 18:
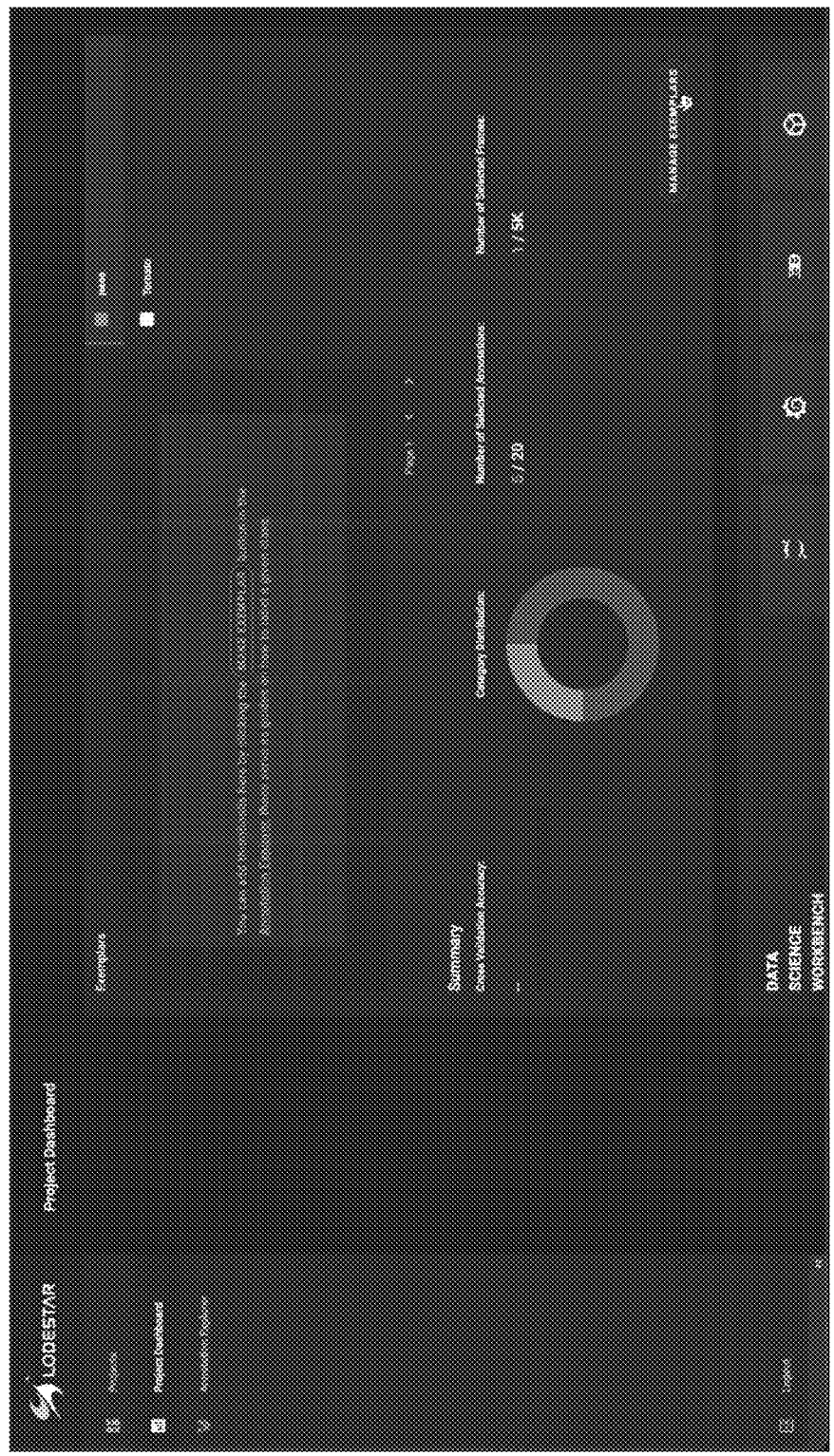
FIG. 18 shows an example interface that allows the human oracle to add an exemplar frame for the use case relating to annotation of green tomatoes on green plants.

FIG. 18 shows an example interface 1800 that allows the human oracle to add an exemplar frame for the use case relating to annotation of green tomatoes on green plants in the video 704.

Figure 19:
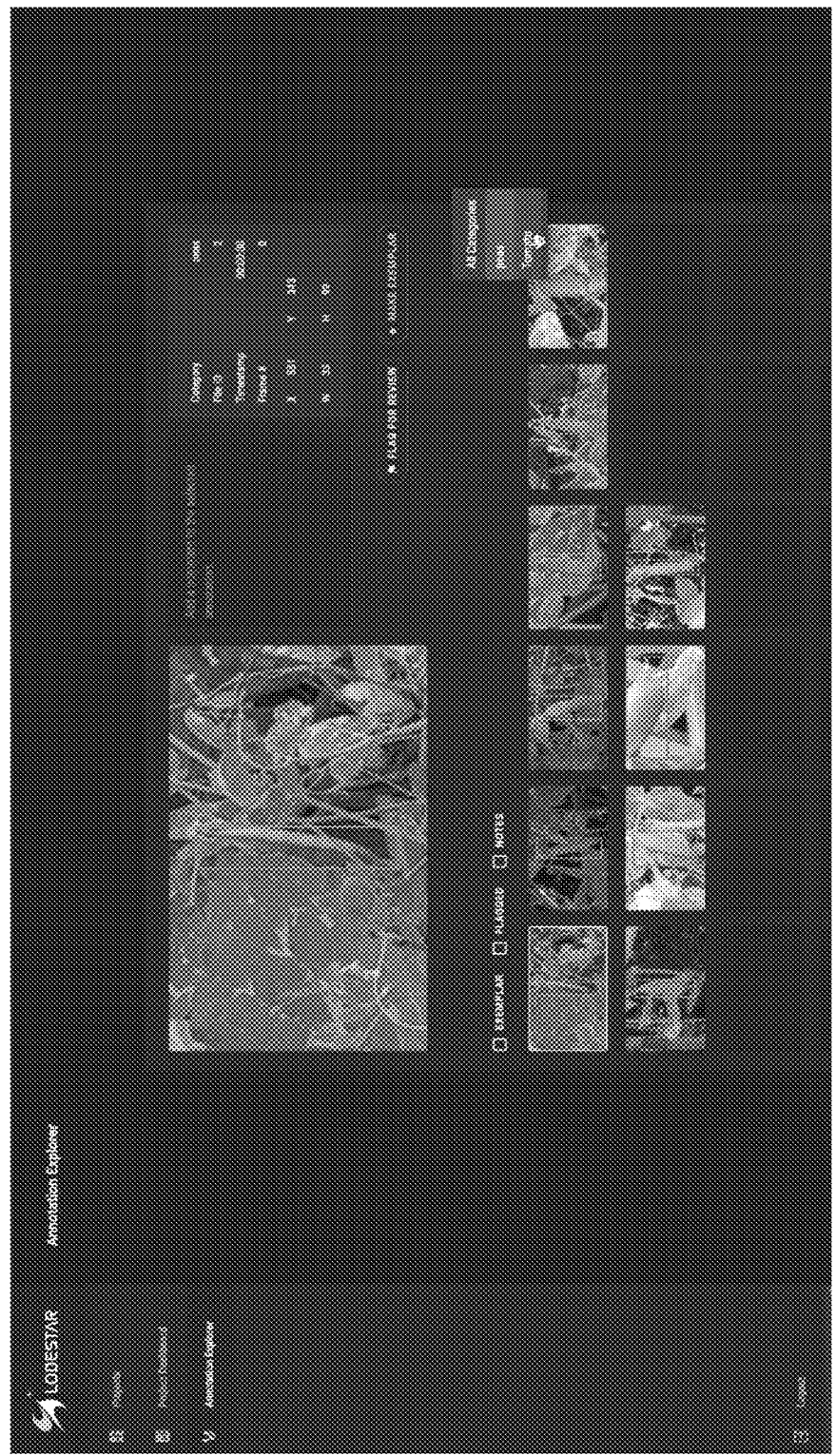
FIG. 19 shows an example interface that allows the human oracle to specify exemplar frames as core set frames, specify non-exemplar frames as non-core set frames, and provide notes for certain frames.

FIG. 19 shows an example interface 1900 that allows the human oracle to specify exemplar frames as core set frames, specify non-exemplar frames as non-core set frames, and provide notes for certain frames. Non-core set frames specified by the human oracle are used to identify other similar frames whose sampling priority is decreased for future sampling and subsequent training of the model 124.

Figure 20:
FIG. 20 shows another example interface that allows the human oracle to specify exemplar frames as core set frames, specify non-exemplar frames as non-core set frames and flag them for review, and provide notes for certain frames for the use case relating to annotation of green tomatoes on green plants.

FIG. 20 shows another example interface 2000 that allows the human oracle to specify exemplar frames as core set frames, specify non-exemplar frames as non-core set frames and flag them for review, and provide notes for certain frames for the use case relating to annotation of green tomatoes on green plants.

Figure 21:
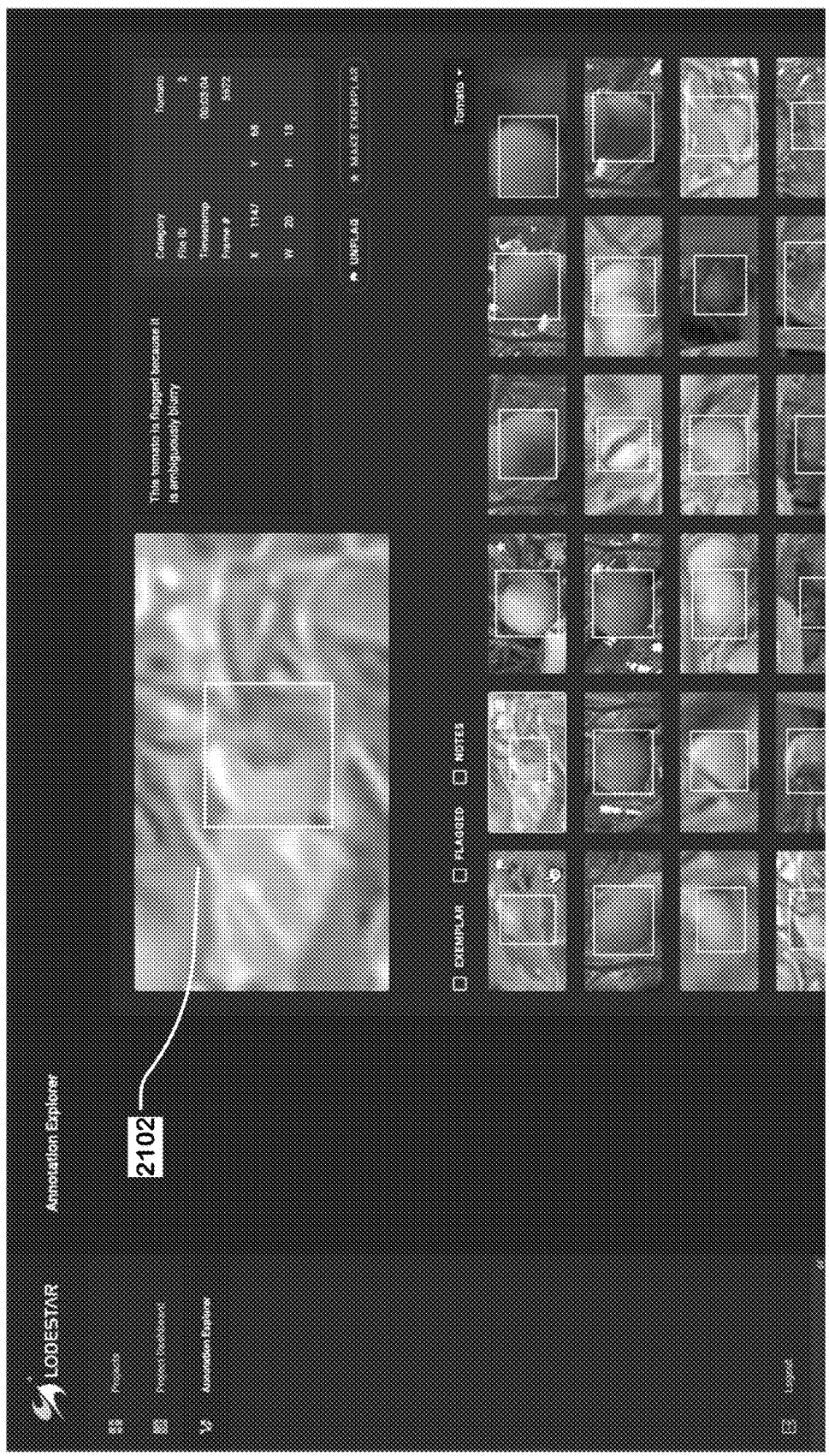
FIG. 21 shows a flagged frame that is flagged by the human oracle as a non-core set member because the target object (e.g., the green tomato) in the flagged frame is blurry and therefore ambiguous.

FIG. 21 shows a flagged frame 2102 that is flagged by the human oracle as a non-core set member because the target object (e.g., the green tomato) in the flagged frame 2102 is blurry and therefore ambiguous.

Figure 22:
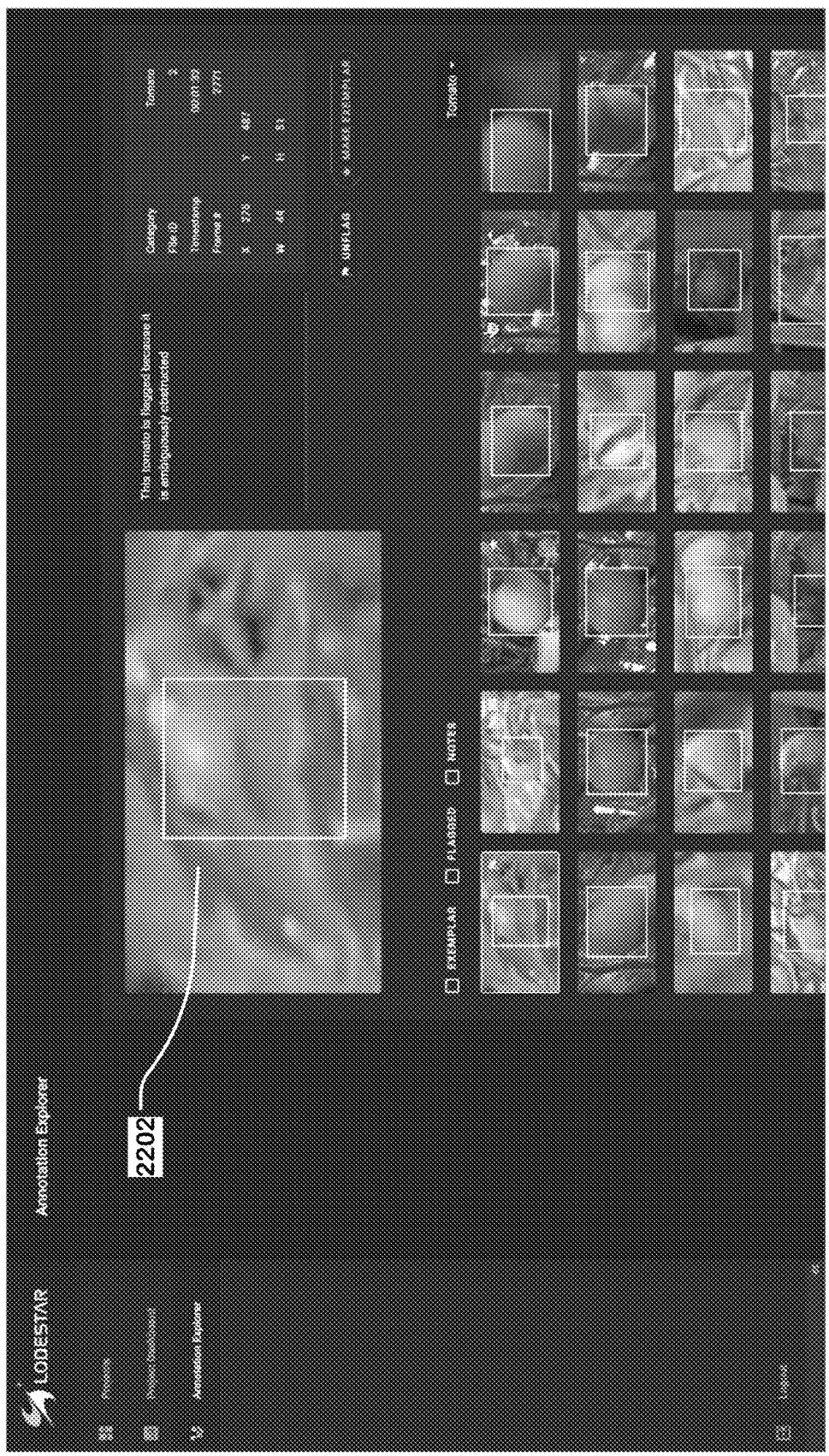
FIG. 22 shows a flagged frame that is flagged by the human oracle as a non-core set member because the target object (e.g., the green tomato) in the flagged frame is obstructed and therefore ambiguous.

FIG. 22 shows a flagged frame 2202 that is flagged by the human oracle as a non-core set member because the target object (e.g., the green tomato) in the flagged frame 2202 is obstructed and therefore ambiguous.

Figure 23:
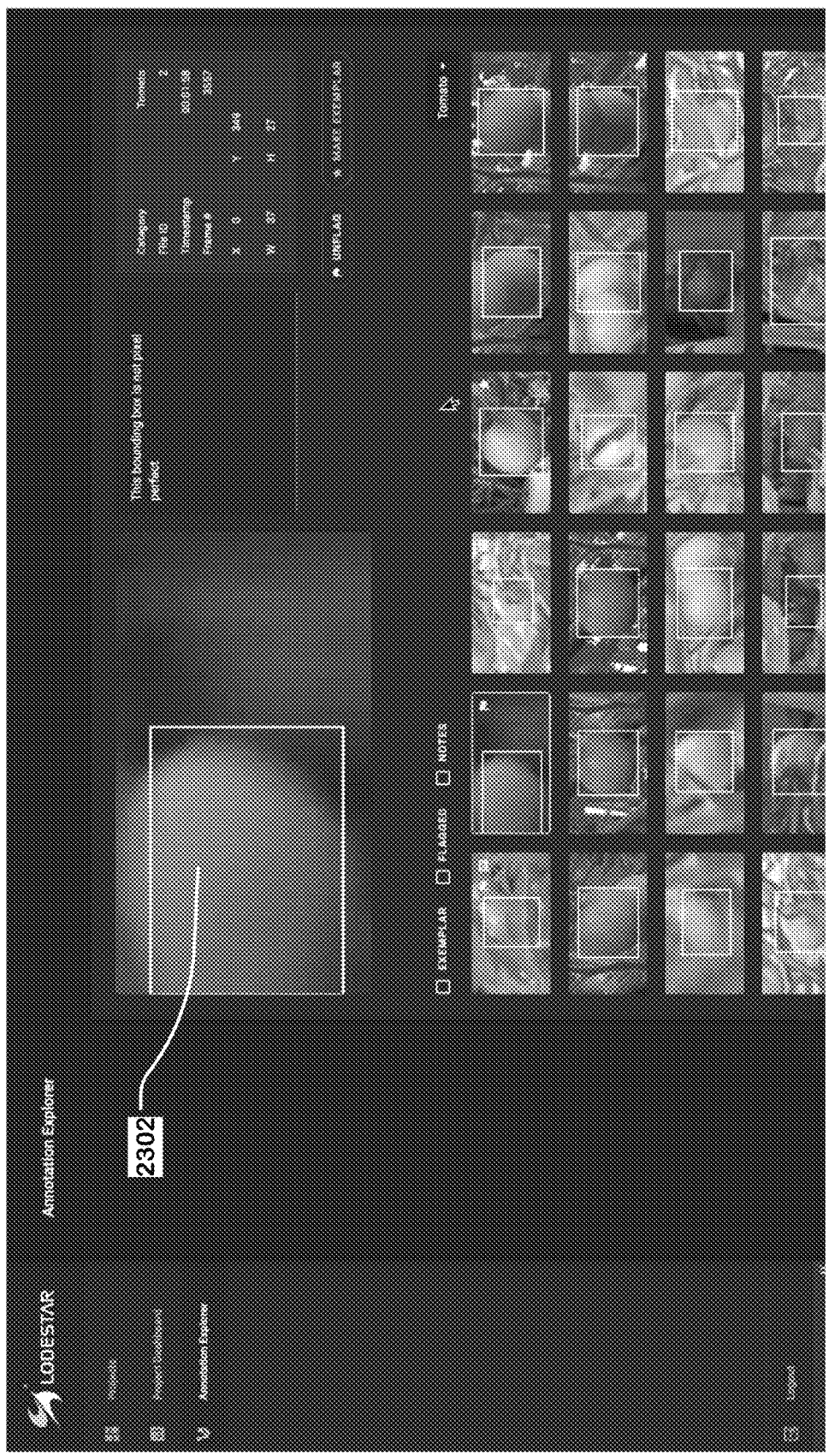
FIG. 23 shows a flagged frame that is flagged by the human oracle as a non-core set member because the bounding box in the flagged frame is not pixel and therefore ambiguous.

FIG. 23 shows a flagged frame 2302 that is flagged by the human oracle as a non-core set member because the bounding box in the flagged frame 2302 is not pixel and therefore ambiguous.

Figure 24:
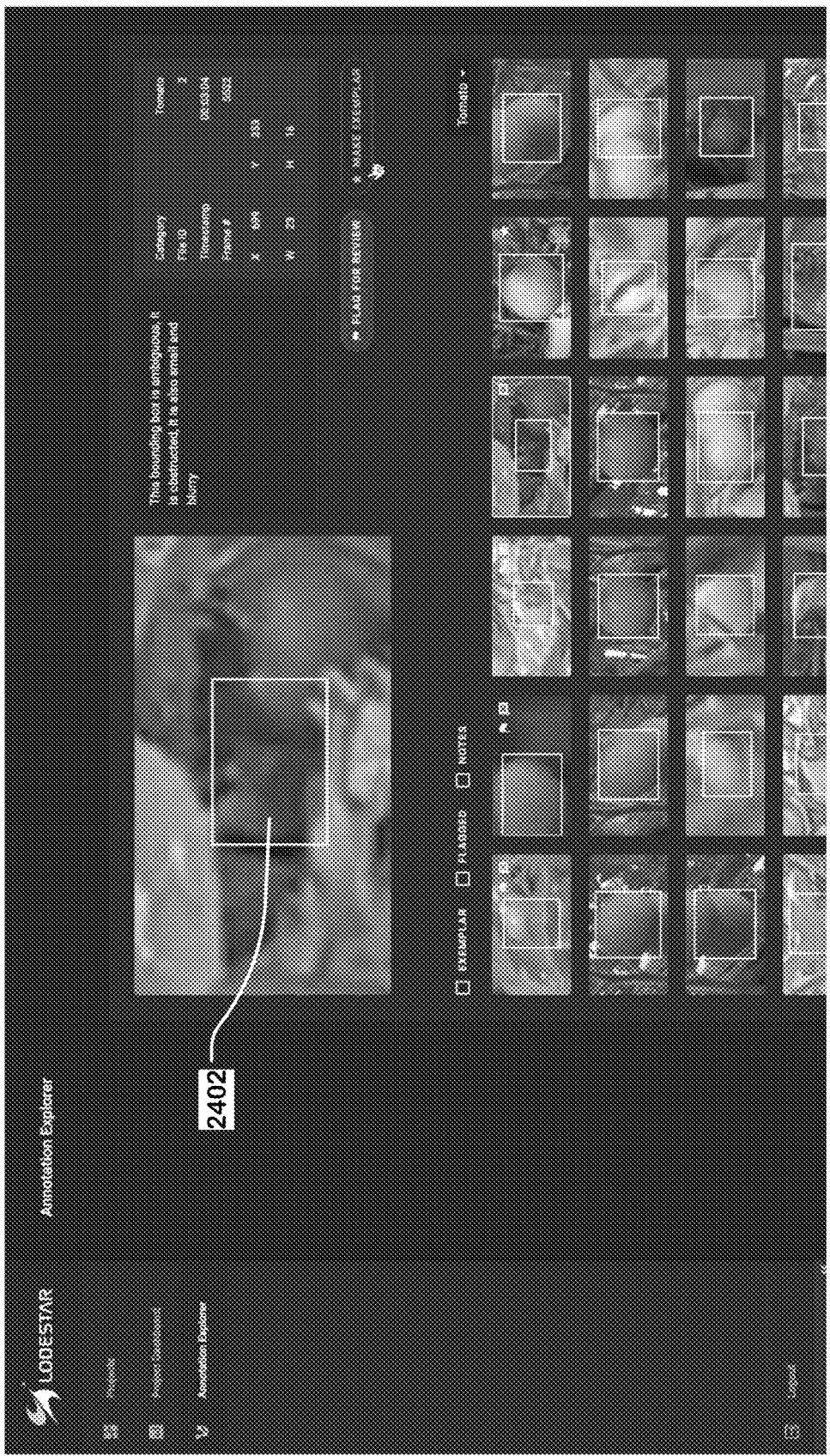
FIG. 24 shows a flagged frame that is flagged by the human oracle as a non-core set member because the bounding box in the flagged frame is obstructed, small, and blurry, and therefore ambiguous.

FIG. 24 shows a flagged frame 2402 that is flagged by the human oracle as a non-core set member because the bounding box in the flagged frame 2402 is obstructed, small, and blurry, and therefore ambiguous.

Figure 25:
FIG. 25 shows a flagged frame that is flagged by the human oracle as a non-core set member because the target object (e.g., the pea) in the flagged frame is ambiguous.

FIG. 25 shows a flagged frame 2502 that is flagged by the human oracle as a non-core set member because the target object (e.g., the pea) in the flagged frame 2502 is ambiguous.

Figure 26:
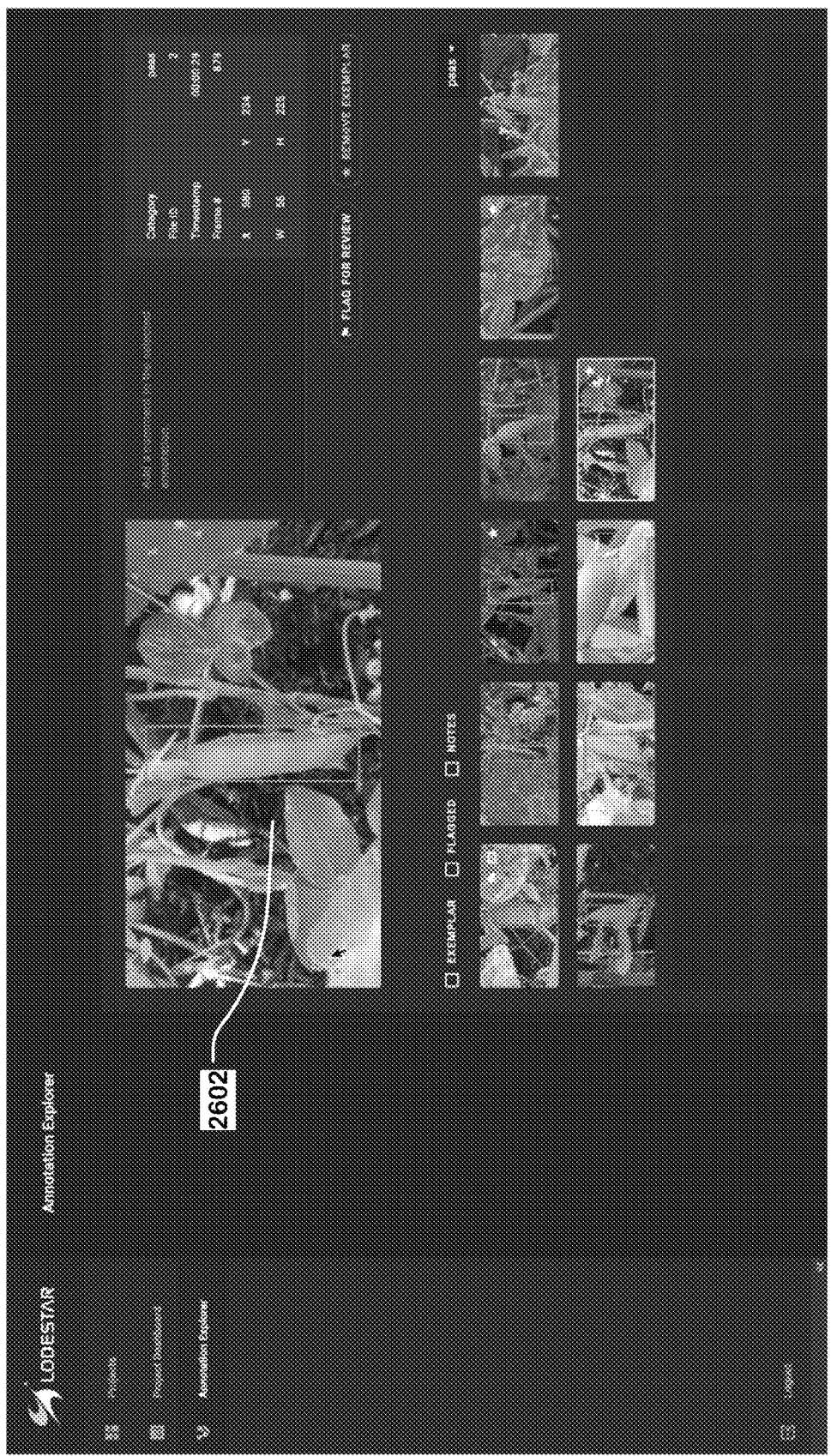
FIG. 26 shows an exemplar frame that is selected by the human oracle as a core set member.

FIG. 26 shows an exemplar frame 2602 that is selected by the human oracle as a core set member.

Figure 27:
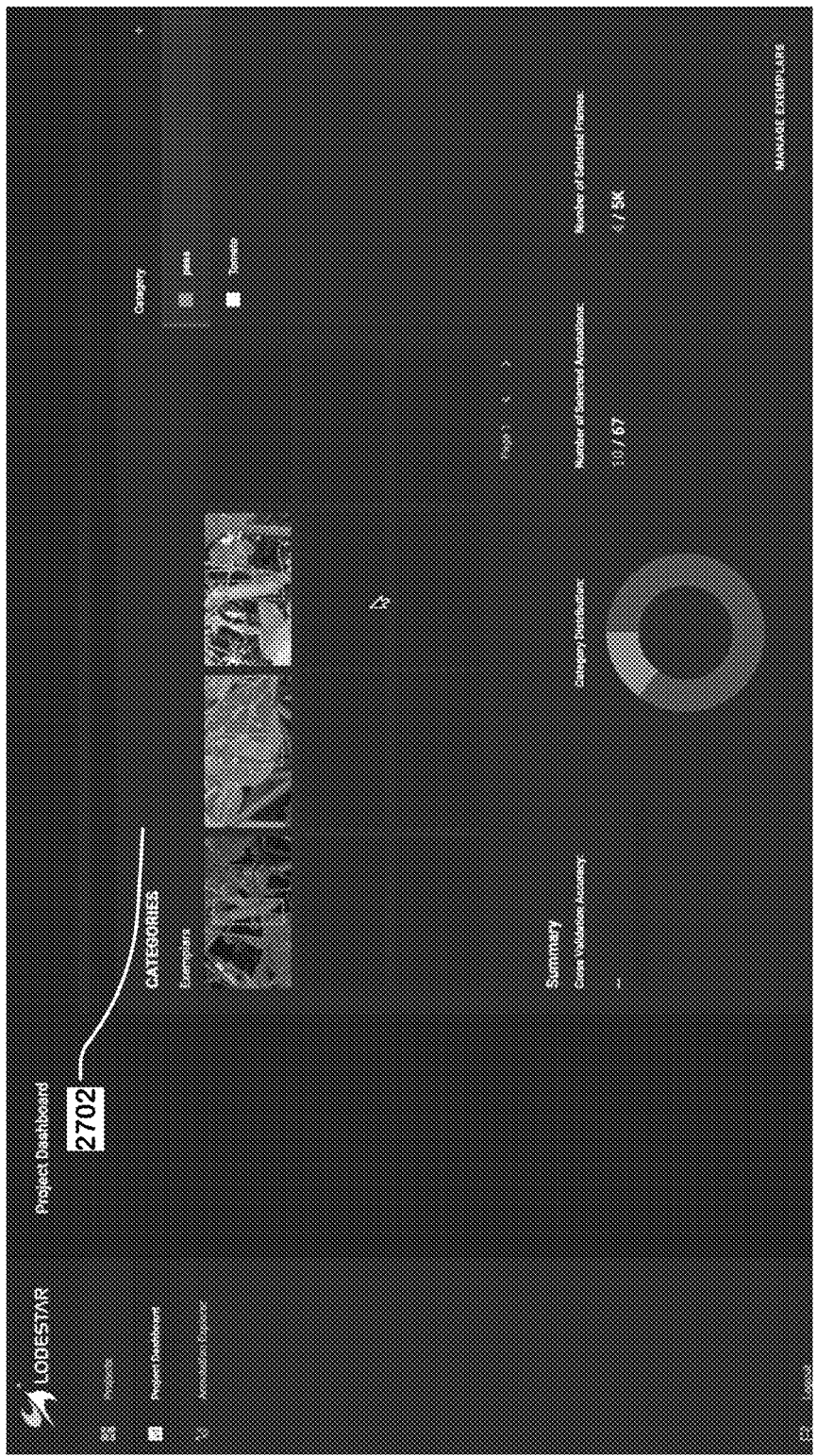
FIG. 27 shows multiple exemplar frames that are selected by the human oracle as core set members.

FIG. 27 shows multiple exemplar frames 2702 that are selected by the human oracle as core set members.

Figure 28:
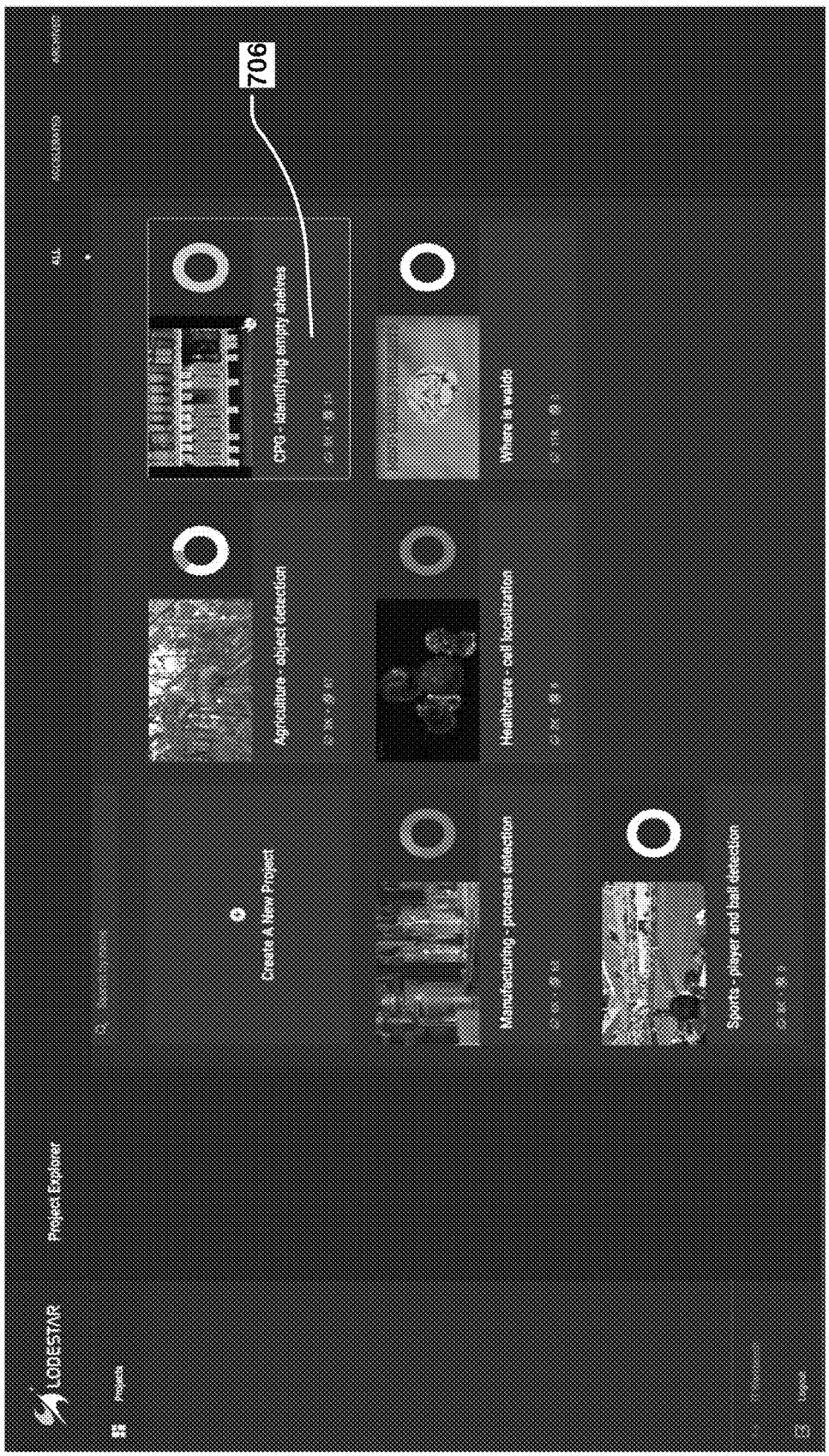
FIG. 28 depicts FIG. 7's video, titled "CPG—identifying empty shelves," configured for annotation by the human oracle.

FIG. 28 depicts the video 706, titled "CPG—identifying empty shelves," configured for annotation by the human oracle.

Figure 29:
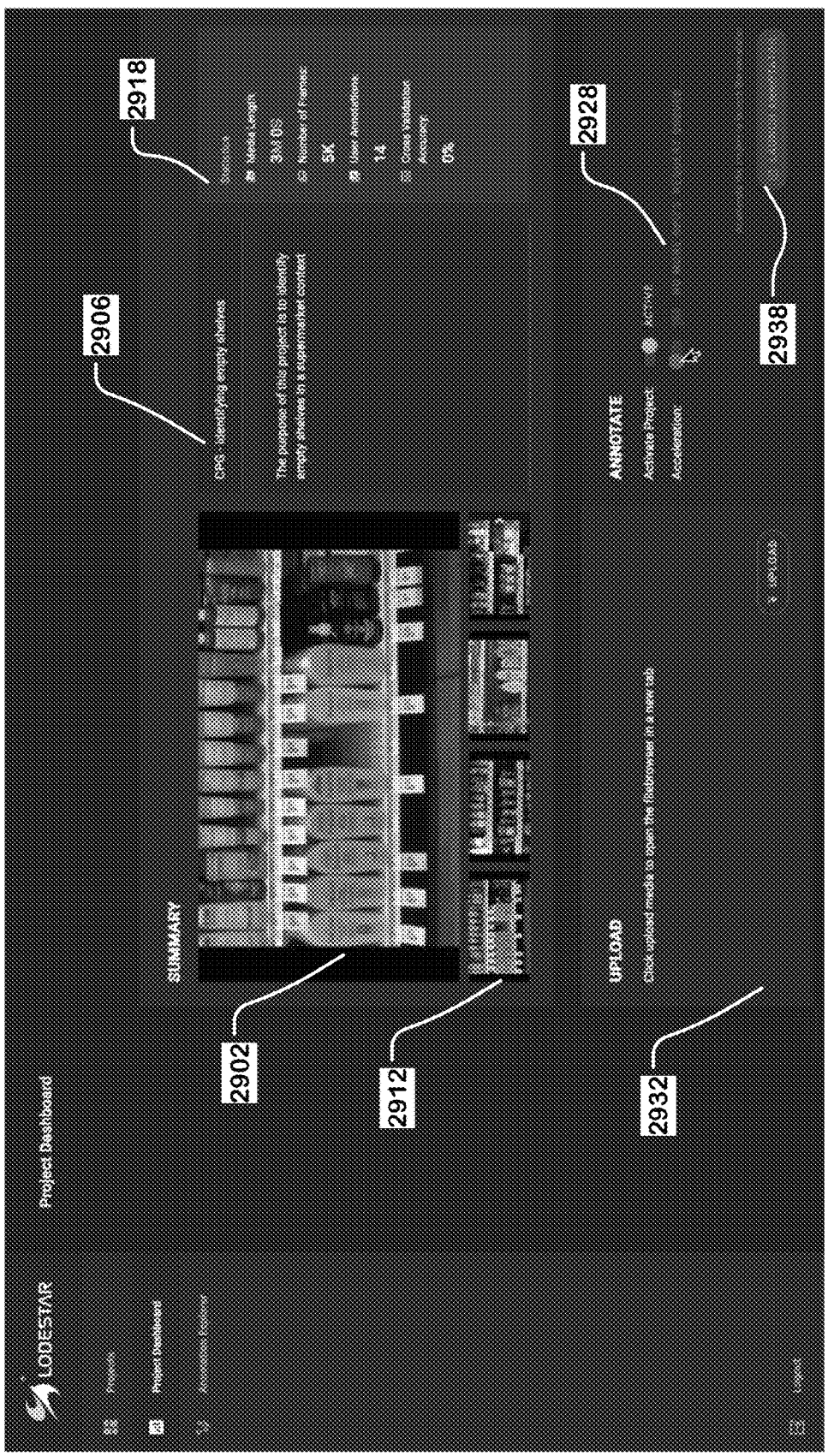
FIG. 29 depicts annotation of empty shelves in a supermarket context according to one implementation of the technology disclosed.

FIG. 29 depicts annotation of empty shelves in a supermarket context according to one implementation of the technology disclosed. The video 706 depicts various produces on shelves of a store. Panel 2918 shows that the video 706 has 5000 frames and that the human oracle is tasked with annotating up to 14 frames out of the 5000 frames. Panel 2906 conveys that the objective of the dataset 706 is to identify empty shelves in a supermarket context.

Panel 2902 shows the frame-under-analysis. Panel 2912 shows the sampled frames from the videos 706 that are suggested to the human oracle for annotation. The sampled frames queued in the panel 2912 are identified by the sampling logic 164, as discussed above.

Panel 2932 can be used to upload a new media (e.g., new video, new frame). Panel 2928 allows the human oracle to set the settings for the annotation exercise (e.g., active v/s non-active, accelerated v/s non-accelerated). Button 2938 launches the annotator.

Figure 30:
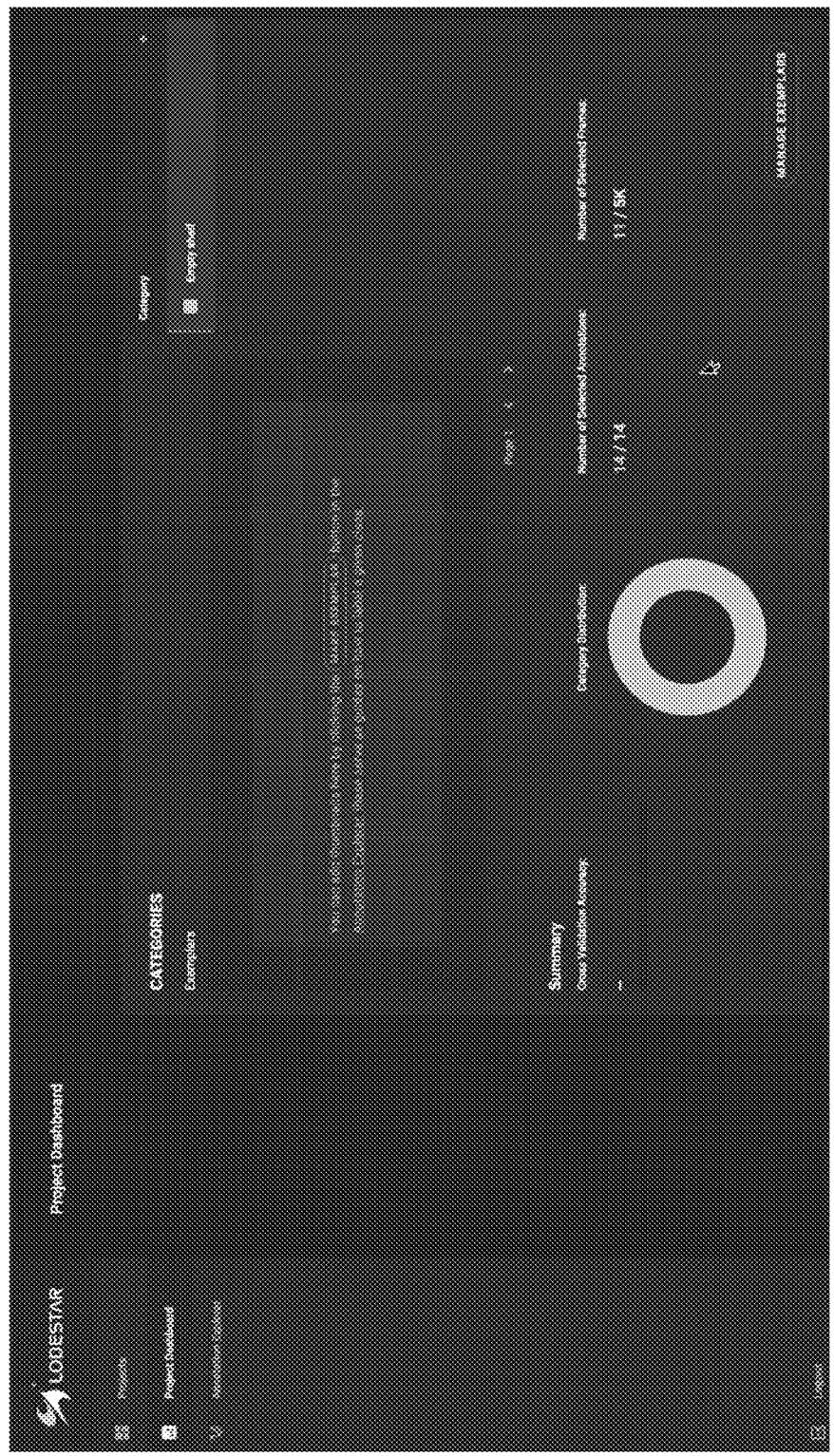
FIG. 30 shows an example interface that allows the human oracle to add an exemplar frame for the use case relating to annotation of empty shelves in a supermarket context.

FIG. 30 shows an example interface that allows the human oracle to add an exemplar frame for the use case relating to annotation of empty shelves in a supermarket context.

Figure 31:
FIG. 31 shows another example interface that allows the human oracle to specify exemplar frames as core set frames, specify non-exemplar frames as non-core set frames and flag them for review, and provide notes for certain frames for the use case relating to annotation of empty shelves in a supermarket context.

FIG. 31 shows another example interface that allows the human oracle to specify exemplar frames as core set frames, specify non-exemplar frames as non-core set frames and flag them for review, and provide notes for certain frames for the use case relating to annotation of empty shelves in a supermarket context.

Figure 32:
FIG. 32 depicts annotation of empty shelves in the supermarket context according to another implementation of the technology disclosed.

FIG. 32 depicts annotation of empty shelves in the supermarket context according to another implementation of the technology disclosed. Panel 3202 shows the frame-under-analysis that is selected by the human oracle for possible annotation. Panel 3212 shows the sampled frames from the videos 706 that are suggested to the human oracle for annotation. The sampled frames queued in the panel 3212 are identified by the sampling logic 164, as discussed above. The sampled frames can be browsed and played forward and backward using the frame navigator 3218. Panel 3208 shows the target object (e.g., empty shelves) in the video 706 that can be annotated, and/or a specific object-type (e.g., empty shelf) that is the subject of the frames-under-analysis.

Figure 33:
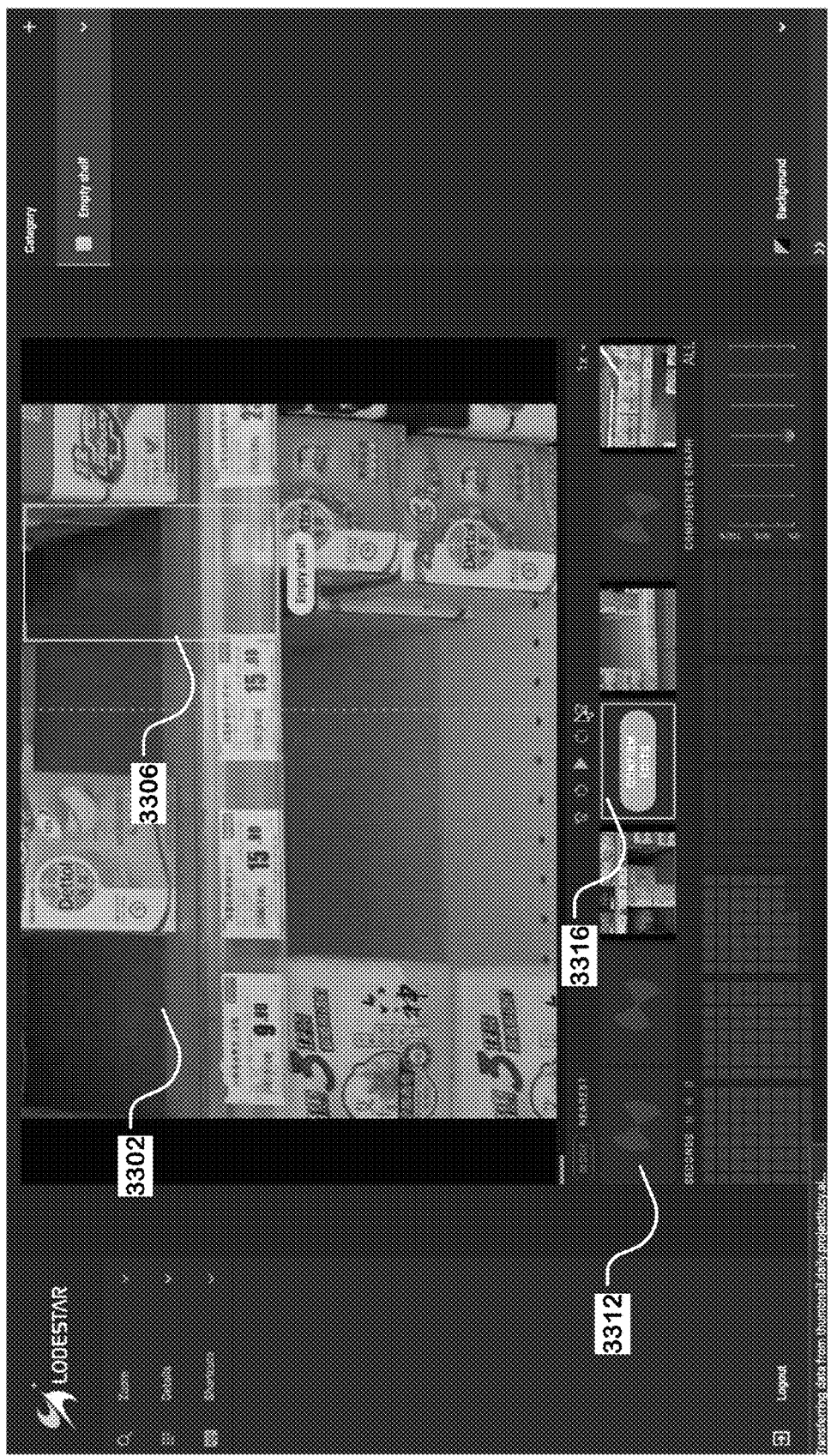
FIG. 33 depicts annotation of an empty shelf in the supermarket context using a bounding box drawn by the human oracle according to one implementation of the technology disclosed.

FIG. 33 depicts annotation of an empty shelf in the video 706 using a bounding box 3306 drawn by the human oracle according to one implementation of the technology disclosed. Frame-under-analysis 3302 is selected by the human oracle for annotation from the sampled frames 3312. Button 3316 is configured to enable the human oracle to confirm/submit the bounding boxes drawn by the human oracle for use as ground truth labels for training the model 124 as part of the disclosed HITL active learning. In the illustrated implementation, the sampled frames 3312 include a group of visually similar images, identified in FIG. 33 by the label "NEAREST."

Figure 34:
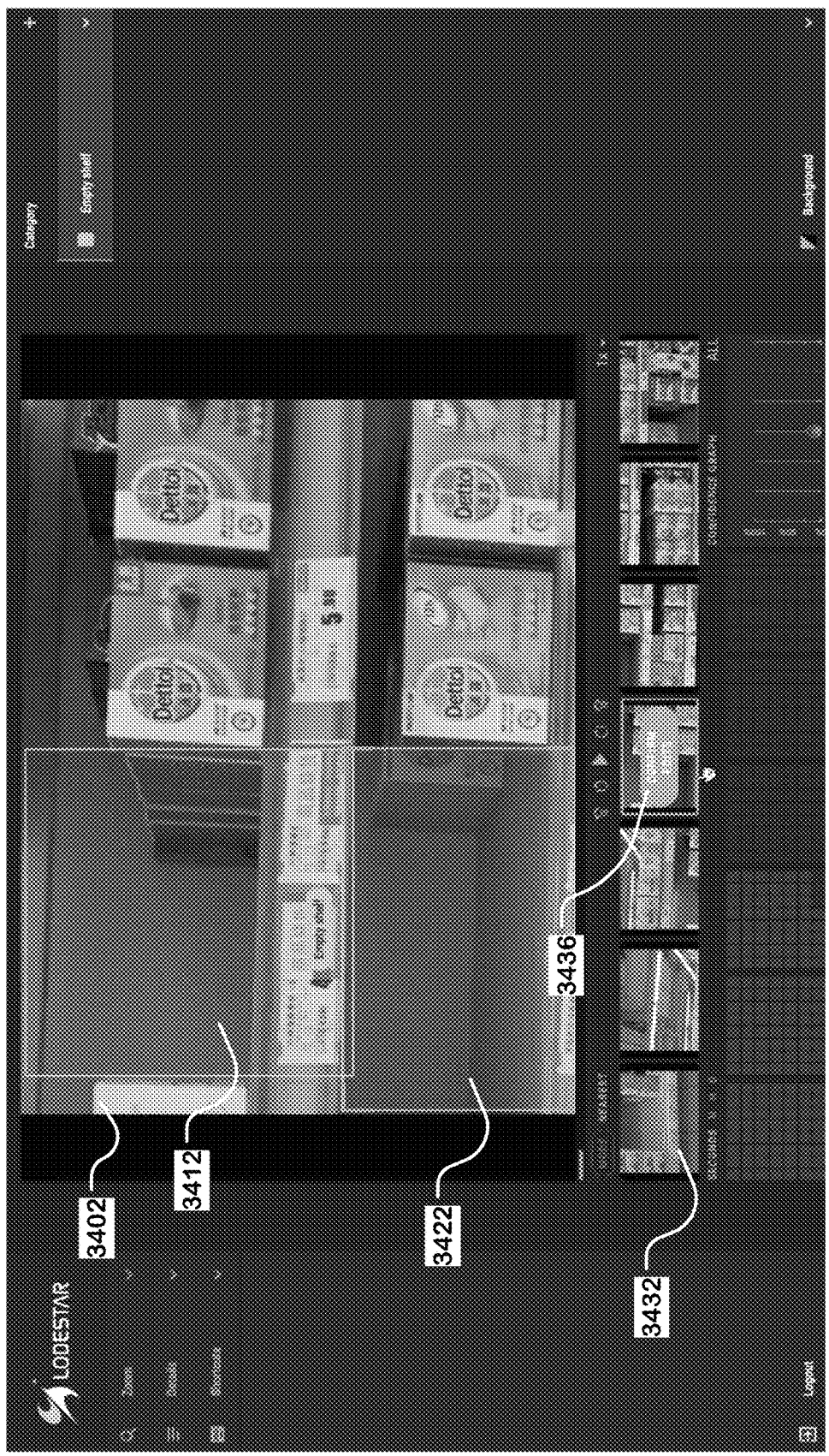
FIG. 34 depicts annotation of empty shelves in the supermarket context using bounding boxes drawn by the human oracle according to another implementation of the technology disclosed.

FIG. 34 depicts annotation of empty shelves in the video 706 using bounding boxes 3412 and 3422 drawn by the human oracle according to another implementation of the technology disclosed. Frame-under-analysis 3402 is selected by the human oracle for annotation from the sampled frames 3432. Button 3436 is configured to enable the human oracle to confirm/submit the bounding boxes drawn by the human oracle for use as ground truth labels for training the model 124 as part of the disclosed HITL active learning. In the illustrated implementation, the sampled frames 3432 include a group of visually similar images, identified in FIG. 34 by the label "NEAREST."

Figure 35:
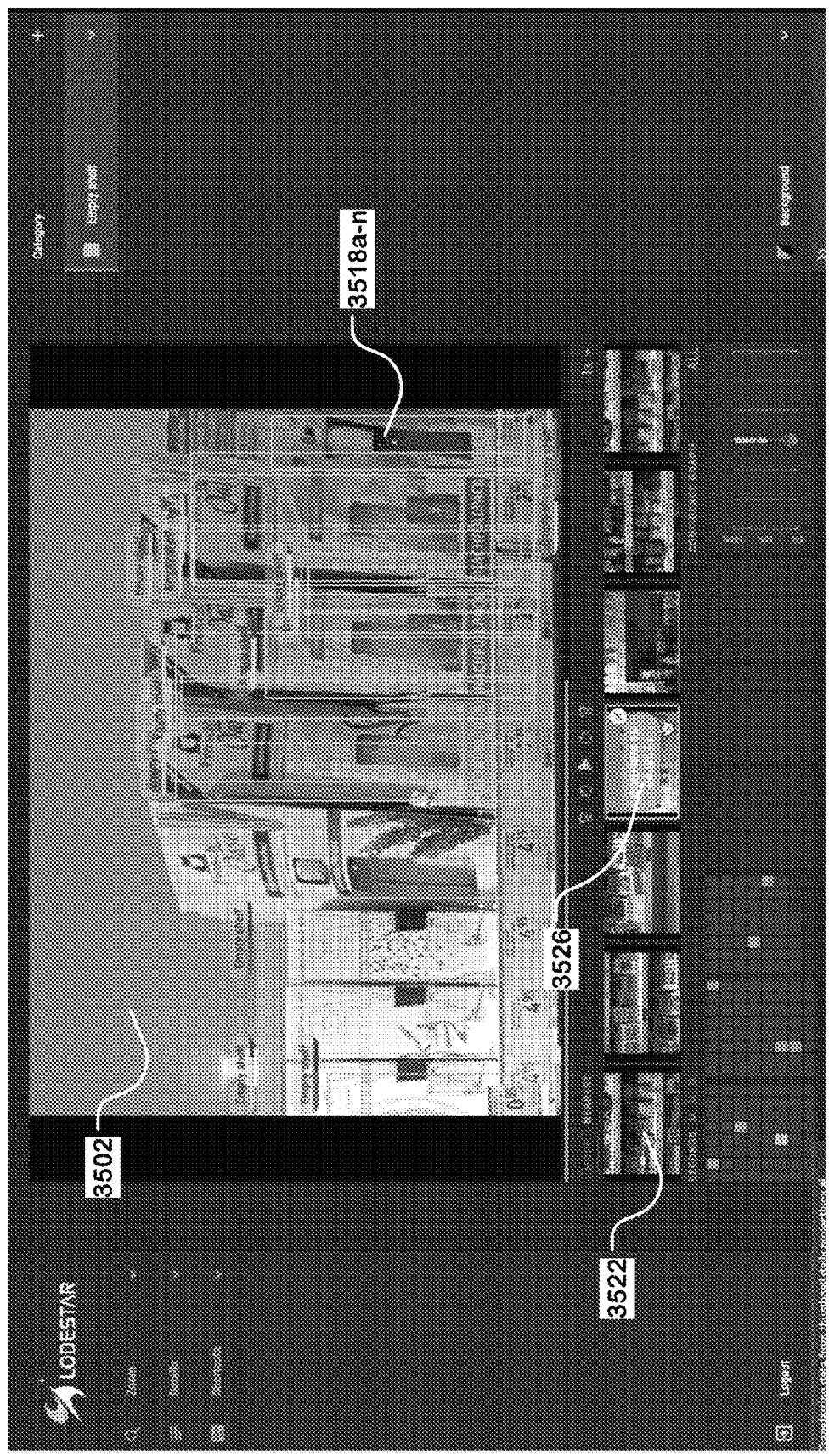
FIG. 35 depicts annotation of empty shelves in the supermarket context using bounding boxes drawn by the human oracle according to a yet another implementation of the technology disclosed.

FIG. 35 depicts annotation of empty shelves in the video 706 using bounding boxes 3518a-n drawn by the human oracle according to a yet another implementation of the technology disclosed. Frame-under-analysis 3502 is selected by the human oracle for annotation from the sampled frames 3522. Button 3526 is configured to enable the human oracle to confirm/submit the bounding boxes drawn by the human oracle for use as ground truth labels for training the model 124 as part of the disclosed HITL active learning. In the illustrated implementation, the sampled frames 3522 include a group of visually similar images, identified in FIG. 35 by the label "NEAREST."

Figure 36:
FIG. 36 depicts annotation of an empty shelf in the supermarket context using a bounding box drawn by the human oracle according to a yet further implementation of the technology disclosed.

FIG. 36 depicts annotation of an empty shelf in the video 706 using a bounding box 3618 drawn by the human oracle according to a yet further implementation of the technology disclosed. Frame-under-analysis 3602 is selected by the human oracle for annotation from the sampled frames 3622. Button 3626 is configured to enable the human oracle to confirm/submit the bounding boxes drawn by the human oracle for use as ground truth labels for training the model 124 as part of the disclosed HITL active learning. In the illustrated implementation, the sampled frames 3622 include a group of visually similar images, identified in FIG. 36 by the label "NEAREST."

Sparse Active Learning for Accelerated Deep Learning

Figure 37:
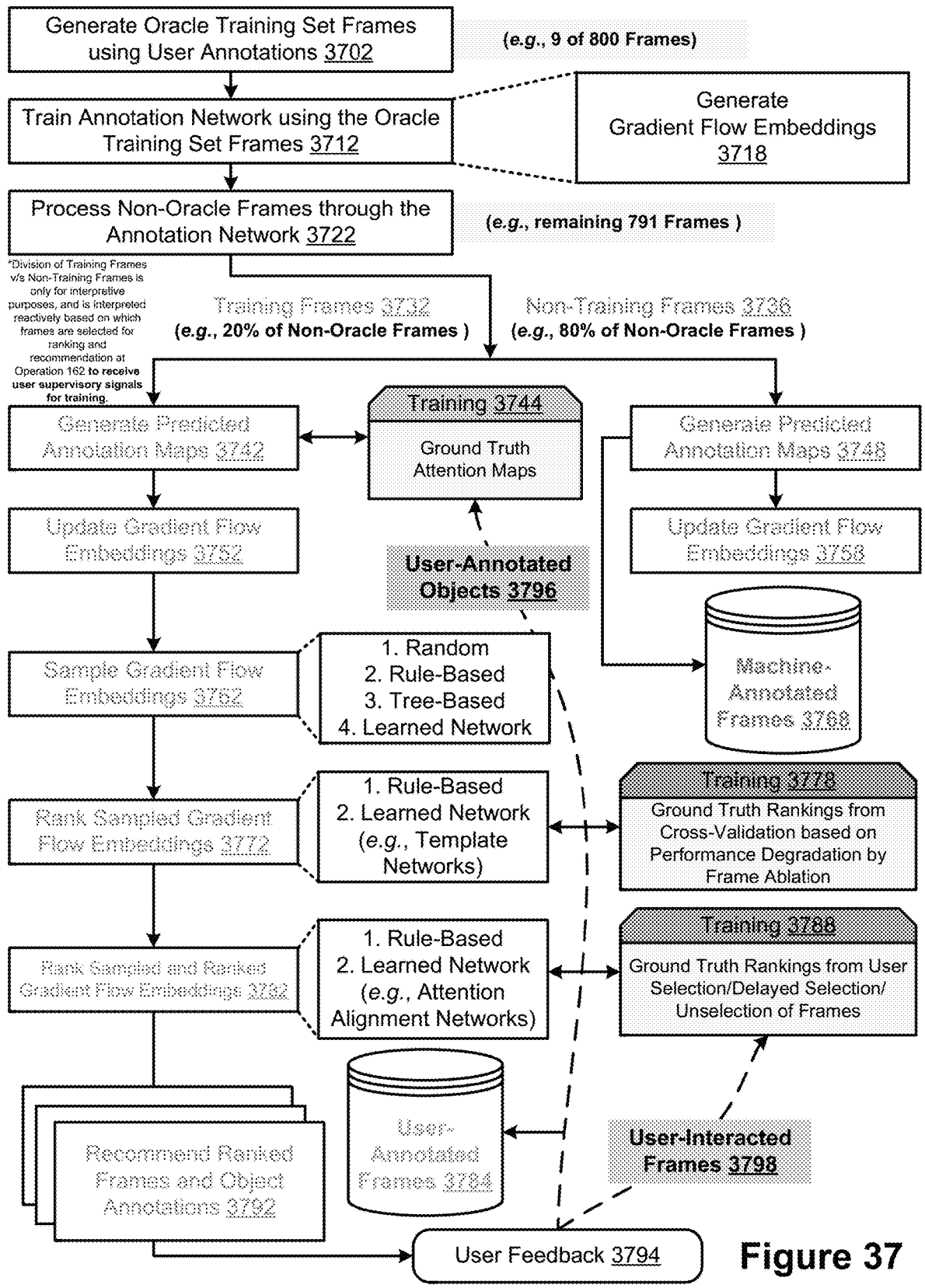
FIG. 37 is a high-level diagram of various aspects of the technology disclosed.

FIG. 37 is a high-level diagram of various aspects of the technology disclosed. FIG. 37 can be implemented at least partially with and/or by one or more processors configured to receive or retrieve information, process the information, store results, and transmit the results. Other implementations may perform the actions in different orders and/or with different, fewer, or additional actions than those illustrated in FIG. 37. Multiple actions can be combined in some implementations. For convenience, this figure is described with reference to the system that carries out a method. The system is not necessarily part of the method.

Oracle Set Initialization

At action 3702, an oracle training set of frames is generated using user annotations. In some implementations, a subset of unannotated frames is selected from the starting unannotated set of frames for inclusion in and initialization of the oracle training set of frames. The selection can be random, rule-based, and/or machine-learned. The selected frames are presented to the human oracle for annotation of objects-of-interest (or regions-of-interest) in the selected frames, for example, via the user interface discussed above. In some implementations, the user annotations can be stored by mapping those pixels on which bounding boxes are made by the human oracle.

Training on Oracle Set

At action 3712, an annotation network (e.g., the model 124) is trained using the oracle training set of frames as the training examples (or samples), and using the user annotations as the ground truth labels.

Figure 40:
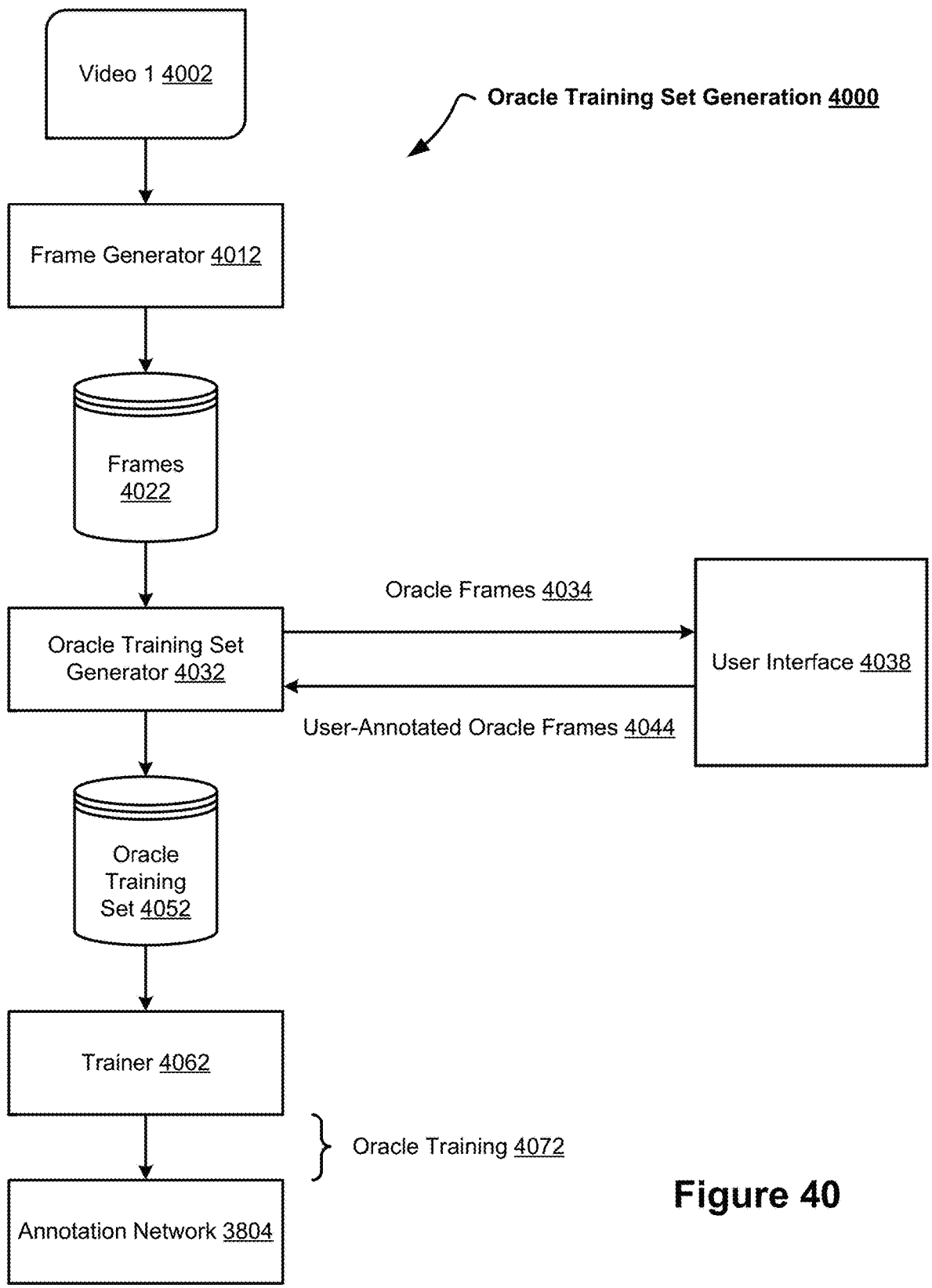
FIG. 40 illustrates one implementation of oracle training set generation.

FIG. 40 illustrates one implementation of oracle training set generation 4000. In the implementation illustrated in FIG. 40, a frame generator 4012 processes a video 4002 ("video 1") and extracts frames 4022 from the video 4002.

Then, an oracle training set generator 4032 selects a subset of frames from the frames 4022 (e.g., 5, 9, 14, 20, 100, or 500 oracle frames from 5000 total frames), and identifies the subset of frames as oracle frames 4034. The oracle training set generator 4032 then uses a user interface 4038 (e.g., like the one discussed above) to receiver user annotations 4044 on the oracle frames 4034 from a human oracle.

The oracle frames 4034 and the user annotations 4044 on the oracle frames 4034 are stored as training examples and ground truth labels respectively, and together form an oracle training set 4052.

A trainer 4062 then uses the oracle training set 4052 to train the annotation network 3804 (e.g., the model 124), a procedure identified in FIG. 40 as oracle training 4072. The result of the oracle training 4072 is a trained annotation network 3804.

Figure 41A:
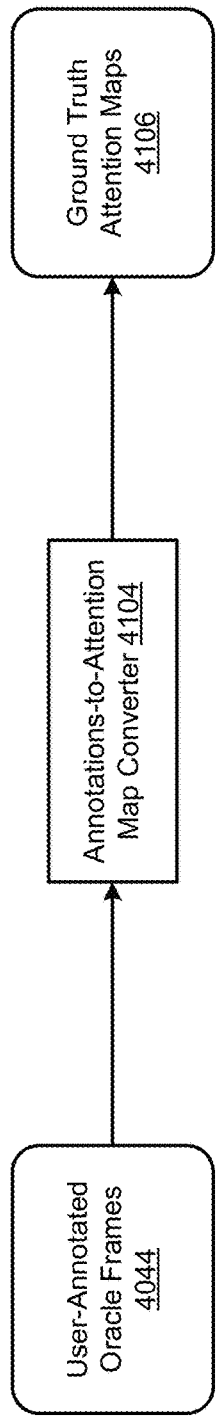
FIG. 41A illustrates one implementation of translating user-annotated oracle frames into ground truth attention maps.

FIG. 41 illustrates one implementation of translating 4100A user-annotated oracle frames 4044 into ground truth attention maps 4106. In some implementations, the human oracle provides/supplies user annotations by drawing bounding boxes around objects-of-interest in the oracle frames 4034.

An annotations-to-attention map convertor 4104 converts the bounding boxes drawn around the objects-of-interest in the oracle frames 4034 into attention maps. In one implementation, this is accomplished by identifying those pixels in the oracle frames 4034 that contain the bounding boxes and highlighting/exaggerating such pixels in the attention maps (e.g., using heat maps, heightened/peaked intensity values, decay maps).

What results is the ground truth attention maps 4106 that identify those regions/pixels in the oracle frames 4034 that contain the objects-of-interests, as defined by the human oracle via the bounding boxes.

Figure 41B:
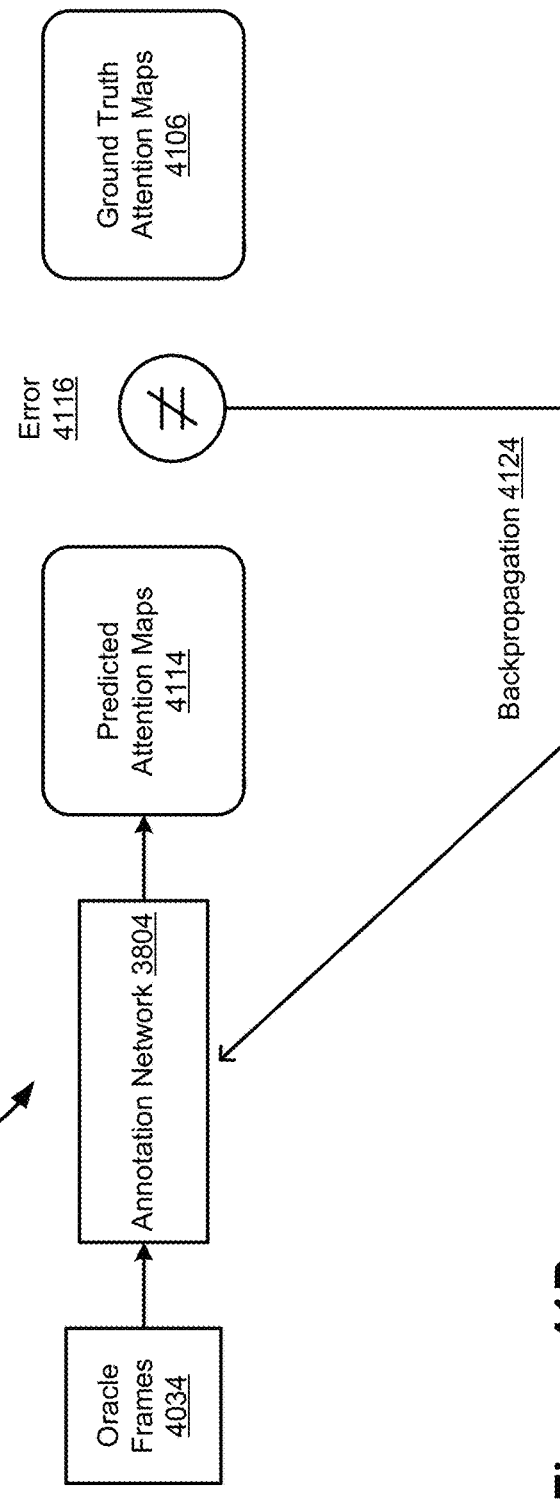
FIG. 41B illustrates one implementation of training an annotation network using the user-annotated oracle frames.

FIG. 41B illustrates one implementation of training 472 the annotation network 3804 using the user-annotated oracle frames. During the forward pass, the oracle frames 4034 are processed through the annotation network 3804, which in response generates predicted attention maps 4114.

During the backward pass and the chain pass, the predicted attention maps 4114 are compared against the ground truth attention maps 4106 to determine an error 4116, which is in turn used to determine gradients, which are in turn used to update weights of the annotation network 3804 via backpropagation 4124.

Generating Gradient Flow Embeddings for Oracle Frames

At action 3718, gradient flow embeddings are generated. A particular gradient flow embedding of a particular frame is generated as follows.

The annotation network processes the particular frame as input and generates an output. One example of the output is an attention map (or heat map) that identifies which regions (e.g., pixels) of the particular frame contain objects-of-interest.

In one implementation, training the annotation network includes configuring one or more weights (or parameters) of the annotation network to attain a convergence optima. In one implementation, making an inference with the annotation network includes using the trained annotation network to compute results by processing input data based on the configured weights of the trained annotation network.

In one implementation, the training of the annotation network is implemented by Stochastic Gradient Descent (SGD), which comprises a forward pass and a backward pass. The backward pass comprises a delta pass and a chain pass. The forward pass propagates activations in a forward direction. The delta pass propagates deltas in a backward direction. The chain pass calculates gradients based on the deltas as the deltas are generated in the delta pass.

The annotation network is trained iteratively over multiple epochs, with each epoch including one or more training examples that are fed as input to the annotation network during the forward pass. An epoch can include just one frame as the only training example. An epoch can also include a batch or mini-batch of frames as training examples.

The particular frame is fed as input to the annotation network twice. First, when the annotation network is in a preceding (or current) epoch configuration (e.g., epoch i). Second, when the annotation network is in a succeeding epoch configuration (e.g., epoch i+1). The annotation network attains the preceding epoch configuration after being trained on one or more training examples of the preceding epoch configuration. The annotation network graduates from the preceding epoch configuration and attains the succeeding epoch configuration after being trained on one or more training examples of the succeeding epoch configuration.

The annotation network trained on the preceding epoch configuration processes the particular frame and generates a first output (e.g., a first attention map). The annotation network trained on the succeeding epoch configuration processes the particular frame and generates a second output (e.g., a second attention map).

A gradient flow encoder (e.g., a variational autoencoder (VAE)) is trained to process the first output as input and predict the second output as output. The second output is used as the ground truth for training the gradient flow encoder.

In one implementation, the gradient flow encoder comprises an encoder and a decoder. The encoder processes the first output as input and outputs a compressed embedding of the first output. The compressed embedding of the first output is encoded in a hidden representation space (or latent space). This is referred to as a "bottleneck" because the encoder learns to project a compressed representation of its input into a lower-dimensional latent space. The lower-dimensional latent space is stochastic because the encoder outputs parameters to a Gaussian probability density.

The decoder takes as input the compressed embedding of the first output and reconstructs the second output. In some implementations, information from the first output is not perfectly transmitted to the decoder because the decoder only has access to the compressed embedding of the first output. This results in a lossy transmission. The loss is measured using the reconstruction log-likelihood, whose units are nats. The reconstruction log-likelihood represents how effectively the decoder has learned to reconstruct the second output given the compressed embedding of the first output. In some implementations, the loss function of the gradient flow encoder is the negative log-likelihood with a regularizer.

The compressed embedding of the first output serves as the particular gradient flow embedding of the particular frame.

FIGS. 42A, 42B, 42C, and 42D illustrate one implementation of generating gradient flow embeddings for oracle frames.

Figure 42A:
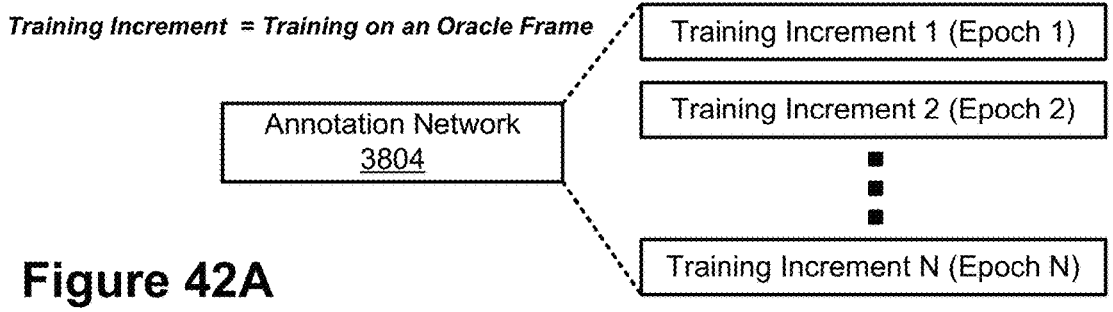
FIG. 42A shows one implementation of different training increments of training the annotation network on a per-oracle frame basis.
Figure 42B:
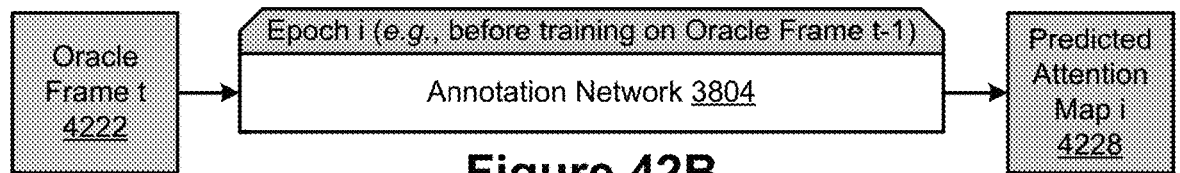
FIG. 42B shows one implementation of generating a prior annotation of a subject oracle frame.
Figure 42C:
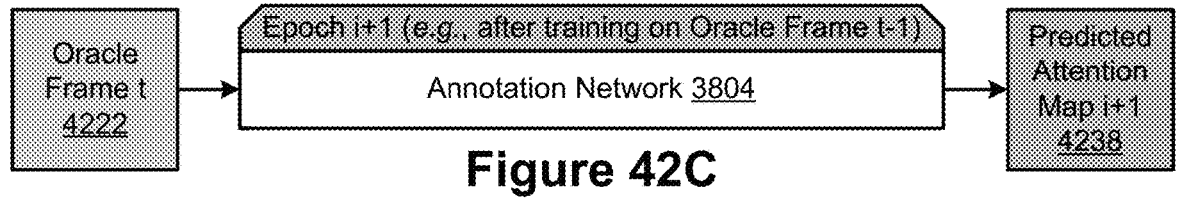
FIG. 42C shows one implementation of generating a posterior annotation of the subject oracle frame.
Figure 42D:
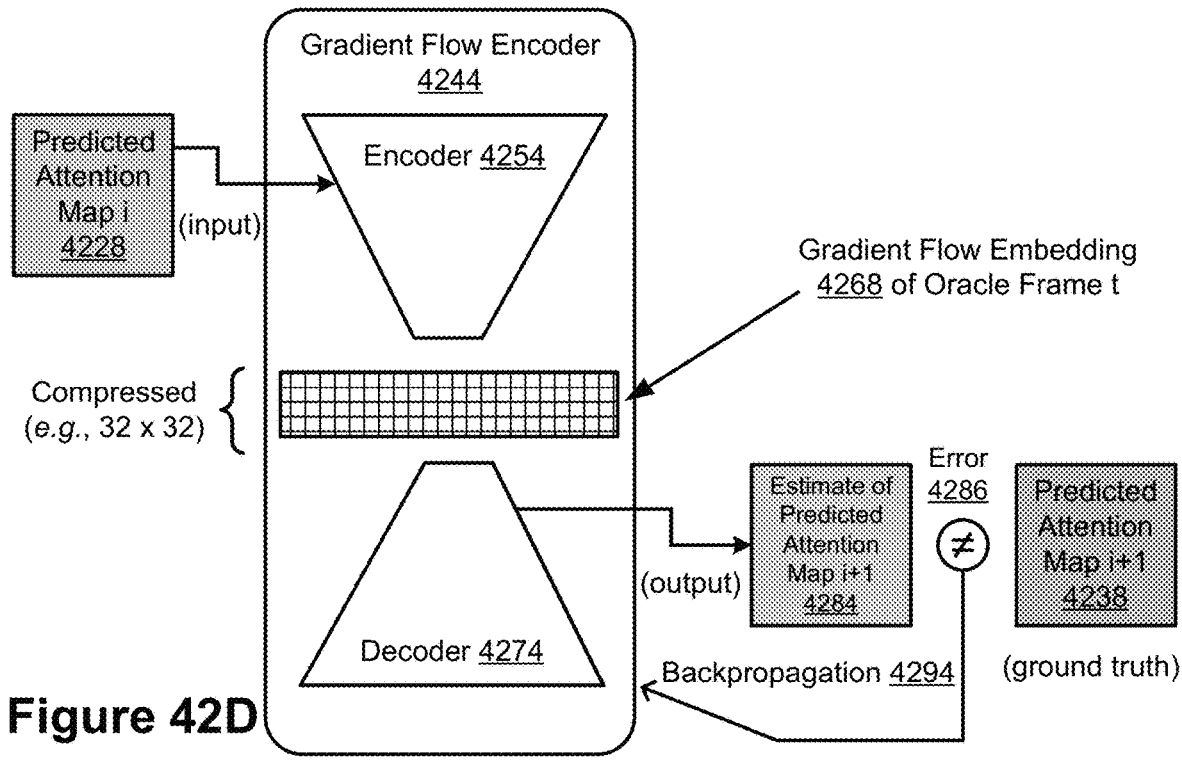
FIG. 42D shows one implementation of a gradient flow encoder generating a gradient flow measurement for the subject oracle frame.

FIG. 42A shows one implementation of different training increments of training the annotation network on a per-oracle frame basis. FIG. 42B shows one implementation of generating a prior annotation of a subject oracle frame. FIG. 42C shows one implementation of generating a posterior annotation of the subject oracle frame. FIG. 42D shows one implementation of a gradient flow encoder generating a gradient flow measurement for the subject oracle frame.

In FIG. 42A, the annotation network 3804 is trained on N training increments (or epochs), with each epoch comprising only one training example in the form of a single oracle frame.

In FIGS. 42B and 42C, the subject oracle frame is "oracle frame at timestep t" 4222. Further in FIGS. 42B and 42C, the oracle frame preceding the subject oracle frame is "oracle frame at timestep t−1."

In FIG. 42B, before being trained on the oracle frame at timestep t−1, the annotation network 3804 is in the training configuration "epoch i."

In FIG. 42C, after being trained on the oracle frame at timestep t−1, the annotation network 3804 is in the training configuration "epoch i+1."

In FIG. 42B, during a first forward pass, the oracle frame at timestep t 4222 is processed through the annotation network 3804 in the epoch i training configuration to generate as output a first predicted attention map i 4228.

In FIG. 42C, during a second forward pass, the oracle frame at timestep t 4222 is processed through the annotation network 3804 in the epoch i+1 training configuration to generate as output a second predicted attention map i+1 4238.

In FIG. 42D, a gradient flow encoder 4244 processes the first predicted attention map i 4228 as input and generates an estimate 4284 of the second predicted attention map i+1 4238 as output. In one implementation, the gradient flow encoder 4244 comprises an encoder 4254 and a decoder 4274.

The encoder 4254 translates the first predicted attention map i 4228 into a compressed representation of the first predicted attention map i 4228, which is embedded in a latent space. For example, the oracle frames and therefore the first predicted attention map i 4228 can be of size 800×800, and the compressed representation can be of size 32×32.

This compressed representation of the first predicted attention map i 4228 is considered and used as a gradient flow embedding 4268 of the subject oracle frame 4222.

The decoder 4274 translates the compressed representation of the first predicted attention map i 4228 into the estimate 4284 of the second predicted attention map i+1 4238, a processed referred to as "reconstruction" because the decoder 4274 is configured to reconstruct the second predicted attention map i+1 4238 from the compressed representation of the first predicted attention map i 4228.

The gradient flow encoder 4244 is trained by determining an error 4286 between the estimate 4284 of the second predicted attention map i+1 4238 and the second predicted attention map i+1 4238 (used a ground truth). Backpropagation 4294 trains the gradient flow encoder 4244 based on the error 4286.

Gradient Flow Embeddings as Proxies of Source Frames

Figure 43:
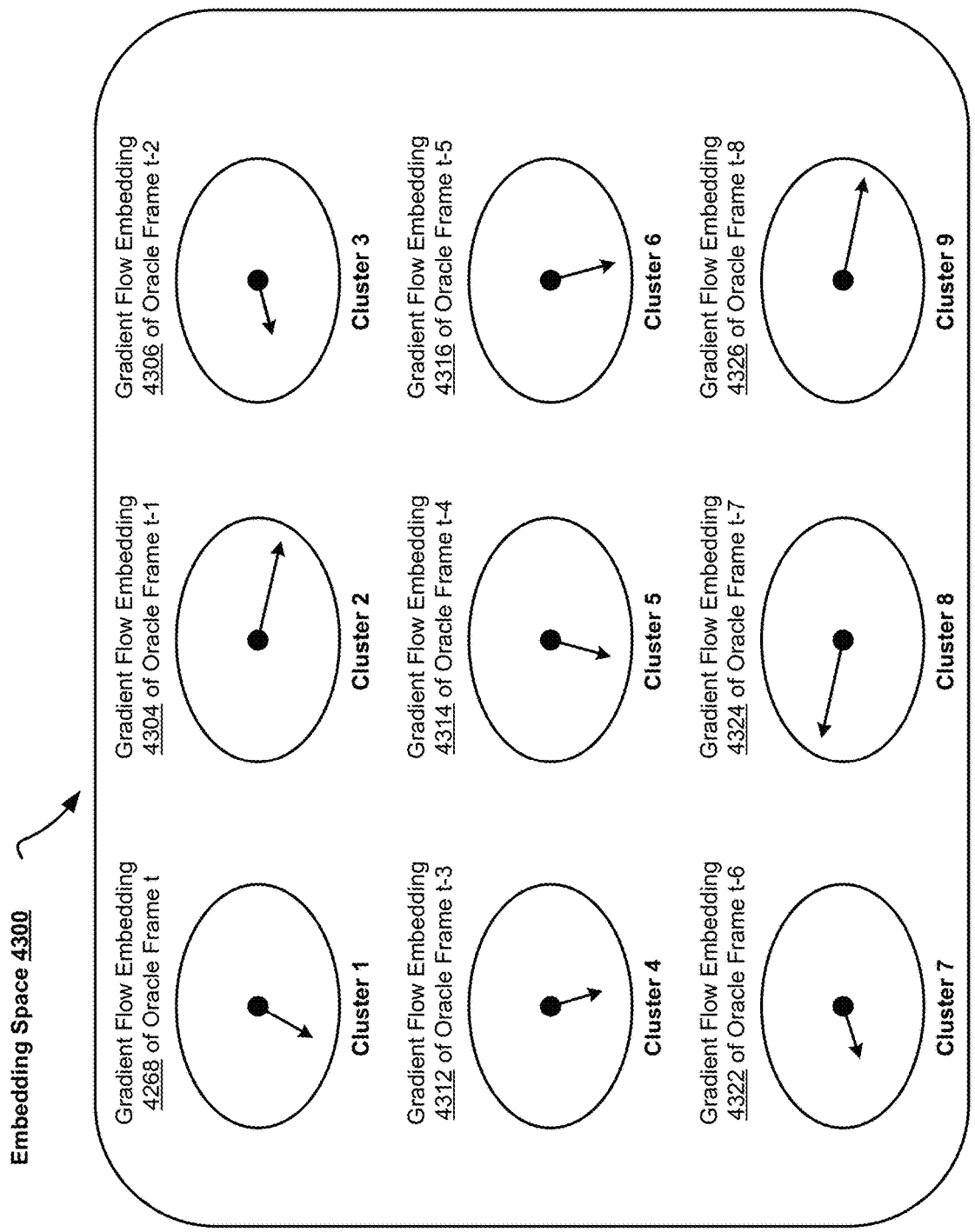
FIG. 43 shows one implementation of embedding gradient flow embeddings for frames (e.g., oracle frames) in an embedding space as proxies of the frames (e.g., the oracle frames).

FIG. 43 shows one implementation of embedding gradient flow embeddings for frames (e.g., oracle frames) in an embedding space 4300 as proxies of the frames (e.g., the oracle frames). In FIG. 43, respective gradient flow embeddings 4264, 4304, 4206, 4312, 4314, 4316, 4322, 4324, and 4326 are compressed representations of respective frames (e.g., oracle frames t, t−1, t−2, t−3, t−4, t−5, t−6, and t−7, and non-oracle frames).

The gradient flow embeddings are embedded in the embedding space 4300, as discussed above. Once embedded, the gradient flow embeddings serve as proxies of the corresponding frames (e.g., the corresponding oracle frames, and the corresponding non-oracle frames) for sampling purposes, as described in greater detail later in this Application.

Also, in the embedding space 4300, the gradient flow embeddings form clusters and subclusters (e.g., clusters 1-9 in FIG. 43). Clustering and subclustering of the gradient flow embeddings represent the notion that visually similar frames (e.g., visually similar oracle frames, and visually similar non-oracle frames) are grouped together in the embedding space 4300. This notion, in some implementations, forms the basis for future sampling and updating of the embedding space 4300 based on feedback from the human oracle.

Training Iterations v/s Non-Training Iterations

Returning to FIG. 37, the following discussion focuses on the difference between training iterations and non-training iterations of the technology disclosed.

Consider a starting unannotated frame set of 5000 unannotated frames. Then consider that, of the 5000 unannotated frames, 20 are selected as the oracle frames. The human oracle then annotates the 20 oracle frames. The 20 human-annotated oracle frames are then used to train the annotation network. Also, 20 gradient flow embeddings are generated for the 20 human-annotated oracle frames and subsequently embedded in the embedding space. The training of the annotation network on the 20 human-annotated oracle frames falls in the category of the so-called "training iterations."

The remaining 4980 unannotated frames that are not included in the oracle set are referred to as the "non-oracle frames." The difference between the training iterations and the non-training iterations is actualized by (i) some unannotated frames in the non-oracle set being used for the forward pass, the backward pass, and the chain pass of the training of the annotation network, while (ii) some other unannotated frames in the non-oracle set being used only for the forward pass of the annotation network without any training of the annotation network.

The technology disclosed can alternate between the training iterations and the non-training iterations at varying intervals. In some implementations, for every K non-training iterations, a training iteration is executed, where K>1. In one implementation, 20% of the unannotated frames in the non-oracle set are used in the training iterations, and the remaining 80% of the unannotated frames in the non-oracle set are used in the non-training iterations. In different implementations, alternating between the training iterations and the non-training iterations can be random, rule-based, and/or machine-learned.

The commonality between the training iterations and the non-training iterations includes (i) processing the unannotated frames through the annotation network as input, (ii) generating predicted attention maps as outputs of the annotation network, generating gradient flow embeddings for the unannotated frames from the predicted attention maps, embedding the gradient flow embeddings in the embedding space, and making the embedded gradient flow embeddings available for future sampling from the embedding space as proxies of the corresponding/underlying/source unannotated frames.

Returning to FIG. 37, at action 3722, the unannotated frames in the non-oracle set are processed through the annotation network. Those unannotated frames in the non-oracle set that are processed by the training iterations can be considered "training frames" 3732. Note that the oracle frames in the oracle set are also training frames because they too are used as input for the forward pass, the backward pass, and the chain pass of the training of the annotation network.

Those unannotated frames in the non-oracle set that are processed by the non-training iterations can be considered "non-training frames" 3736.

For the training frames 3732, predicted annotation maps 3742 are generated by the annotation network, followed by the training 3744 of the annotation network. Then, gradient flow embeddings are generated for the training frames 3732 from the predicted annotation maps 3742. The newly-generated gradient flow embeddings for the training frames 3732 are then added to the embedding space, which in turn causes the clustering and the subclustering of the gradient flow embeddings in the embedding space to be updated because the clustering and the subclustering is based on grouping similarly configured gradient flow embeddings (e.g., grouping visually similar image).

For the non-training frames 3736, predicted annotation maps 3748 are generated by the annotation network, without the training of the annotation network. Then, gradient flow embeddings are generated for the non-training frames 3736 from the predicted annotation maps 3748. The newly-generated gradient flow embeddings for the non-training frames 3736 are then added to the embedding space, which in turn causes the clustering and the subclustering of the gradient flow embeddings in the embedding space to be updated because the clustering and the subclustering is based on grouping similarly configured gradient flow embeddings (e.g., grouping visually similar image).

Note that the gradient flow embeddings for the oracle frames and the unannotated frames share the same embedding space. Similarly, the gradient flow embeddings for the training frames 3732 and the non-training frames 3736 share the same embedding space. In other implementations, there can be different embedding spaces for different frame categories.

Generating Gradient Flow Embeddings for Non-Oracle Frames

FIGS. 44A, 44B, 44C, and 44D illustrate one implementation of generating gradient flow embeddings for non-oracle frames, which can in turn include both training frames and non-training frames.

Figure 44A:
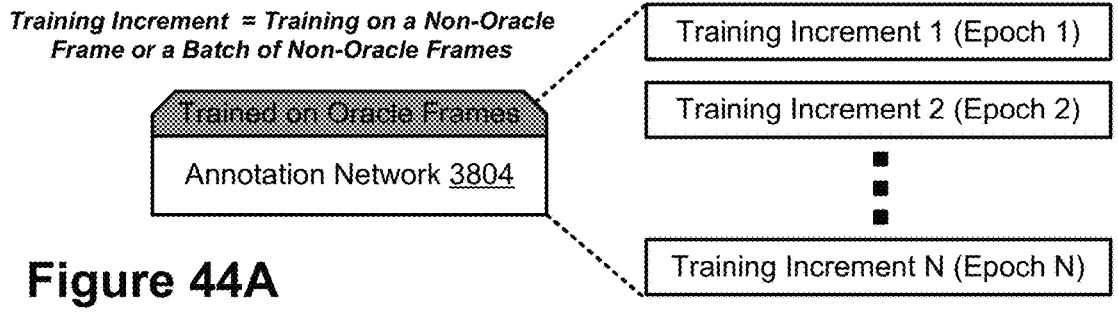
FIG. 44A shows another implementation of different training increments of training the annotation network on one or more non-oracle frames.
Figure 44B:
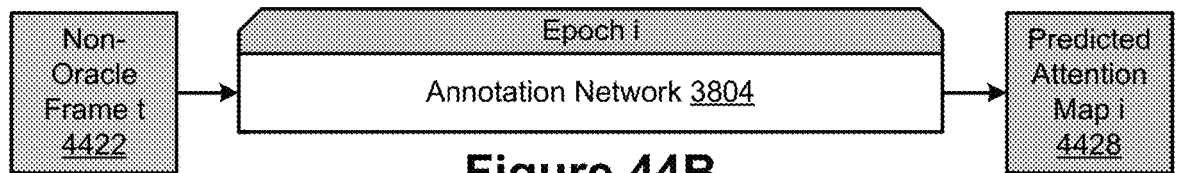
FIG. 44B shows one implementation of generating a prior annotation of a subject non-oracle frame.
Figure 44C:
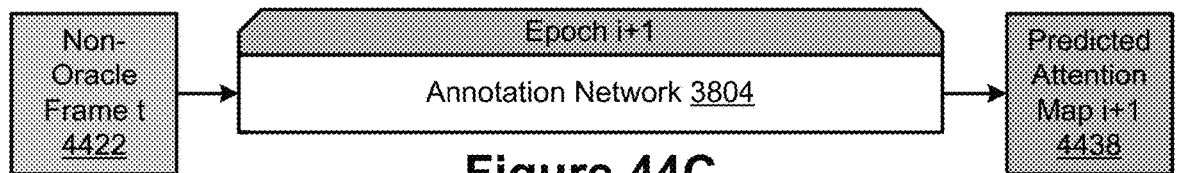
FIG. 44C shows one implementation of generating a posterior annotation of the subject non-oracle frame.
Figure 44D:
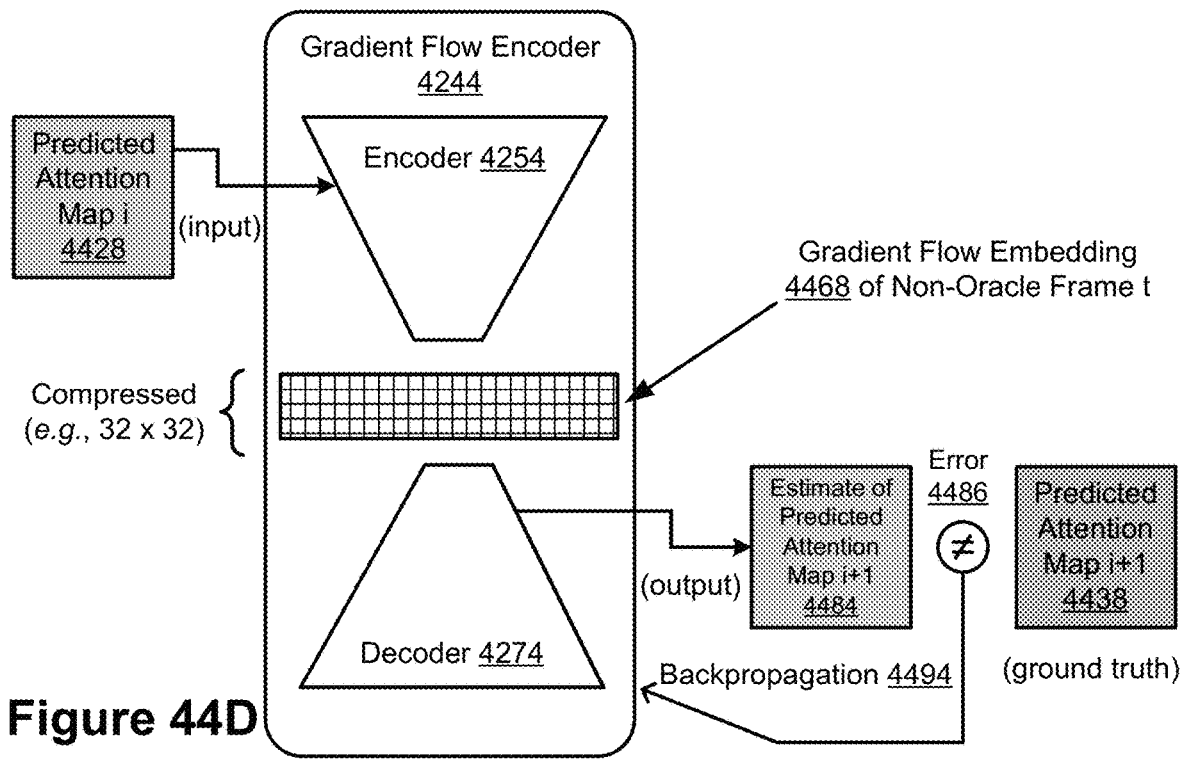
FIG. 44D shows one implementation of the gradient flow encoder generating a gradient flow measurement for the subject non-oracle frame.

FIG. 44A shows another implementation of different training increments of training the annotation network on one or more non-oracle frames. FIG. 44B shows one implementation of generating a prior annotation of a subject non-oracle frame. FIG. 44C shows one implementation of generating a posterior annotation of the subject non-oracle frame. FIG. 44D shows one implementation of the gradient flow encoder generating a gradient flow measurement for the subject non-oracle frame.

In FIG. 44A, the annotation network 3804, already trained on the oracle frames, is now further trained on N training increments (or epochs), with each epoch comprising a single non-oracle frame, or a batch or mini-batch of non-oracle frames.

In FIGS. 44B and 44C, the subject non-oracle frame is "non-oracle frame at timestep t" 4422.

In FIG. 44B, the annotation network 3804 is in the training configuration "epoch i."

In FIG. 44C the annotation network 3804 is in the training configuration "epoch i+1."

In FIG. 44B, during a first forward pass, the non-oracle frame at timestep t 4422 is processed through the annotation network 3804 in the epoch i training configuration to generate as output a first predicted attention map i 4428.

In FIG. 44C, during a second forward pass, the non-oracle frame at timestep t 4422 is processed through the annotation network 3804 in the epoch i+1 training configuration to generate as output a second predicted attention map i+1 4438.

In FIG. 44D, the gradient flow encoder 4244 processes the first predicted attention map i 4428 as input and generates an estimate 4484 of the second predicted attention map i+1 4438 as output. In one implementation, the gradient flow encoder 4244 comprises the encoder 4254 and the decoder 4274.

The encoder 4254 translates the first predicted attention map i 4428 into a compressed representation of the first predicted attention map i 4428, which is embedded in a latent space. For example, the non-oracle frames and therefore the first predicted attention map i 4428 can be of size 800×800, and the compressed representation can be of size 32×32.

This compressed representation of the first predicted attention map i 4428 is considered and used as a gradient flow embedding 4468 of the subject non-oracle frame 4422.

The decoder 4274 translates the compressed representation of the first predicted attention map i 4428 into the estimate 4484 of the second predicted attention map i+1 4438, a processed referred to as "reconstruction" because the decoder 4274 is configured to reconstruct the second predicted attention map i+1 4438 from the compressed representation of the first predicted attention map i 4428.

The gradient flow encoder 4244 is further trained by determining an error 4486 between the estimate 4484 of the second predicted attention map i+1 4438 and the second predicted attention map i+1 4438 (used a ground truth). Backpropagation 4494 trains the gradient flow encoder 4244 based on the error 4486.

Updating the Embedding Space

The embedding space into which the gradient flow embeddings for the underlying/source frames are embedded can be updated in a variety of ways. The updated embedding space in turn impacts the future sampling because the sampling logic 164 samples in dependence upon the current arrangement of the embedding space.

For example, the sampling logic 164 can sample a representative/anchor gradient flow embedding from each cluster and/or subcluster in the embedding space. Accordingly, when the clustering and/or the subclustering in the embedding space changes, the representative/anchor gradient flow embeddings that are candidates for sampling also change.

In another example, the sampling logic 164 can sample principal component (PA) gradient flow embeddings from the embedding space. Addition of newly-generated gradient flow embeddings can create new principal components (PAs), thereby varying what is sampled across sampling iterations.

In yet another example, the retraining of the annotation network causes generation of gradient flow embeddings that are configured differently from previously-generated gradient flow embeddings (e.g., the vectorized dimensional values can vary between training generations of the gradient flow embeddings). Addition of newly-configured gradient flow embeddings changes the arrangement of the embedding space, for example, by way of modifying the clustering and/or the subclustering in the embedding space, or by way of adding new principal components (PAs). This in turn results in variation in what is sampled across sampling iterations.

In a yet further example, gradient flow embeddings can be removed/dropped from the embedding space. For example, those gradient flow embeddings that are beyond a threshold distance from the center of a cluster/subcluster can be removed/dropped from the embedding space. In another example, a decay parameter can push certain previously-added gradient flow embeddings into a stale category to increase the sampling priority/likelihood of newly-added gradient flow embeddings. Addition of new gradient flow embeddings can cause certain other gradient flow embeddings to be removed/dropped from the embedding space, which in turn changes the arrangement of the embedding space, for example, by way of modifying the clustering and/or the subclustering in the embedding space, or by way of introducing new principal components (PAs). This in turn results in variation in what is sampled across sampling iterations.

Figure 45:
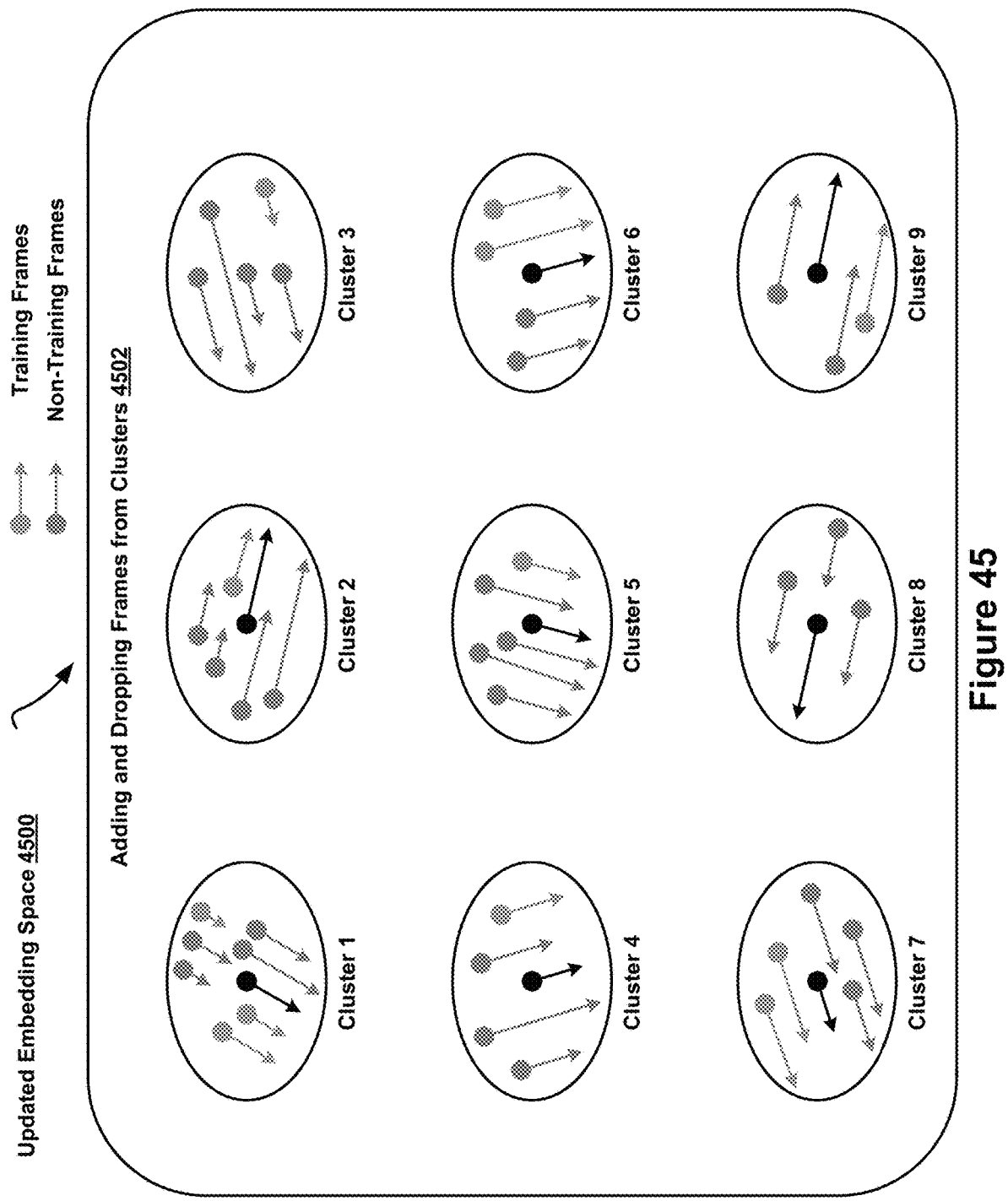
FIG. 45 depicts an updated embedding space with both training and non-training frames.

FIG. 45 depicts an updated embedding space 4500 with both training and non-training frames.

Machine-Annotated Frames

One of the objectives of the technology disclosed is to annotate unannotated frames. This is achieved by a combination of human annotations by the human oracle, and machine annotations by the annotation network.

Returning to FIG. 37, only a minority of the unannotated frames (e.g., 20%) is presented to the human oracle for user annotation, and stored as "human-annotated frames." The majority of the unannotated frames (e.g., 80%) is machine-annotated by the annotation network and not presented to the human oracle for user annotation, and stored as "machine-annotated frames" 3768.

In one implementation, the technology disclosed presents those unannotated frames to the human oracle for user annotation that qualify as "core set frames," and/or are similar to the core set frames. Core set frames are frames that guarantee a similar generation error of the trained annotation network as a plurality of the unannotated frames (e.g., the majority or the super majority of the unannotated frames). In another implementation, the core set frames best approximate a full gradient of the plurality of the unannotated frames (e.g., the majority or the super majority of the unannotated frames).

Note that the human-annotated frames are initially/preliminarily machine-annotated by the annotation network for the purposes of generating and embedding the gradient flow embeddings in the embedding space, but the human-annotated frames are subsequently presented to the human oracle for user annotation. Initial/preliminary machine annotations for the human-annotated frames give way to the more reliable human annotations (e.g., the human annotations are written over the machine annotations, or otherwise prioritized for storage or for future analysis/use).

In one implementation, the machine-annotated frames 3768 are those frames that are "non-core set frames," and/or similar to the non-core set frames, not presented to the human oracle for user annotation, and only machine-annotated by the annotation network. Non-core set frames are those frames that do not qualify as the core set frames.

Since the machine-annotated frames 3768 are not presented to the human oracle for user annotation, no ground truth attention maps are generated for the machine-annotated frames 3768, and therefore the annotation network is not trained on the machine-annotated frames 3768. In some implementations, the non-training frames 3736 coincide with the machine-annotated frames 3768.

Sampling

Figure 46:
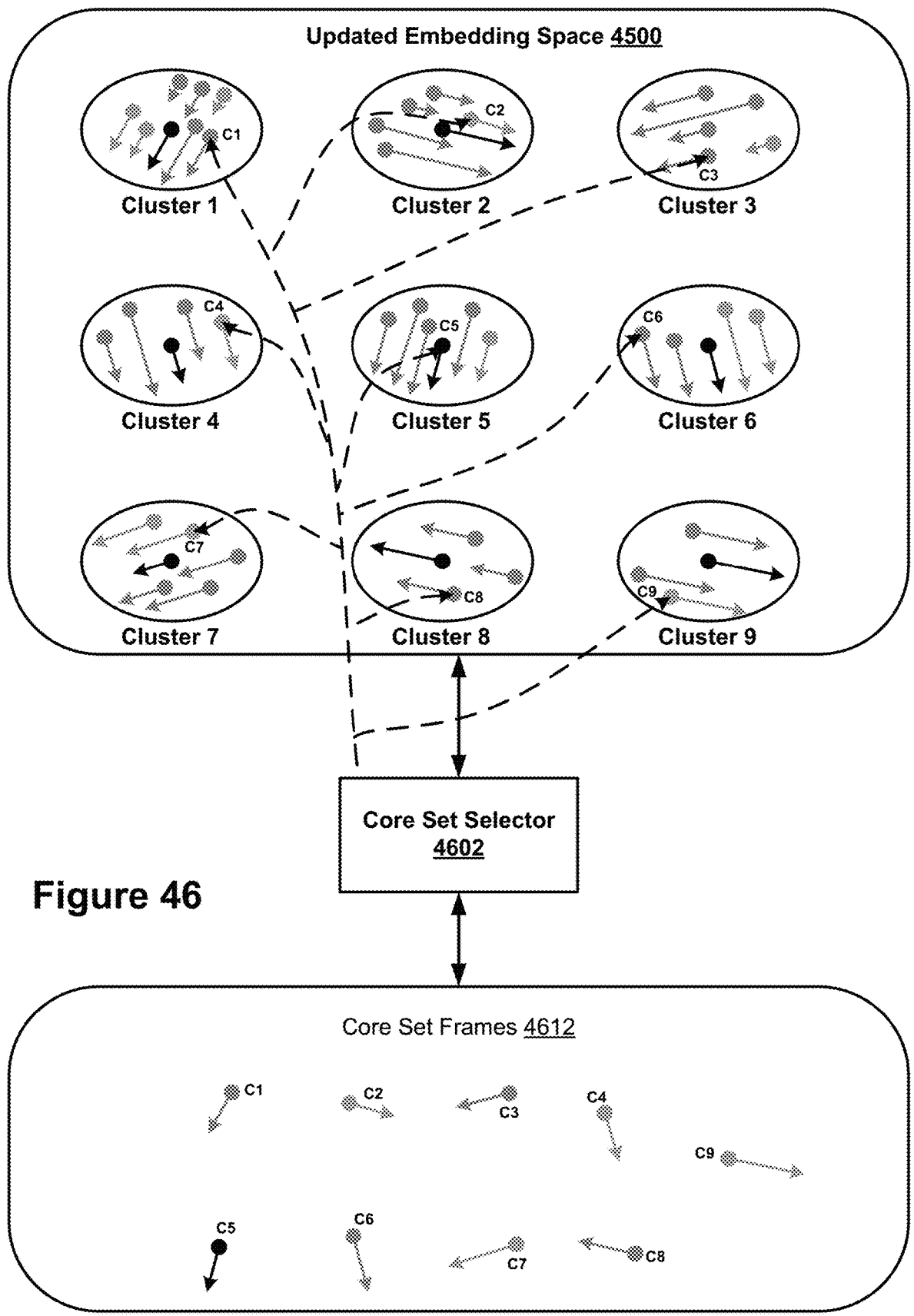
FIG. 46 shows one implementation of sampling by a core set selector.

Returning to FIG. 37, at action 3762, gradient flow embeddings are sampled from the embedding space. In one implementation, the gradient flow embeddings are sampled by the sampling logic 164. Turning to FIG. 46, the sampling logic 164 is also referred to herein as a "core set selector" 4602.

In one implementation, the core set selector 4602 can randomly sample the gradient flow embeddings. In another implementation, the core set selector 4602 can be a rule-based system (e.g., heuristics-driven). In a yet another implementation, the core set selector 4602 can be a tree-based system (e.g., a B-tree). In a yet further implementation, the core set selector 4602 can be a machine-learned system (e.g., a neural network).

The gradient flow embeddings sampled by the core set selector 4602 can be identified as core set frames 4612. In the implementation illustrated in FIG. 46, the core set selector 4602 samples a gradient flow embedding from each of the clusters in the embedding space.

Receiving User Feedback and Updating Core Set Selector Logic

The sampled core set frames 4612 are presented to the human oracle as candidates for annotation. As discussed above, the human oracle can select the sampled core set frames 4612, can dismiss the sampled core set frames 4612, and can annotate the sampled core set frames 4612. The selection, the dismissal, and/or the annotation by the human oracle are provided as supervisory signals to the core set selector 4602 for future sampling.

In one implementation, during future samplings, the core set selector 4602 is configured to increase the sampling priority/likelihood of those gradient flow embeddings whose corresponding frames were selected or selected-and-annotated by the human oracle. In some implementations, selected-and-annotated frames are prioritized over just selected frames.

In one implementation, during the future samplings, the core set selector 4602 is configured to decrease the sampling priority/likelihood of those gradient flow embeddings whose corresponding frames were dismissed by the human oracle.

In one implementation, during the future samplings, the core set selector 4602 is configured to increase the sampling priority/likelihood of gradient flow embeddings for those frames that are configured similarly to those frames that were selected or selected-and-annotated by the human oracle. Examples of "configured similarly" include visually similar, co-clustered in the embedding space, distance-wise within a proximity range in the embedding space.

In one implementation, during the future samplings, the core set selector 4602 is configured to decrease the sampling priority/likelihood of gradient flow embeddings for those frames that are configured similarly to those frames that were dismissed by the human oracle.

In other implementations, what is sampled by the core set selector 4602 can also vary due to the changes in the embedding space, as discussed above.

Ranking Sampled Frames—Template Network

In some implementations, prior to the presentation to the human oracle, the sampled core set frames 4612 are ranked, and then presented to the human oracle in a ranked order.

Figure 47:
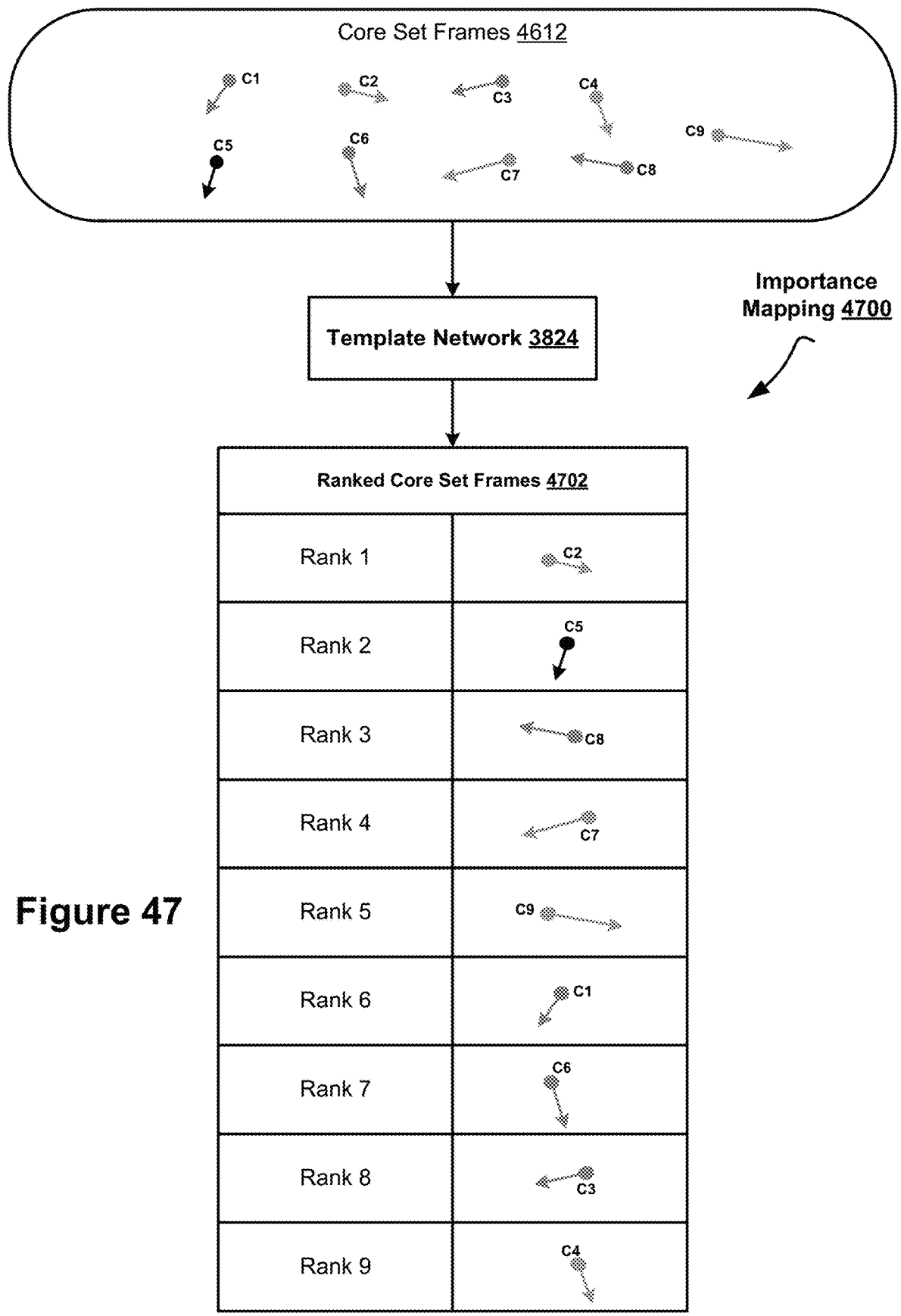
FIG. 47 depicts one implementation of ranking sampled core set frames using a template network.

Returning to FIG. 37, at action 3772, the sampled gradient flow embeddings are ranked, for example, based on their importance. Turning to FIG. 47, FIG. 47 depicts one implementation of ranking the sampled core set frames 4612 using a template network 3824 based on an importance mapping 4700.

In one implementation, the template network 3824 can be a rule-based system (e.g., heuristics-driven). In another implementation, the template network 3824 can be a tree-based system (e.g., a B-tree). In a yet another implementation, the template network 3824 can be a machine-learned system (e.g., a neural network).

In one implementation, the template network 3824 is a MNIST neural network that takes as input a concatenated form of the gradient flow embeddings for the sampled core set frames 4612, and produces as output a ranking 4702 of the gradient flow embeddings for the sampled core set frames 4612.

In some implementations, the template network 3824 is trained using cross-validation accuracy on ablated frames.

ReRankinig Sampled Frames—Attention Network

In some implementations, prior to the presentation to the human oracle, the sampled and ranked core set frames 4702 are reranked, and then presented to the human oracle in a reranked order.

Figure 48:
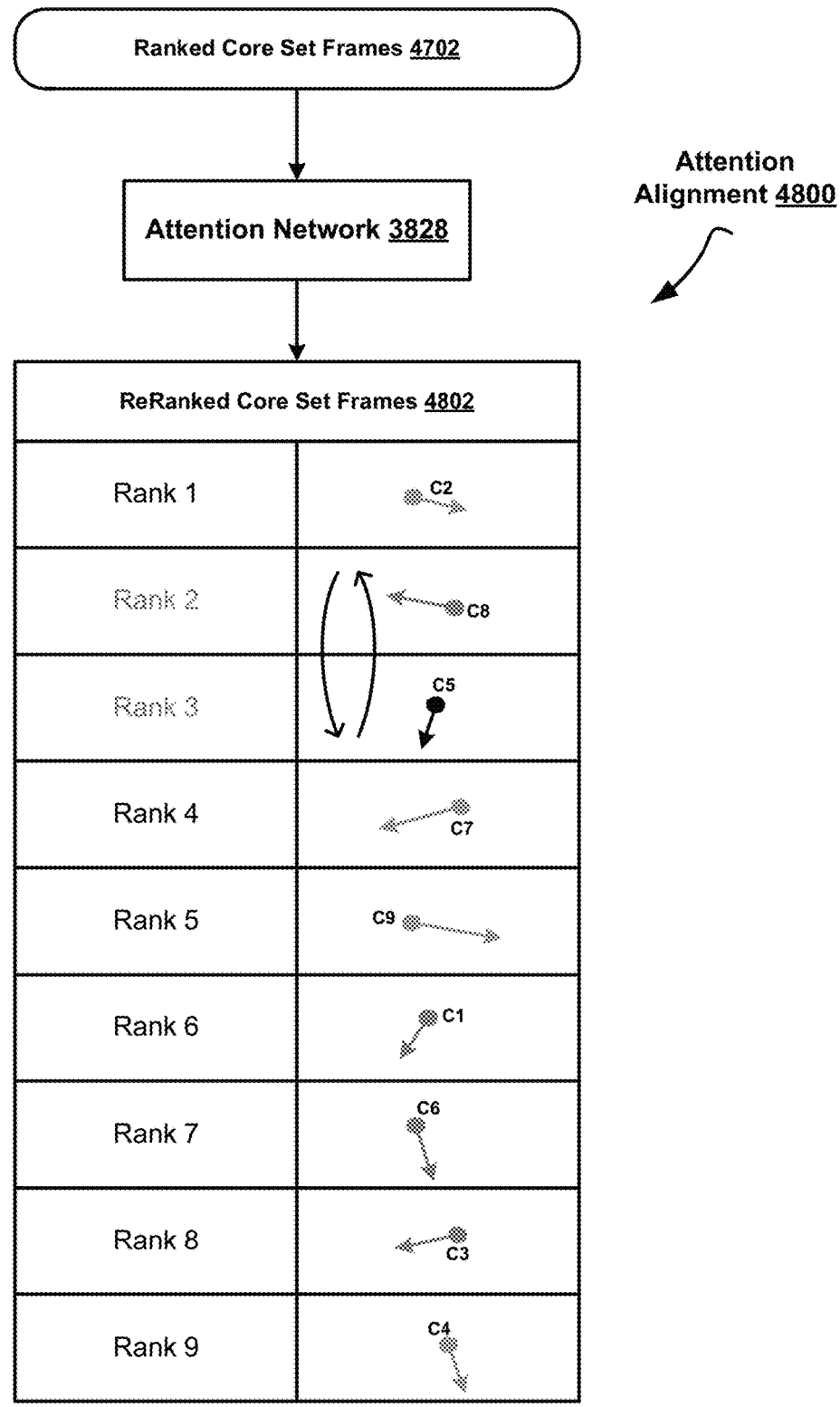
FIG. 48 depicts one implementation of reranking the sampled and ranked core set frames using an attention network.

Returning to FIG. 37, at action 3782, the sampled and ranked core set frames 4702 are reranked, for example, based on attention alignment across multiple video sources and multiple template networks. Turning to FIG. 48, FIG. 48 depicts one implementation of reranking the sampled and ranked core set frames 4702 using an attention network 3828 based on an attention alignment 4800.

In one implementation, the attention network 3828 can be a rule-based system (e.g., heuristics-driven). In another implementation, the attention network 3828 can be a tree-based system (e.g., a B-tree). In a yet another implementation, the attention network 3828 can be a machine-learned system (e.g., a neural network).

Figure 49:
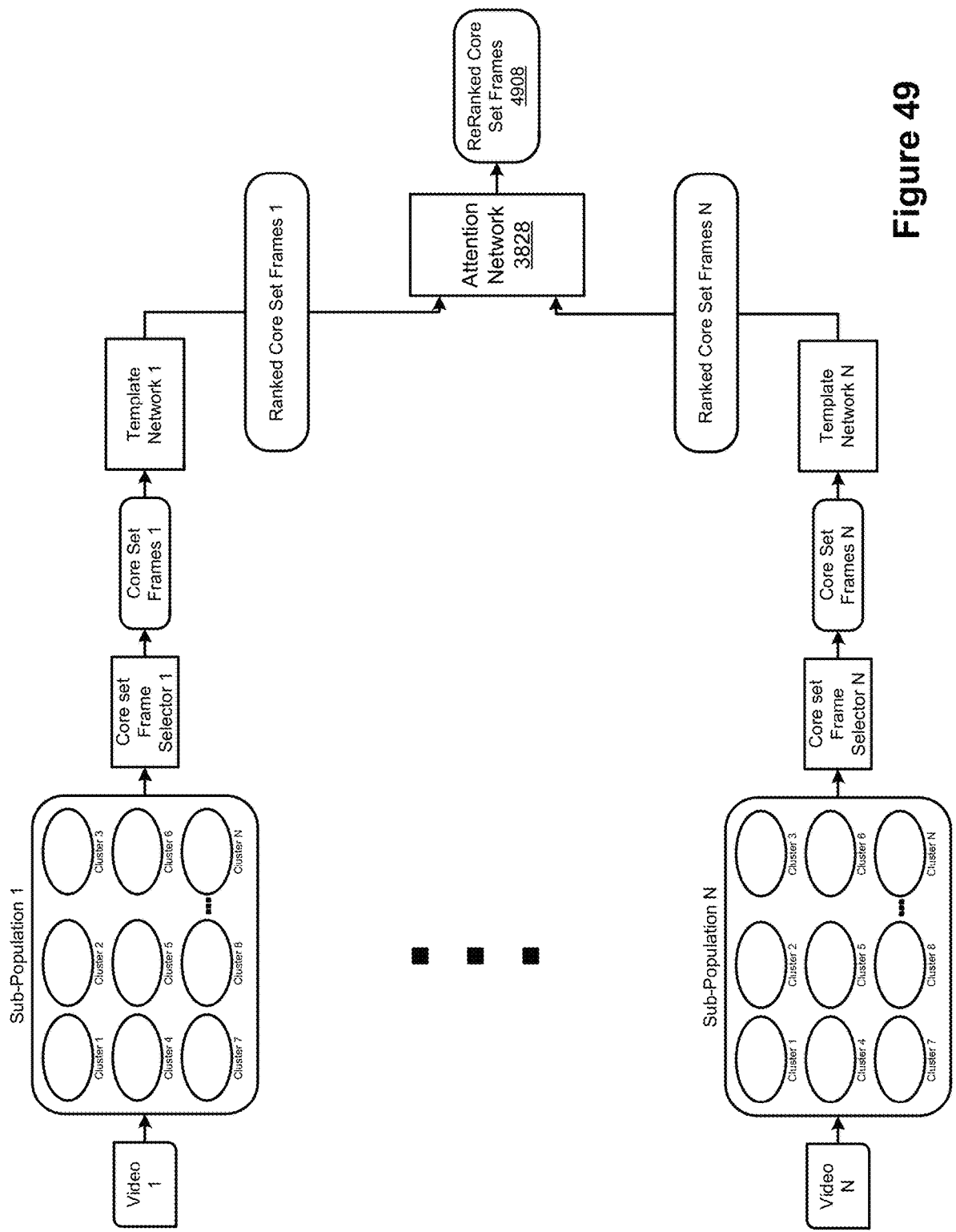
FIG. 49 illustrates an example of how the attention network aligns ranking outputs of multiple template networks exercised over multiple frame populations/sub-populations extracted from multiple videos.
Figure 50A:
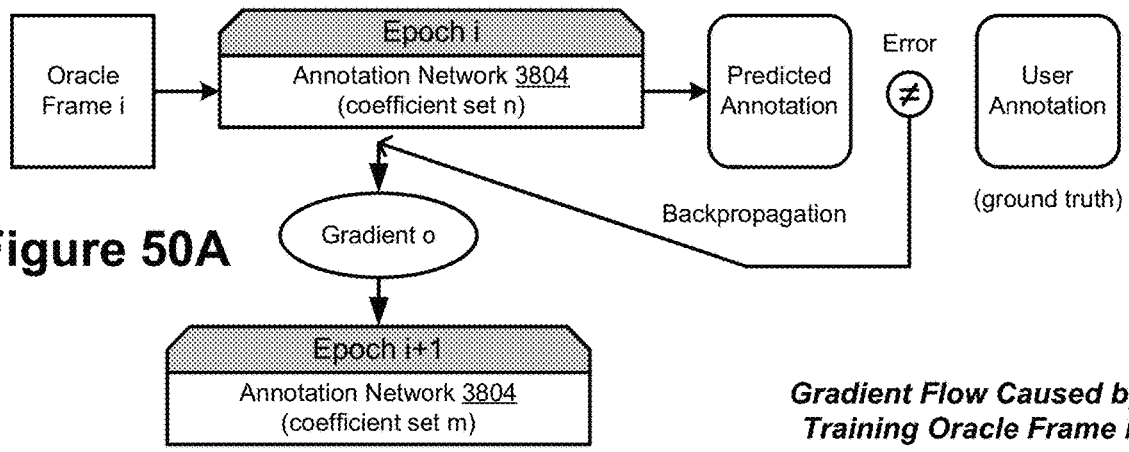
FIGS. 50A and 50B illustrate computational efficiency of the technology disclosed, in accordance with one implementation.
Figure 50B:
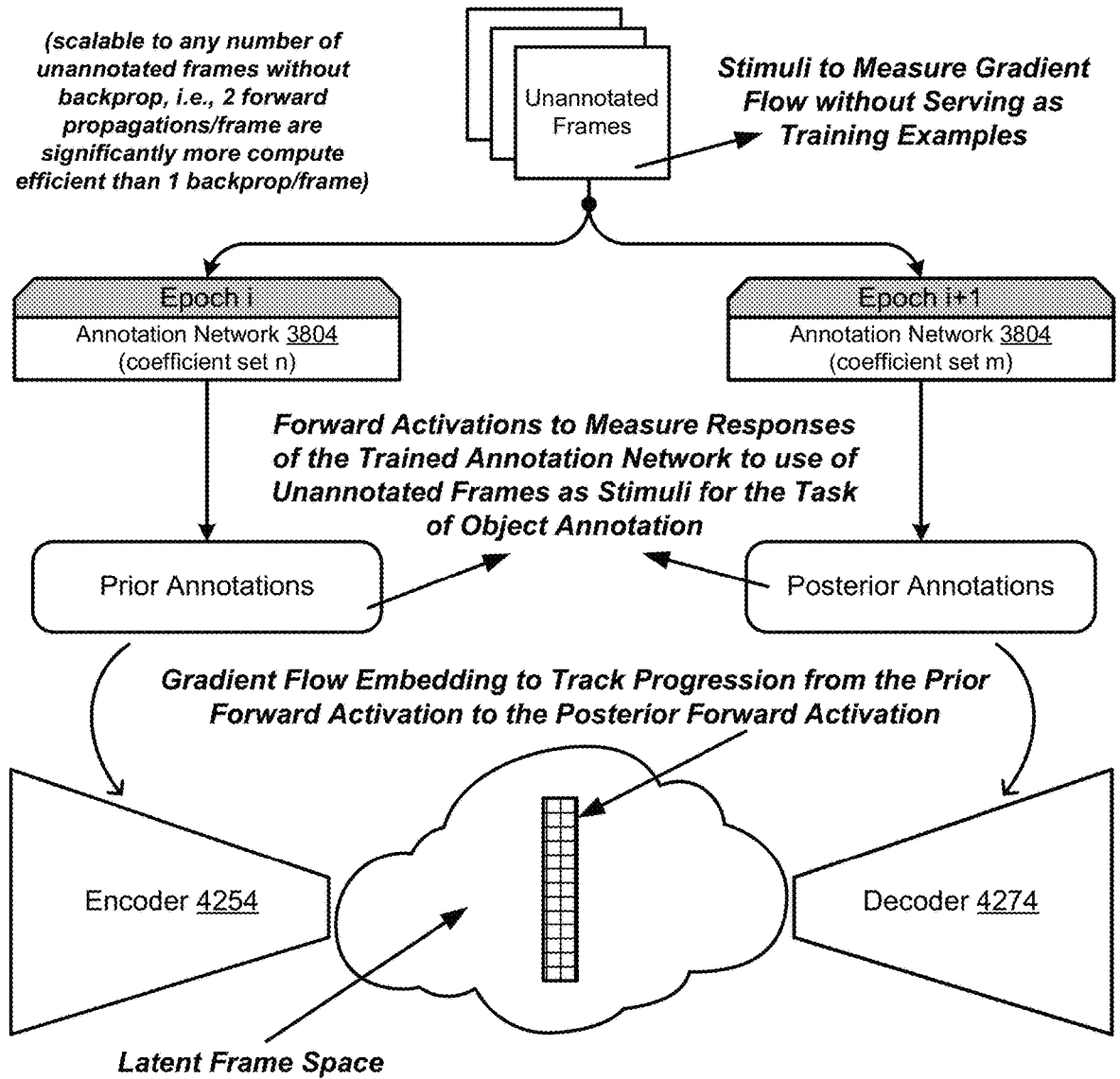
Figure 51A:
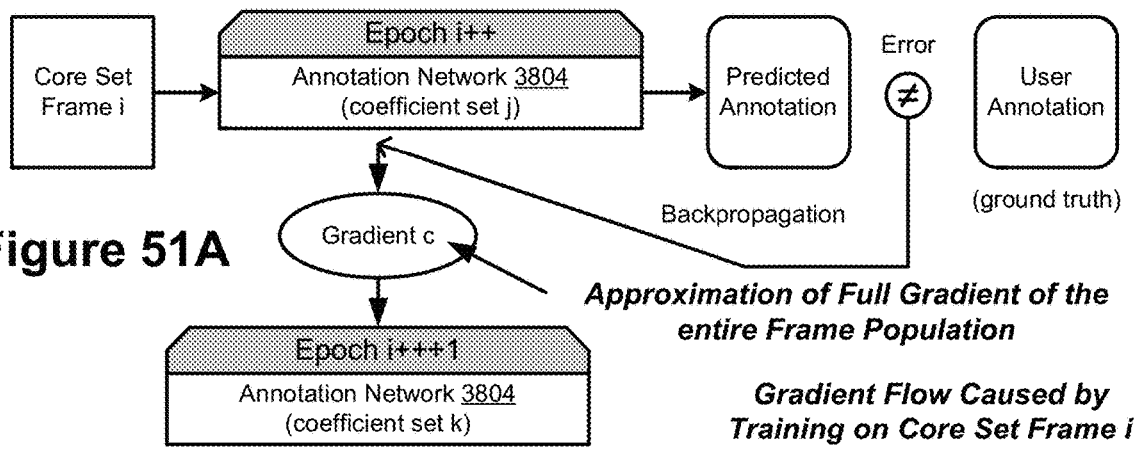
FIGS. 51A and 51B illustrate computational efficiency of the technology disclosed, in accordance with another implementation.
Figure 51B:
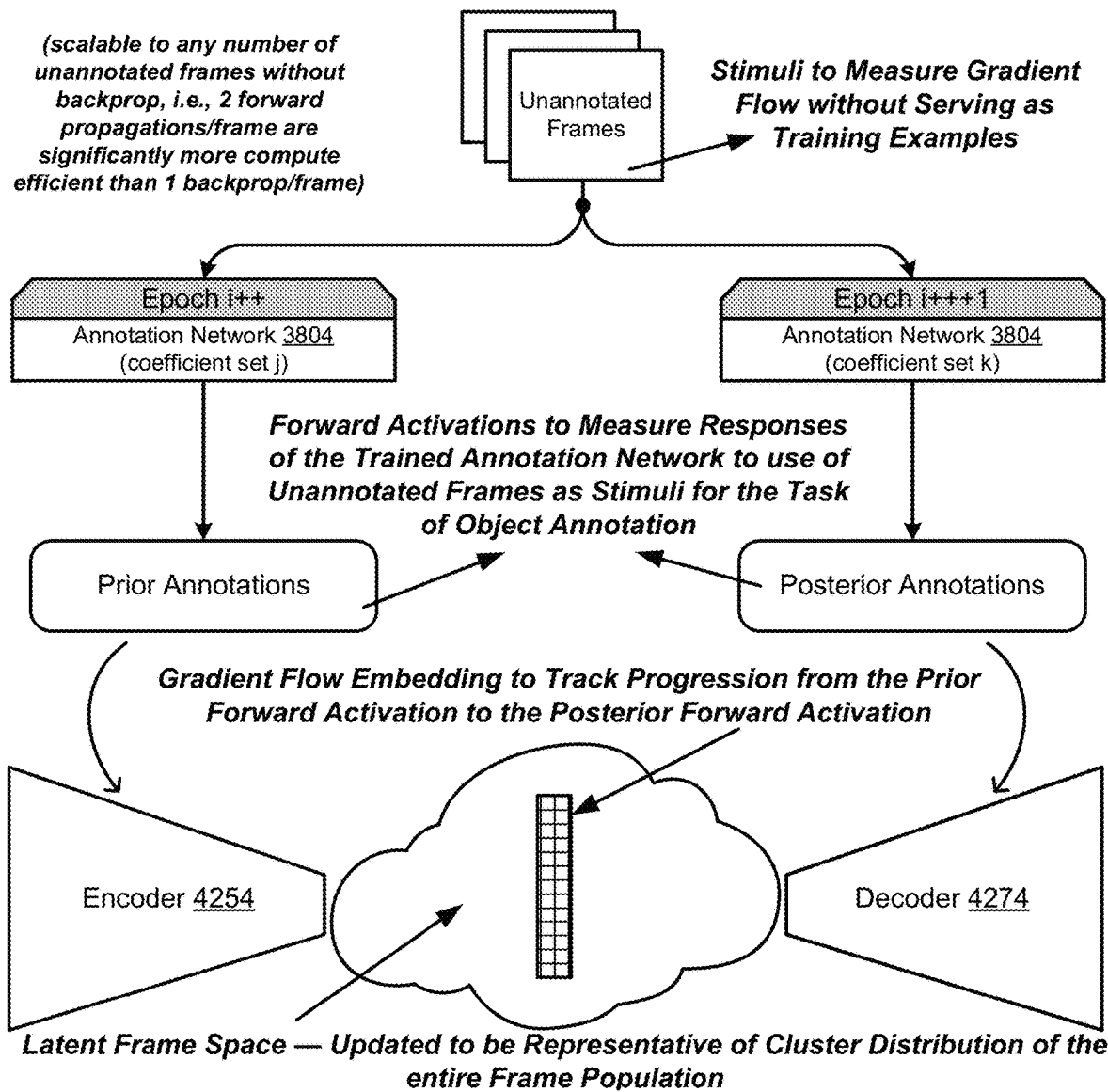

In one implementation, the attention network 3828 takes as input the outputs of multiple template networks exercised over multiple frame populations/sub-populations from multiple videos, and produces as output a reranking 4908 of the gradient flow embeddings for the sampled and ranked core set frames 4702. This is illustrated in FIG. 49.

In some implementations, the attention network 3828 is trained using the selection, the dismissal, and/or the annotation by the human oracle are provided as supervisory signals, sometimes weighted by ranking among the selections and/or time delay in the selections.

Returning to FIG. 37, at action 3792, the sampled and reranked core set frames 4908 are presented to the human oracle for user annotation, for example, via the user interface discussed above. The user-annotated frames 3784 are made available for training the annotation network.

The user feedback 3794 (e.g., the selection, the dismissal, the annotation) is used for training 3744 the annotation network (e.g., via the user-annotated objects-of-interests 3796), for training 3778 the template network (e.g., via the ranked order determined by the order in which the human oracle selected/inspected the recommended/suggested frames), and for training 3788 the attention network (e.g., via the selection, the dismissal, the annotation choices encoded as user-interacted frames 3798).

Additional Implementations

FIGS. 38, 39, 50A, 50B, 51A, and 5B illustrate various implementations of the technology disclosed.

Figure 38:
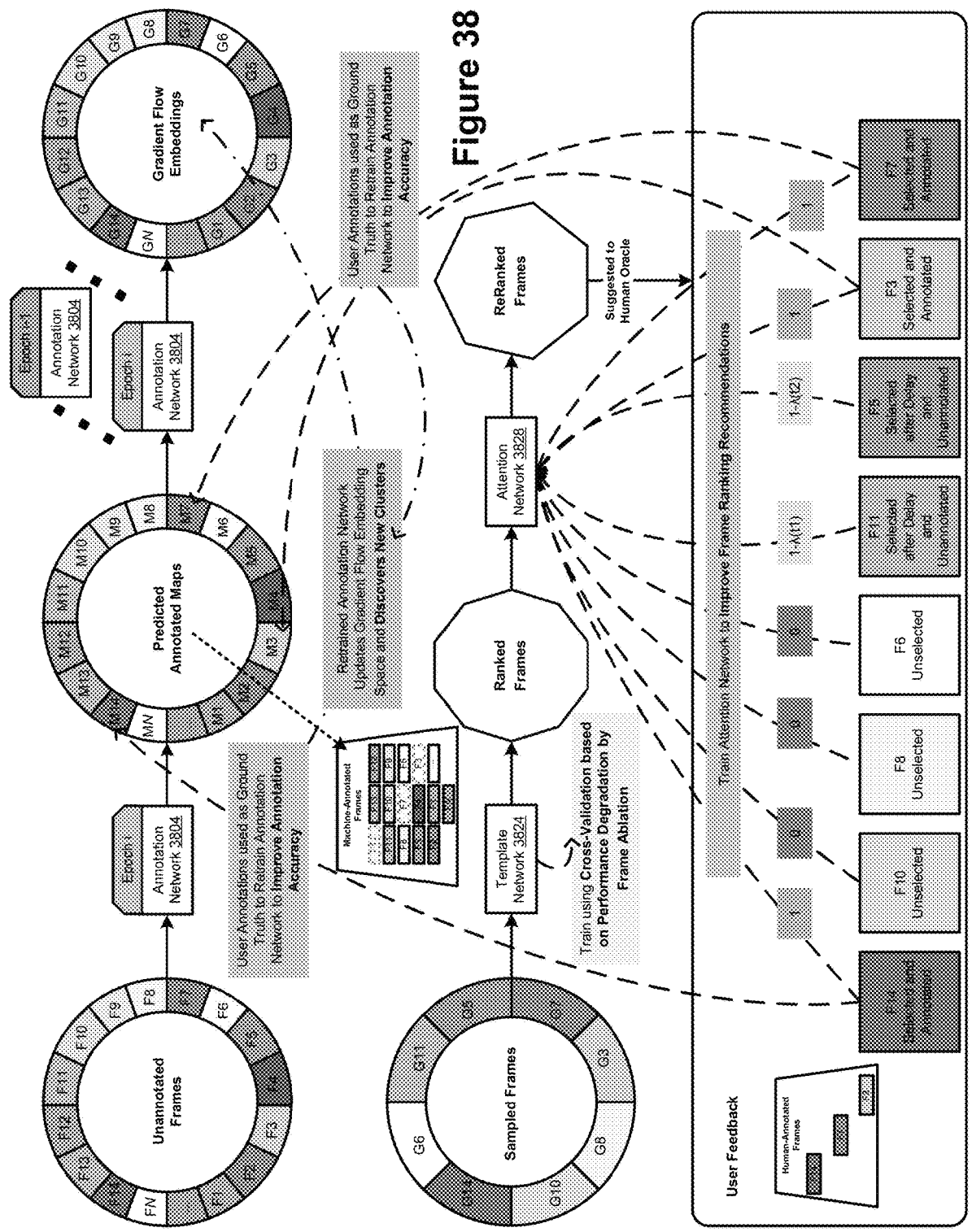
FIG. 38 is another high-level diagram of various aspects of the technology disclosed.

FIG. 38 shows that suggested frames F14, F7, and F3 are selected-and-annotated by the human oracle. Suggested frames F11 and F5 are only selected by the human oracle and not annotated. Sampling priority of these frames or other frames like these frames is increased in future sampling by propagating the user feedback/interaction of the human oracle by means of the frame selection and annotation to various components of the disclosed system, including the sampling logic (the core set selector), the ranking logic (the template network), the reranking logic (the attention network), and the annotation logic (the annotation network).

FIG. 38 also shows that suggested frames F10, F8, and F6 are dismissed by the human oracle. Sampling priority of these frames or other frames like these frames is decreased in future sampling by propagating the user feedback/interaction of the human oracle by means of the frame dismissal to the various components of the disclosed system, including the sampling logic (the core set selector), the ranking logic (the template network), the reranking logic (the attention network), and the annotation logic (the annotation network).

Figure 39:
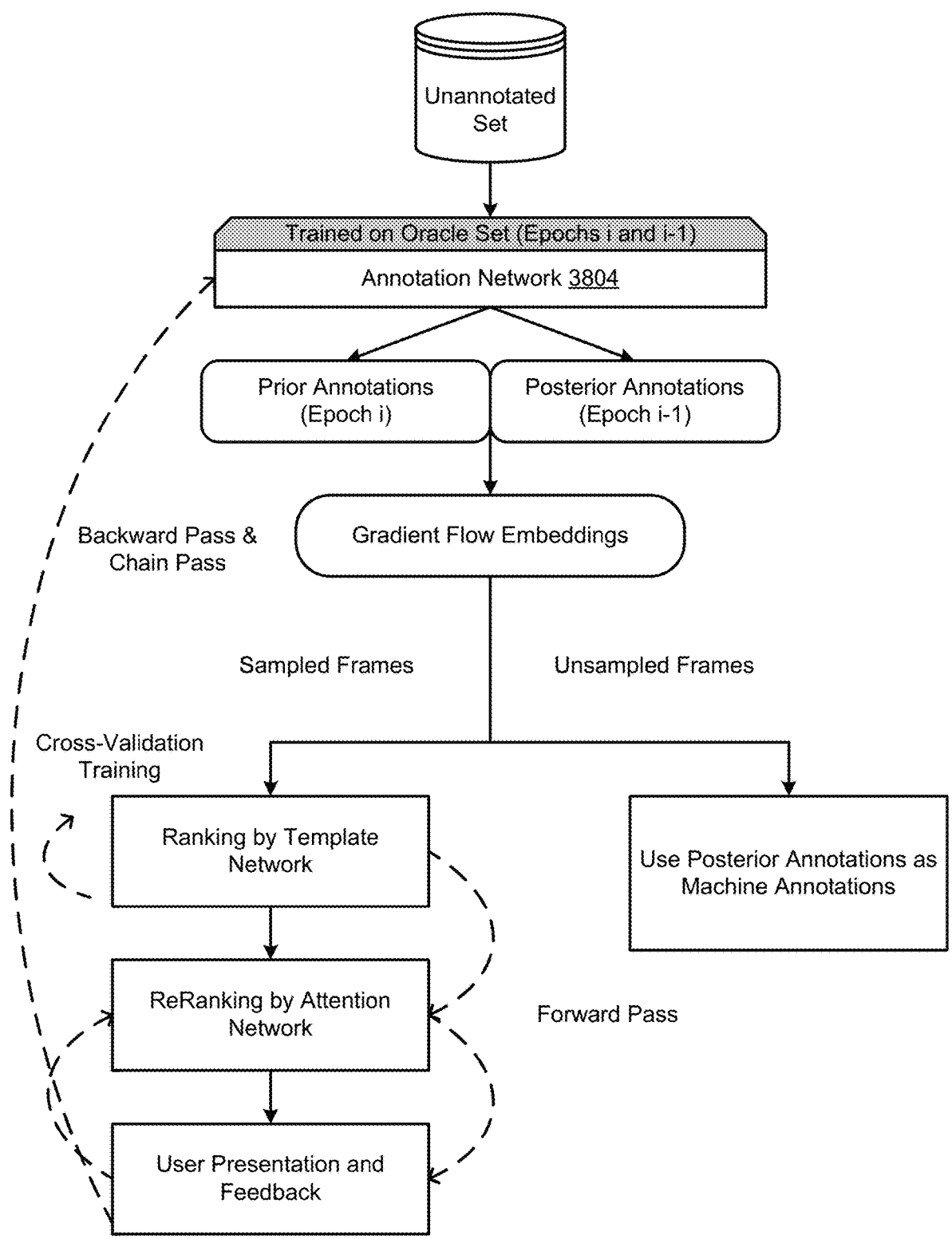
FIG. 39 is yet another high-level diagram of various aspects of the technology disclosed.

FIG. 39 shows that the sampled frames are ranked, reranked, and user annotated. User feedback on the sampled frames is used to retrain the various components of the disclosed system, including the sampling logic (the core set selector), the ranking logic (the template network), the reranking logic (the attention network), and the annotation logic (the annotation network).

FIG. 39 also shows that the unsampled frames are machine-annotated by the annotation network, which is trained on the sampled frames, in some implementations.

An Additional Technical Advantage—Compute and Training Time Savings

FIGS. 50A, 50B, 51A, and 51B show that instead of embedding each unannotated frame in the embedding space using respective backward passes, the technology disclosed can embed the majority of the unannotated set in the embedding space by using only forward passes, for example, two forward passes per unannotated set, one for the posterior activation and another for the prior activation. This saves considerable amount of compute and processing/training time because backward-propagation is significantly more compute-intensive than forward-propagation.

Computer System

Figure 52:
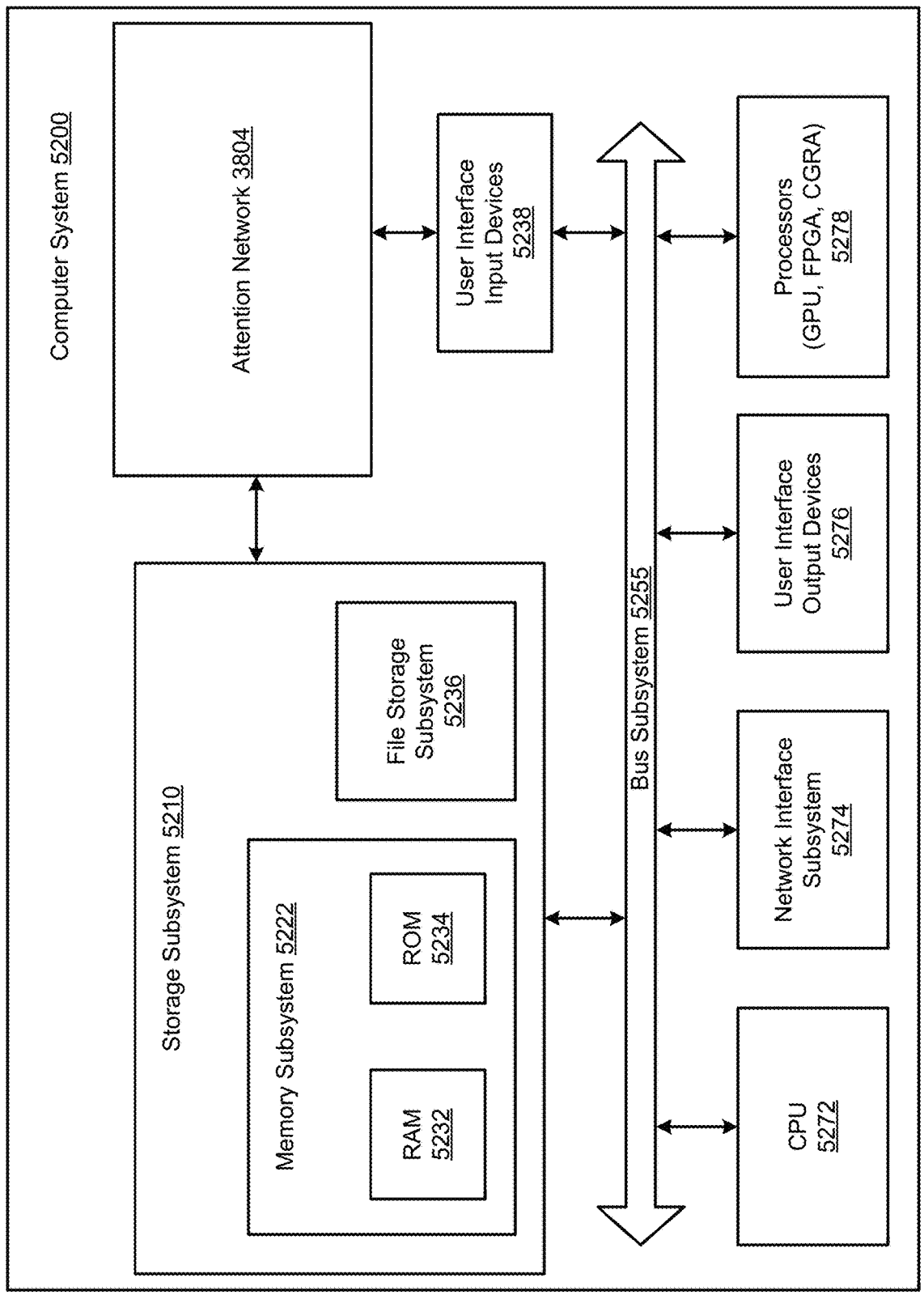
FIG. 52 shows an example computer system that can be used to implement the technology disclosed.

FIG. 52 shows an example computer system 5200 that can be used to implement the technology disclosed. Computer system 5200 includes at least one central processing unit (CPU) 5272 that communicates with a number of peripheral devices via bus subsystem 5255. These peripheral devices can include a storage subsystem 5210 including, for example, memory devices and a file storage subsystem 5236, user interface input devices 5238, user interface output devices 5276, and a network interface subsystem 5274. The input and output devices allow user interaction with computer system 5200. Network interface subsystem 5274 provides an interface to outside networks, including an interface to corresponding interface devices in other computer systems.

In one implementation, the annotation network 3804 is communicably linked to the storage subsystem 5210 and the user interface input devices 5238.

User interface input devices 5238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 5200.

User interface output devices 5276 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 5200 to the user or to another machine or computer system.

Storage subsystem 5210 stores programming and data constructs that provide the functionality of some or all of the modules and methods described herein. These software modules are generally executed by processors 5278.

Processors 5278 can be graphics processing units (GPUs), field-programmable gate arrays (FPGAs), application-specific integrated circuits (ASICs), and/or coarse-grained reconfigurable architectures (CGRAs). Processors 5278 can be hosted by a deep learning cloud platform such as Google Cloud Platform™, Xilinx™, and Cirrascale™. Examples of processors 5278 include Google's Tensor Processing Unit (TPU)™, rackmount solutions like GX4 Rackmount Series™, GX52 Rackmount Series™, NVIDIA DGX-1™, Microsoft' Stratix V FPGA™, Graphcore's Intelligent Processor Unit (IPU)™, Qualcomm's Zeroth Platform™ with Snapdragon processors™, NVIDIA's Volta™, NVIDIA's DRIVE PX™, NVIDIA's JETSON TX1/TX2 MODULE™, Intel's Nirvana™, Movidius VPU™, Fujitsu DPI™, ARM's DynamicIQ™, IBM TrueNorth™, Lambda GPU Server with Testa V100s™, and others.

Memory subsystem 5222 used in the storage subsystem 5210 can include a number of memories including a main random access memory (RAM) 5232 for storage of instructions and data during program execution and a read only memory (ROM) 5234 in which fixed instructions are stored. A file storage subsystem 5236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 5236 in the storage subsystem 5210, or in other machines accessible by the processor.

Bus subsystem 5255 provides a mechanism for letting the various components and subsystems of computer system 5200 communicate with each other as intended. Although bus subsystem 5255 is shown schematically as a single bus, alternative implementations of the bus subsystem can use multiple busses.

Computer system 5200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 5200 depicted in FIG. 52 is intended only as a specific example for purposes of illustrating the preferred implementations of the present invention. Many other configurations of computer system 5200 are possible having more or less components than the computer system depicted in FIG. 52.

Summary

The technology disclosed presents a system that comprises a memory, a data partitioning logic, and an annotation logic.

The memory stores a sequence of frames of a video.

The data partitioning logic is configured to partition the sequence of frames into an oracle set and an unannotated set. Frames in the oracle set are annotated by a user. Frames in the unannotated set are candidates for user annotation by the user and thereby for inclusion in the oracle set conditional upon being members of a core set, and for machine annotation by an annotation network trained on the oracle set conditional upon being non-members of the core set.

The annotation logic is configured to generate annotations for the frames in the unannotated set. The annotations include user annotations, by the user, for a first subset of frames in the unannotated set. The first subset of frames includes those frames that are recommended to the user for being the members of the core set and are selected by the user for annotation.

The annotations include machine annotations, by the trained annotation network, for a second subset of frames in the unannotated set. The second subset of frames includes those frames that are not recommended to the user for being the non-members of the core set, and those frames that are recommended to the user for being the members of the core set but are not selected by the user for annotation.

In one implementation, the annotation logic is further configured to generate the annotations for the frames in the unannotated set over a plurality of iterations.

In some implementations, a forward pass of a training category of iterations in the plurality of iterations includes the following.

First, a prior annotation logic is configured to process a subject frame in the unannotated set through a prior training configuration of the trained annotation network, and to generate a prior annotation for the subject frame.

Second, a posterior annotation logic is configured to process the subject frame through a posterior training configuration of the trained annotation network, and to generate a posterior annotation for the subject frame.

Third, a gradient flow encoder is configured to generate a gradient flow measurement for the subject frame, and to embed the gradient flow measurement in a latent frame space constructed from previous gradient flow measurements.

Fourth, a core set sampling logic is configured to select a plurality of gradient flow measurements from the latent frame space.

Fifth, a template network is configured to generate rankings for gradient flow measurements in the plurality of gradient flow measurements based on comparing contributions of associated frames to ablation-based accuracy metrics of the trained annotation network.

Sixth, an alignment network is configured to generate rerankings for the ranked gradient flow measurements based on past user responses to prior frame recommendations.

Seventh, a frame recommendation logic is configured to reorder the associated frames according to the rerankings, and to present the reordered associated frames to the user for annotation via an interface.

Eighth, the annotation logic is further configured to include in the first subset of frames at least one of the reordered associated frames for which an annotation is received from the user, and to store the annotation as a user annotation for the at least one of the reordered associated frames.

In one implementation, the subject frame is one of the reordered associated frames. In another implementation, the subject frame is the at least one of the reordered associated frames for which the annotation is received from the user. In yet another implementation, the subject frame is not the at least one of the reordered associated frames for which the annotation is received from the user. In yet another implementation, the subject frame is not one of the reordered associated frames.

In one implementation, the prior annotation is a first attention map that identifies a first configuration of regions-of-interest in the subject frame. In one implementation, the posterior annotation is a second attention map that identifies a second configuration of the regions-of-interest in the subject frame.

In one implementation, the gradient flow encoder is further configured to generate the gradient flow measurement as an intermediate, compressed representation (e.g., 32×32 dimensions) in response to the prior annotation being processed as input and replicating (or reconstructing) the posterior annotation as output. In one implementation, the gradient flow measurement encodes progression of gradient updates to coefficients of the trained annotation network from the prior training configuration to the posterior training configuration.

In another implementation, the latent frame space clusters gradient flow measurements and thereby the frames in the unannotated set into discrete latent frame subspaces.

In one implementation, the core set sampling logic is implemented by a rule-based selector configured to select at least one gradient flow measurement from each of the latent frame subspaces. In another implementation, the core set sampling logic is implemented by a tree-based selector configured to select the plurality of gradient flow measurements based on importance. In yet another implementation, the core set sampling logic is implemented by a neural network configured to select the plurality of gradient flow measurements based on supervisory signals learned during training. In yet another implementation, the core set sampling logic is further configured to randomly select the plurality of gradient flow measurements from the latent frame space.

In one implementation, a contribution of an associated frame to the ablation-based accuracy metrics of the trained annotation network is determined by generating a dependent training configuration of the annotation network based on training the annotation network on a first training set that includes the associated frame, generating an independent training configuration of the annotation network based on training the annotation network on a second training set that excludes the associated frame, calculating a dependent annotation accuracy by applying the dependent training configuration of the annotation network on a validation set, calculating an independent annotation accuracy by applying the independent training configuration of the annotation network on the validation set, and measuring a difference between the dependent annotation accuracy and the independent annotation accuracy.

In one implementation, the template network is implemented by a neural network configured to generate the rankings of the gradient flow measurements based on the contributions of the associated frames to the ablation-based accuracy metrics of the trained annotation network.

In one implementation, the technology disclosed has respective template networks for respective sequences of frames of respective videos.

In one implementation, the alignment network processes outputs of the respective template networks, and produces rerankings for ranked gradient flow measurements.

In one implementation, the past user responses to the prior frame recommendations are categorized as user selection of frames, user non-selection of frames, and time delay in user's evaluation of frames.

In one implementation, the alignment network is further configured to generate the rerankings for the ranked gradient flow measurements based on the past user responses to those previously recommended frames that share respective latent frame subspaces with the associated frames.

In one implementation, the alignment network is implemented by a neural network configured to generate the rerankings for the ranked gradient flow measurements based on training that spans ground truth categories across user selection of frames (e.g., ground truth label "1"), user non-selection of frames (e.g., ground truth label "0"), and time delay in user's evaluation of frames (e.g., ground truth label "1-λt", where t is time delay).

In some implementations, a backward pass of the training category of iterations in the plurality of iterations includes the following.

First, a ranking alignment training logic is configured to further train the alignment network based on comparing the rerankings against current user responses to the reordered associated frames.

Second, a template training logic is configured to further train the template network based on comparing the rankings of the gradient flow measurements against the contributions of the associated frames to the ablation-based accuracy metrics of the trained annotation network.

Third, an annotation network training logic configured to further train the annotation network based on comparing a posterior annotation for the at least one of the reordered associated frames for which the annotation is received from the user against the user annotation.

In one implementation, retraining the ranking alignment training logic based on the current user responses changes rankings of the latent frame subspaces from a sampling perspective of the core set sampling logic by ranking those latent frame subspaces higher whose associated frames are selected by the user.

In another implementation, retraining the annotation network training logic based on the user annotation restructures the latent frame subspaces (e.g., creates new clusters, modifies old clusters by adding or dropping embeddings) from the sampling perspective of the core set sampling logic by directing a gradient flow of the trained annotation network to be a best approximation of a full gradient flow of the sequence of the frames of the video, and amending the latent frame subspaces to be more representative of cluster distributions in an embedding space of the sequence of the frames of the video.

In some implementations, a non-training category of iterations in the plurality of iterations includes the following.

First, the prior annotation logic is configured to process a subject frame in the unannotated set through a prior training configuration of the trained annotation network, and to generate a prior annotation for the subject frame.

Second, the posterior annotation logic is configured to process the subject frame through a posterior training configuration of the trained annotation network, and to generate a posterior annotation for the subject frame.

Third, the gradient flow encoder is configured to generate a gradient flow measurement for the subject frame, and to embed the gradient flow measurement in the latent frame space constructed from previous gradient flow measurements.

Fourth, the annotation logic is further configured to include the subject frame in the second subset of frames, and to store the posterior annotation as a machine annotation for the subject frame.

In one implementation, the prior annotation is a first attention map that identifies a first configuration of regions-of-interest in the subject frame. In one implementation, the posterior annotation is a second attention map that identifies a second configuration of the regions-of-interest in the subject frame.

In some implementations, the training category of iterations and the non-training category of iterations repeat at a frequency of one to four in the plurality of iterations. In one implementation, the substantially fit is defined by a majority of the plurality of frames (e.g., 50% or more frames in the plurality of frames). In another implementation, the substantially fit is defined by a supermajority of the plurality of frames (e.g., 60%, 70%, 80%, 90% or more frames in the plurality of frames).

In one implementation, the core set guarantees a similar generation error of the trained annotation network as the plurality of frames. In another implementation, the core set best approximates a full gradient of the plurality of frames.

In another implementation, the technology disclosed presents a system that comprises a memory, a data partitioning logic, and an annotation logic.

The memory stores a sequence of frames of a video.

The data partitioning logic is configured to partition the sequence of frames into an oracle set and an unannotated set. Frames in the oracle set are annotated by a user. Frames in the unannotated set are candidates for user annotation by the user and thereby for inclusion in the oracle set conditional upon being members of a core set, and for machine annotation by an annotation network trained on the oracle set conditional upon being non-members of the core set.

The annotation logic is configured to generate annotations for the frames in the unannotated set. The annotations include user annotations, by the user, for a first subset of frames in the unannotated set. The first subset of frames includes those frames that are recommended to the user for being the members of the core set.

The annotations include machine annotations, by the trained annotation network, for a second subset of frames in the unannotated set. The second subset of frames includes those frames that are not recommended to the user for being the non-members of the core set.

In another implementation, the technology disclosed presents a system that comprises a memory, a data partitioning logic, and an annotation logic.

The memory stores a sequence of frames of a video.

The data partitioning logic is configured to partition the sequence of frames into an oracle set and an unannotated set. Frames in the oracle set are annotated by a user. Frames in the unannotated set are candidates for user annotation conditional upon being members of a core set, and for machine annotation conditional upon being non-members of the core set.

The annotation logic is configured to generate annotations for the frames in the unannotated set. The annotations include user annotations based on membership in the core set, and machine annotations based on non-membership in the core set.

Clauses

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

One or more implementations and clauses of the technology disclosed or elements thereof can be implemented in the form of a computer product, including a non-transitory computer readable storage medium with computer usable program code for performing the method steps indicated. Furthermore, one or more implementations and clauses of the technology disclosed or elements thereof can be implemented in the form of an apparatus including a memory and at least one processor that is coupled to the memory and operative to perform exemplary method steps. Yet further, in another aspect, one or more implementations and clauses of the technology disclosed or elements thereof can be implemented in the form of means for carrying out one or more of the method steps described herein; the means can include (i) hardware module(s), (ii) software module(s) executing on one or more hardware processors, or (iii) a combination of hardware and software modules; any of (i)-(iii) implement the specific techniques set forth herein, and the software modules are stored in a computer readable storage medium (or multiple such media).

The clauses described in this section can be combined as features. In the interest of conciseness, the combinations of features are not individually enumerated and are not repeated with each base set of features. The reader will understand how features identified in the clauses described in this section can readily be combined with sets of base features identified as implementations in other sections of this application. These clauses are not meant to be mutually exclusive, exhaustive, or restrictive; and the technology disclosed is not limited to these clauses but rather encompasses all possible combinations, modifications, and variations within the scope of the claimed technology and its equivalents.

Other implementations of the clauses described in this section can include a non-transitory computer readable storage medium storing instructions executable by a processor to perform any of the clauses described in this section. Yet another implementation of the clauses described in this section can include a system including memory and one or more processors operable to execute instructions, stored in the memory, to perform any of the clauses described in this section.

We disclose the following clauses:
Clause Set 1
1. A computer-implemented method of core set discovery, including:
   in cycles,
   clustering and subclustering a set of images to group visually similar images into subclusters;
   sampling images from the subclusters; presenting a panel of sampled images to a user;
   monitoring the user's selection of first images among the sampled images; monitoring the user's non-selection of second images among the sampled images; using the user's selection of the first images to increase sampling priority for first subclusters to which the first images belong; and
   using the user's non-selection of the second images to decrease sampling priority for second subclusters to which the second images belong.
2. The computer-implemented method of clause 1, wherein the sampled images are presented to the user with machine annotations.
3. The computer-implemented method of clause 2, wherein the machine annotations are generated by one or more annotation logics.
4. The computer-implemented method of clause 2, wherein the machine annotations are bounding boxes drawn around objects-of-interest depicted in the sampled images.
5. The computer-implemented method of clause 1, further including: monitoring the user's annotation of the first images.
6. The computer-implemented method of clause 5, further including:
   using the user's annotation of the first images to further increase the sampling priority for the first subclusters to which the first images belong.
7. The computer-implemented method of clause 5, wherein the user's annotation further includes the user drawing bounding boxes around the objects-of-interest depicted in the sampled images.
8. The computer-implemented method of clause 5, wherein the user's annotation further includes the user modifying the bounding boxes generated by the annotation logics.
9. The computer-implemented method of clause 1, wherein the images are sampled from the subclusters by one or more sampling logics.
10. The computer-implemented method of clause 9, further including:
   increasing the sampling priority of the first images and decreasing the sampling priority of the second images by updating the sampling logics to account for the user's selection of the first images, the user's non-selection of the second images, and/or the user's annotation of the first images.
11. The computer-implemented method of clause 1, wherein the set of images is embedded as vectors in an embedding space.
12. The computer-implemented method of clause 11, wherein the annotation logics cause generation of the vectors.
13. The computer-implemented method of clause 11, wherein the sampling logics sample the images by sampling the vectors from the embedding space.
14. The computer-implemented method of clause 13, further including:
   increasing the sampling priority of the first images and decreasing the sampling priority of the second images by updating the embedding space to account for the user's selection of the first images, the user's non-selection of the second images, and/or the user's annotation of the first images.
15. The computer-implemented method of clause 14, wherein updating the embedding space further includes updating the clustering and the subclustering of the vectors.
16. The computer-implemented method of clause 15, wherein the embedding space is updated by retraining the annotation logics using the user's annotation of the first images as ground truth annotations.
17. The computer-implemented method of clause 16, wherein the retrained annotation logics cause generation of new vectors for new images that update the embedding space.
18. The computer-implemented method of clause 1, wherein the user's selection of the first images is weighted by order of selection.
19. The computer-implemented method of clause 1, wherein the user's selection of the first images is weighted by selection time.
20. The computer-implemented method of clause 1, wherein the sampled images are presented to the user in a ranked order.
21. The computer-implemented method of clause 20, wherein the ranked order is generated by one or more ranking logics.

22. The computer-implemented method of clause 21, further including:
updating the ranking logics to account for the user's selection of the first images, the user's non-selection of the second images, and/or the user's annotation of the first images.

23. The computer-implemented method of clause 1, wherein the cycles iterate the clustering and the subclustering, the sampling, the presenting, the monitoring the user's selection, the monitoring the user's non-selection, the using the user's selection, and the using the user's non-selection until a convergence condition is satisfied.

24. The computer-implemented method of clause 23, wherein the cycles further include iteratively retraining the annotation logics using the user's annotation of the first images as the ground truth annotations.

25. The computer-implemented method of clause 24, wherein the convergence condition is the retrained annotation logics exceeding an annotation accuracy threshold on a validation set of images.

26. The computer-implemented method of clause 23, wherein the convergence condition is a complete annotation of the set of images.

27. The computer-implemented method of clause 1, further including:
presenting the sampled images to the user as graphic elements that are configured to be selected, dismissed, and annotated by the user.

28. The computer-implemented method of clause 1, wherein the annotation logics, the sampling logics, and the ranking logics are rule-based logics.

29. The computer-implemented method of clause 1, wherein the annotation logics, the sampling logics, and the ranking logics are tree-based logics.

30. The computer-implemented method of clause 1, wherein the annotation logics, the sampling logics, and the ranking logics are neural network-based logics.

31. A computer-implemented method of construction a core frame set for training a frame annotator, including:
using a frame annotator to generate machine annotations for a first subset of frames in a frame set;
using the machine annotations for the first subset of frames to cluster frames in the first subset of frames into a first plurality of frame clusters;
sampling a first suggestion frame set from the first plurality of frame clusters;
presenting the first suggestion frame set toward a user as a first set of graphic elements that are configured to be selected and annotated by the user, or to be dismissed by the user;
receiving, from the user, selection and annotation of one or more graphic elements in the first set of graphic elements corresponding to one or more selected and annotated frames in the first suggestion frame set, and dismissal of one or more graphic elements in the first set of graphic elements corresponding to one or more dismissed frames in the first suggestion frame set;
including the selected and annotated frames from the first suggestion frame set in a core frame set, and training the frame annotator on the core frame set to generate machine annotations for a second subset of frames in the frame set; and
using the machine annotations for the second subset of frames, and the selected and dismissed frames from the first suggestion frame set to cluster frames in the first and second subsets of frames into a second plurality of frame clusters.

32. The computer-implemented method of clause 31, further including:
sampling a second suggestion frame set from the second plurality of frame clusters; presenting the second suggestion frame set toward the user as a second set of graphic elements that are configured to be selected and annotated by the user, or to be dismissed by the user;
receiving, from the user, selection and annotation of one or more graphic elements in the second set of graphic elements corresponding to one or more selected and annotated frames in the second suggestion frame set, and dismissal of one or more graphic elements in the second set of graphic elements corresponding to one or more dismissed frames in the second suggestion frame set;
including the selected and annotated frames from the second suggestion frame set in the core frame set, and further training the frame annotator on the core frame set to generate machine annotations for a third subset of frames in the frame set; and
using the machine annotations for the third subset of frames, and the selected and dismissed frames from the second suggestion frame set to cluster frames in the first, second, and third subsets of frames into a third plurality of frame clusters.

Clause Set 2

1. A computer-implemented method of core set generation, including:
at a first iteration:
sampling a first candidate core set from a data set;
presenting the first candidate core set to a user;
receiving, from the user, first evaluations of the first candidate core set;
using the first evaluations to identify first core set members from the first candidate core set, and first non-core set members from the first candidate core set; and
at a second iteration that succeeds the first iteration:
sampling a second candidate core set from the data set in dependence upon the first core set members and the first non-core set members.

2. The computer-implemented method of clause 1, wherein the first evaluations include selection of at least one core set member from the first candidate core set by the user.

3. The computer-implemented method of clause 1, wherein the first evaluations include non-selection of at least one non-core set member from the first candidate core set by the user.

4. The computer-implemented method of clause 1, wherein the first evaluations include labelling of at least one core set member from the first candidate core set by the user.

5. The computer-implemented method of clause 1, further including:
presenting the first candidate core set to the user as user interface elements that are configured to be selected, dismissed, and annotated by the user.

6. The computer-implemented method of clause 5, wherein the first evaluations are interactions of the user with the first candidate core set via the user interface elements.

7. The computer-implemented method of clause 1, further including:
sampling the first and second candidate core sets from clustered members of the data set that are clustered into a plurality of clusters.

8. The computer-implemented method of clause 7, wherein the clustered members are clustered into the plurality of clusters in an embedding space that embeds vectorized and compressed representations of the clustered members.

9. The computer-implemented method of clause 8, further including:

sampling the first and second candidate core sets from the embedding space.

10. A computer-implemented method of asynchronous human-in-the-loop (HITL) active learning, including:

executing a plurality of iterations of the HITL active learning, each iteration in the plurality of iterations including:

sampling an unlabeled set of items, wherein a set size of the unlabeled set varies between iterations in the plurality of iterations;

presenting the unlabeled set to a human annotator for labelling;

receiving from the human annotator a labeled subset of the items, wherein a subset size of the labeled subset varies between the iterations; and training a machine annotator on the labeled subset.

11. A computer-implemented method of human-in-the-loop (HITL) active learning including a model training step that trains a model on a labeled set, an instance sampling step that samples instances from an unlabeled set based on a sampling priority, and a label querying step that generates human annotations for the sampled instances and adds human-annotated instances to the labeled set, including:

configuring the HITL active learning with a feedback loop for adjusting future sampling strategy based on human supervisory signal, including:

configuring the label querying step to implement human selection, dismissal, and annotation of instances sampled in a given iteration of the HITL active learning; and configuring the instance sampling step to modify the sampling priority of instances sampled and not sampled in subsequent iterations of the HITL active learning based on the human selection, dismissal, and annotation of the instances sampled in the given iteration.

12. The computer-implemented method of clause 11, wherein instances that are sampled in the given iteration and are selected and annotated by the human have a first configuration.

13. The computer-implemented method of clause 12, further including:

increasing the sampling priority of subsequently sampled instances with configurations that substantially match the first configuration.

14. The computer-implemented method of clause 11, wherein instances that are sampled in the given iteration and are dismissed by the human have a second configuration.

15. The computer-implemented method of clause 14, further including:

decreasing the sampling priority of subsequently sampled instances with configurations that substantially match the second configuration.

16. The computer-implemented method of clause 15, wherein the instances are embedded in an embedding space.

17. The computer-implemented method of clause 16, wherein distances among the instances in the embedding space are a measure of matching of the instances.

18. The computer-implemented method of clause 17, wherein the distances are measured using one of a Manhattan distance, a Euclidean distance, a Hamming distance, and a Mahalanobis distance.

Clause Set 3

1. A system, comprising:

memory storing a sequence of frames of a video;

data partitioning logic configured to partition the sequence of frames into an oracle set and an unannotated set, wherein frames in the oracle set are annotated by a user, and wherein frames in the unannotated set are candidates for user annotation by the user and thereby for inclusion in the oracle set conditional upon being members of a core set, and for machine annotation by an annotation network trained on the oracle set conditional upon being non-members of the core set; and annotation logic configured to generate annotations for the frames in the unannotated set, the annotations including:

user annotations, by the user, for a first subset of frames in the unannotated set, wherein the first subset of frames includes those frames that are recommended to the user for being the members of the core set and are selected by the user for annotation, and machine annotations, by the trained annotation network, for a second subset of frames in the unannotated set, wherein the second subset of frames includes those frames that are not recommended to the user for being the non-members of the core set, and those frames that are recommended to the user for being the members of the core set but are not selected by the user for annotation.

2. The system of clause 1, wherein the annotation logic is further configured to generate the annotations for the frames in the unannotated set over a plurality of iterations.

3. The system of clause 2, wherein a forward pass of a training category of iterations in the plurality of iterations includes:

prior annotation logic configured to process a subject frame in the unannotated set through a prior training configuration of the trained annotation network, and to generate a prior annotation for the subject frame;

posterior annotation logic configured to process the subject frame through a posterior training configuration of the trained annotation network, and to generate a posterior annotation for the subject frame;

a gradient flow encoder configured to generate a gradient flow measurement for the subject frame, and to embed the gradient flow measurement in a latent frame space constructed from previous gradient flow measurements;

core set sampling logic configured to select a plurality of gradient flow measurements from the latent frame space;

template network configured to generate rankings for gradient flow measurements in the plurality of gradient flow measurements based on comparing contributions of associated frames to ablation-based accuracy metrics of the trained annotation network;

alignment network configured to generate rerankings for the ranked gradient flow measurements based on past user responses to prior frame recommendations;

frame recommendation logic configured to reorder the associated frames according to the rerankings, and to present the reordered associated frames to the user for annotation via an interface; and the annotation logic further configured to include in the first subset of frames at least one of the reordered associated frames for which an annotation is received from the user, and to store the annotation as a user annotation for the at least one of the reordered associated frames.

4. The system of clause 3, wherein the subject frame is one of the reordered associated frames.

5. The system of clause 4, wherein the subject frame is the at least one of the reordered associated frames for which the annotation is received from the user.

6. The system of clause 5, wherein the subject frame is not the at least one of the reordered associated frames for which the annotation is received from the user.

7. The system of clause 3, wherein the subject frame is not one of the reordered associated frames.

8. The system of clause 3, wherein the prior annotation is a first attention map that identifies a first configuration of regions-of-interest in the subject frame.

9. The system of clause 8, wherein the posterior annotation is a second attention map that identifies a second configuration of the regions-of-interest in the subject frame.

10. The system of clause 3, wherein the gradient flow encoder is further configured to generate the gradient flow measurement as an intermediate, compressed representation (e.g., 32×32 dimensions) in response to processing the prior annotation as input and replicating the posterior annotation as output.

11. The system of clause 10, wherein the gradient flow measurement encodes progression of gradient updates to coefficients of the trained annotation network from the prior training configuration to the posterior training configuration.

12. The system of clause 3, wherein the latent frame space clusters gradient flow measurements and thereby the frames in the unannotated set into discrete latent frame subspaces.

13. The system of clause 12, wherein the core set sampling logic is implemented by a rule-based selector configured to select at least one gradient flow measurement from each of the latent frame subspaces.

14. The system of clause 3, wherein the core set sampling logic is implemented by a tree-based selector configured to select the plurality of gradient flow measurements based on importance.

15. The system of clause 3, wherein the core set sampling logic is implemented by a neural network configured to select the plurality of gradient flow measurements based on supervisory signals learned during training.

16. The system of clause 3, wherein the core set sampling logic is further configured to randomly select the plurality of gradient flow measurements from the latent frame space.

17. The system of clause 3, wherein a contribution of an associated frame to the ablation-based accuracy metrics of the trained annotation network is determined by:

generating a dependent training configuration of the annotation network based on training the annotation network on a first training set that includes the associated frame;

generating an independent training configuration of the annotation network based on training the annotation network on a second training set that excludes the associated frame;

calculating a dependent annotation accuracy by applying the dependent training configuration of the annotation network on a validation set;

calculating an independent annotation accuracy by applying the independent training configuration of the annotation network on the validation set; and measuring a difference between the dependent annotation accuracy and the independent annotation accuracy.

18. The system of clause 3, wherein the template network is implemented by a neural network configured to generate the rankings of the gradient flow measurements based on the contributions of the associated frames to the ablation-based accuracy metrics of the trained annotation network.

19. The system of clause 1, further configured to comprise respective template networks for respective sequences of frames of respective videos.

20. The system of clause 19, wherein the alignment network processes outputs of the respective template networks, and produces rerankings for ranked gradient flow measurements.

21. The system of clause 3, wherein the past user responses to the prior frame recommendations are categorized as user selection of frames, user non-selection of frames, and time delay in user's evaluation of frames.

22. The system of clause 3, wherein the alignment network is further configured to generate the rerankings for the ranked gradient flow measurements based on the past user responses to those previously recommended frames that share respective latent frame subspaces with the associated frames.

23. The system of clause 3, wherein the alignment network is implemented by a neural network configured to generate the rerankings for the ranked gradient flow measurements based on training that spans ground truth categories across user selection of frames (e.g., ground truth label "1"), user non-selection of frames (e.g., ground truth label "0"), and time delay in user's evaluation of frames (e.g., ground truth label "1-$\lambda$t", where t is time delay).

24. The system of clause 3, wherein a backward pass of the training category of iterations in the plurality of iterations includes:

ranking alignment training logic configured to further train the alignment network based on comparing the rerankings against current user responses to the reordered associated frames;

template training logic configured to further train the template network based on comparing the rankings of the gradient flow measurements against the contributions of the associated frames to the ablation-based accuracy metrics of the trained annotation network; and annotation network training logic configured to further train the annotation network based on comparing a posterior annotation for the at least one of the reordered associated frames for which the annotation is received from the user against the user annotation.

25. The system of clause 12, wherein retraining the ranking alignment training logic based on the current user responses changes rankings of the latent frame subspaces from a sampling perspective of the core set sampling logic by ranking those latent frame subspaces higher whose associated frames are selected by the user.

26. The system of clause 12, wherein retraining the annotation network training logic based on the user annotation restructures the latent frame subspaces (e.g., creates new clusters, modifies old clusters by adding or dropping embeddings) from the sampling perspective of the core set sampling logic by directing a gradient flow of the trained annotation network to be a best approximation of a full gradient flow of the sequence of the frames of the video, and amending the latent frame subspaces to be more representative of cluster distributions in an embedding space of the sequence of the frames of the video.

27. The system of clause 2, wherein a non-training category of iterations in the plurality of iterations includes:

the prior annotation logic configured to process a subject frame in the unannotated set through a prior training configuration of the trained annotation network, and to generate a prior annotation for the subject frame;

the posterior annotation logic further configured to process the subject frame through a posterior training configuration of the trained annotation network, and to generate a posterior annotation for the subject frame;

the gradient flow encoder further configured to generate a gradient flow measurement for the subject frame, and to embed the gradient flow measurement in the latent frame space constructed from previous gradient flow measurements; and the annotation logic further configured to include the subject frame in the second subset of frames, and to store the posterior annotation as a machine annotation for the subject frame.

28. The system of clause 27, wherein the prior annotation is a first attention map that identifies a first configuration of regions-of-interest in the subject frame.

29. The system of clause 28, wherein the posterior annotation is a second attention map that identifies a second configuration of the regions-of-interest in the subject frame.

30. The system of clause 27, wherein the training category of iterations and the non-training category of iterations repeat at a frequency of one to four in the plurality of iterations.

31. The system of clause 1, wherein the core set is a subset of frames from the plurality of frames that guarantees that the trained annotation network fitted on the core set is configured to substantially fit the plurality of frames.

32. The system of clause 31, wherein the substantially fit is defined by a majority of the plurality of frames (e.g., 50% or more frames in the plurality of frames).

33. The system of clause 31, wherein the substantially fit is defined by a supermajority of the plurality of frames (e.g., 60%, 70%, 80%, 90% or more frames in the plurality of frames).

34. The system of clause 1, wherein the core set guarantees a similar generation error of the trained annotation network as the plurality of frames.

35. The system of clause 1, wherein the core set best approximates a full gradient of the plurality of frames.

36. A system, comprising:
memory storing a sequence of frames of a video;
data partitioning logic configured to partition the sequence of frames into an oracle set and an unannotated set, wherein frames in the oracle set are annotated by a user, and wherein frames in the unannotated set are candidates for user annotation by the user and thereby for inclusion in the oracle set conditional upon being members of a core set, and for machine annotation by an annotation network trained on the oracle set conditional upon being non-members of the core set; and
annotation logic configured to generate annotations for the frames in the unannotated set, the annotations including:
user annotations, by the user, for a first subset of frames in the unannotated set, wherein the first subset of frames includes those frames that are recommended to the user for being the members of the core set, and
machine annotations, by the trained annotation network, for a second subset of frames in the unannotated set, wherein the second subset of frames includes those frames that are not recommended to the user for being the non-members of the core set.

37. A system, comprising:
memory storing a sequence of frames of a video;
data partitioning logic configured to partition the sequence of frames into an oracle set and an unannotated set, wherein frames in the oracle set are annotated by a user, and wherein frames in the unannotated set are candidates for user annotation conditional upon being members of a core set, and for machine annotation conditional upon being non-members of the core set; and
annotation logic configured to generate annotations for the frames in the unannotated set, the annotations including user annotations based on membership in the core set, and machine annotations based on non-membership in the core set.

What is claimed is:

1. A computer-implemented method of core set discovery, including:
in cycles,
clustering and subclustering a set of images to group visually similar images into subclusters;
sampling images from the subclusters;
presenting a panel of sampled images to a user;
monitoring a user's selection of first images among the sampled images;
monitoring a user's non-selection of second images among the sampled images;
using the user's selection of the first images to increase sampling priority for first subclusters to which the first images belong; and
using the user's non-selection of the second images to decrease sampling priority for second subclusters to which the second images belong.

2. The computer-implemented method of claim 1, wherein the sampled images are presented to the user with machine annotations.

3. The computer-implemented method of claim 2, wherein the machine annotations are generated by one or more annotation logics.

4. The computer-implemented method of claim 2, wherein the machine annotations are bounding boxes drawn around objects-of-interest depicted in the sampled images.

5. The computer-implemented method of claim 1, further including:
monitoring a user's annotation of the first images.

6. The computer-implemented method of claim 5, further including:
using the user's annotation of the first images to further increase the sampling priority for the first subclusters to which the first images belong.

7. The computer-implemented method of claim 5, wherein the user's annotation further includes the user drawing bounding boxes around objects-of-interest depicted in the sampled images.

8. The computer-implemented method of claim 5, wherein the user's annotation further includes the user modifying bounding boxes generated by annotation logics.

9. The computer-implemented method of claim 1, wherein the images from the subclusters are sampled from the subclusters by one or more sampling logics.

10. The computer-implemented method of claim 9, further including:
increasing the sampling priority of the first images and decreasing the sampling priority of the second images by updating the sampling logics to account for the user's selection of the first images, the user's non-selection of the second images, and/or a user's annotation of the first images.

11. The computer-implemented method of claim 1, wherein the set of images is embedded as vectors in an embedding space.

12. The computer-implemented method of claim 11, wherein annotation logics cause generation of the vectors.

13. The computer-implemented method of claim 11, wherein sampling logics sample the images from the subclusters by sampling the vectors from the embedding space.

14. The computer-implemented method of claim 13, further including:
- increasing the sampling priority of the first images and decreasing the sampling priority of the second images by updating the embedding space to account for the user's selection of the first images, the user's non-selection of the second images, and/or a user's annotation of the first images.

15. The computer-implemented method of claim 14, wherein updating the embedding space further includes updating clustering and subclustering of the vectors.

16. The computer-implemented method of claim 15, wherein the embedding space is updated by retraining annotation logics using the user's annotation of the first images as ground truth annotations.

17. The computer-implemented method of claim 16, wherein the retrained annotation logics cause generation of new vectors for new images that update the embedding space.

18. The computer-implemented method of claim 1, wherein the user's selection of the first images is weighted by order of selection.

19. The computer-implemented method of claim 1, wherein the user's selection of the first images is weighted by selection time.

* * * * *